(12) United States Patent
Kim et al.

(10) Patent No.: US 11,178,522 B2
(45) Date of Patent: Nov. 16, 2021

(54) METHOD FOR PROVIDING CONTENT CORRESPONDING TO ACCESSORY AND ELECTRONIC DEVICE THEREOF

(71) Applicant: Samsung Electronics Co., Ltd., Gyeonggi-do (KR)

(72) Inventors: Jung-Hun Kim, Gyeonggi-do (KR); Seung Woo Park, Gyeonggi-do (KR); Jae-Wook Lee, Gyeonggi-do (KR); Young Ho Rhee, Gyeonggi-do (KR); Jinsoo Choi, Gyeonggi-do (KR); Cheolho Cheong, Seoul (KR); Chang-Ryong Heo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/617,474

(22) Filed: Jun. 8, 2017

(65) Prior Publication Data
US 2018/0176748 A1   Jun. 21, 2018

(30) Foreign Application Priority Data

Dec. 21, 2016   (KR) .......................... 10-2016-0175897

(51) Int. Cl.
*H04W 4/18*   (2009.01)
*H04W 12/06*   (2021.01)
(Continued)

(52) U.S. Cl.
CPC ................ *H04W 4/18* (2013.01); *G06F 8/60* (2013.01); *G06F 9/4411* (2013.01);
(Continued)

(58) Field of Classification Search
CPC ......... H04W 12/04; H04W 4/80; H04W 4/50; H04W 12/08; H04W 76/10; H04W 76/14; H04W 72/0453
See application file for complete search history.

(56) References Cited

U.S. PATENT DOCUMENTS 9,106,780 B1   8/2015 Newstadt et al.
9,971,816 B2 *  5/2018 Lim ........................ G06F 9/445
(Continued)

FOREIGN PATENT DOCUMENTS

JP   2005-190079   7/2005
JP   2006-099455   4/2006
(Continued)

OTHER PUBLICATIONS

European Search Report dated Jan. 2, 2018 issued in counterpart application No. 17176628.0-1879, 10 pages.
(Continued)

*Primary Examiner* — Allahyar Kasraian
(74) *Attorney, Agent, or Firm* — The Farrell Law Firm, P.C.

(57) ABSTRACT

An electronic device is provided which includes a user interface, a communication circuit, a processor electrically connected to the user interface and the communication circuit, and a memory electrically connected to the processor which stores at least one piece of policy information associated with at least one accessory device, wherein the memory stores instructions, which when executed, cause the processor to establish a connection with the at least one accessory device using the communication circuit, receive content associated with the at least one accessory device from an external device different from the at least one accessory device and output at least a part of the received content through the user interface based on at least a part of the at least one piece of policy information stored in the memory.

13 Claims, 49 Drawing Sheets

(51) Int. Cl.

| | | |
|---|---|---|
| *H04W 76/14* | (2018.01) | |
| *H04W 76/34* | (2018.01) | |
| *H04W 76/11* | (2018.01) | |
| *H04L 29/08* | (2006.01) | |
| *G06F 9/4401* | (2018.01) | |
| *H04W 12/08* | (2021.01) | |
| *G06F 8/60* | (2018.01) | |
| *H04L 29/06* | (2006.01) | |
| *H04M 1/72409* | (2021.01) | |
| *H04M 1/72448* | (2021.01) | |
| *G06F 8/38* | (2018.01) | |
| *H04W 8/18* | (2009.01) | |
| *H04W 8/24* | (2009.01) | |
| *H04W 84/18* | (2009.01) | |
| *H04W 88/06* | (2009.01) | |
| *H04M 1/72412* | (2021.01) | |
| *H04W 12/63* | (2021.01) | |

(52) U.S. Cl.
CPC .......... *H04L 63/0861* (2013.01); *H04L 67/34* (2013.01); *H04M 1/72409* (2021.01); *H04M 1/72448* (2021.01); *H04W 12/06* (2013.01); *H04W 12/08* (2013.01); *H04W 76/11* (2018.02); *H04W 76/14* (2018.02); *H04W 76/34* (2018.02); *G06F 8/38* (2013.01); *H04M 1/72412* (2021.01); *H04W 8/186* (2013.01); *H04W 8/24* (2013.01); *H04W 12/63* (2021.01); *H04W 84/18* (2013.01); *H04W 88/06* (2013.01)

(56) References Cited

U.S. PATENT DOCUMENTS

| | | | |
|---|---|---|---|
| 2002/0046216 A1* | 4/2002 | Yamazaki | G06F 3/0643 |
| 2002/0112175 A1 | 8/2002 | Makofka et al. | |
| 2004/0125782 A1* | 7/2004 | Chang | G06F 3/0679 |
| | | | 370/338 |
| 2005/0026661 A1 | 2/2005 | Rheenen et al. | |
| 2008/0028326 A1 | 1/2008 | Wilson et al. | |
| 2008/0133082 A1* | 6/2008 | Rasin | G01C 21/3688 |
| | | | 701/36 |
| 2009/0191914 A1 | 7/2009 | Stahl | |
| 2011/0016462 A1 | 1/2011 | Tyhurst | |
| 2011/0125601 A1* | 5/2011 | Carpenter | G06Q 30/06 |
| | | | 705/26.1 |
| 2012/0054179 A1 | 3/2012 | Zhu et al. | |
| 2012/0084352 A1* | 4/2012 | Cho | G06F 21/53 |
| | | | 709/203 |
| 2013/0135113 A1* | 5/2013 | Kagoura | G08B 5/22 |
| | | | 340/687 |
| 2014/0173075 A1 | 6/2014 | Liu et al. | |
| 2014/0295814 A1 | 10/2014 | Heo et al. | |
| 2015/0082049 A1 | 3/2015 | Rubinstein et al. | |
| 2015/0236855 A1 | 8/2015 | Wang et al. | |
| 2016/0063678 A1* | 3/2016 | Jeong | G06T 11/00 |
| | | | 345/660 |
| 2016/0080448 A1* | 3/2016 | Spears | H04L 65/602 |
| | | | 709/219 |
| 2016/0328570 A1* | 11/2016 | Chao | G06F 17/2235 |
| 2016/0366541 A1* | 12/2016 | Jang | H04L 63/062 |
| 2017/0068405 A1* | 3/2017 | Lue-Sang | G06F 3/04817 |
| 2017/0080251 A1* | 3/2017 | Yehezkel | A61N 5/0624 |

FOREIGN PATENT DOCUMENTS

| | | |
|---|---|---|
| JP | 2015231109 | 12/2015 |
| JP | 2016-021095 | 2/2016 |
| KR | 1020130067720 | 6/2013 |
| KR | 1020140117150 | 10/2014 |
| KR | 1020160076347 | 6/2016 |
| KR | 1020160106001 | 9/2016 |
| WO | WO 2014/184611 | 11/2014 |

OTHER PUBLICATIONS

Japanese Office Action dated Mar. 5, 2018 issued in counterpart application No. 2017-103811, 5 pages.
Japanese Office Action dated Sep. 11, 2017 issued in counterpart application No. 2017-103811, 14 pages.
International Search Report dated Sep. 21, 2017 issued in counterpart application No. PCT/KR2017/006000, 12 pages.
European Search Report dated Sep. 30, 2019 issued in counterpart application No. 17176628.0-1221, 12 pages.
Chinese Office Action dated Mar. 13, 2020 issued in counterpart application No. 201710231873.7, 17 pages.
Chinese Office Action dated Jun. 5, 2019 issued in counterpart application No. 201710231873.7, 29 pages.
EP Summons to Attend Oral Proceedings dated Jun. 19, 2020 issued in counterpart application No. 17176628.0-1203, 13 pages.
Chinese Office Action dated Dec. 14, 2020 issued in counterpart application No. 201710231873.7, 19 pages.
EP Intention to Grant dated Jan. 26, 2021 issued in counterpart application No. 17176628.0-1203, 12 pages.

* cited by examiner

METHOD FOR PROVIDING CONTENT CORRESPONDING TO ACCESSORY AND ELECTRONIC DEVICE THEREOF

PRIORITY

This application claims priority under 35 U.S.C. § 119(a) to Korean Patent Application Serial No. 10-2016-0175897, which was filed in the Korean Intellectual Property Office on Dec. 21, 2016, the entire content of which is incorporated herein by reference.

BACKGROUND

1. Field of the Disclosure

The present disclosure generally relates to an electronic device, and more particularly, to a method and apparatus for providing content corresponding to an accessory by an electronic device.

2. Description of the Related Art

With the development of information and communication technologies and semiconductor technologies, various types of electronic devices have developed into multimedia devices that provide various multimedia services. For example, an electronic device provides various multimedia services such as a voice-call service, a messenger service, a broadcasting service, a wireless Internet service, a camera service, a music reproduction service, and the like.

As electronic devices provide multimedia services, the use of electronic devices by users has increased. As the use of the electronic devices by users has increased, accessories that make the external appearance of electronic devices attractive or that are installed to interoperate with the electronic devices to provide various additional functions are used. For example, a user may use a cover accessory that is installed to cover a part or the entire electronic device.

SUMMARY

As the use of accessory devices has increased, an electronic device provides an application corresponding to an accessory device to satisfy the needs of various users. For example, an electronic device may change a background screen, a lock screen, or a user interface to correspond to an accessory device connected to the electronic device.

However, the user of the electronic device needs to search for and install a corresponding application to provide the application corresponding to the accessory device, which is inconvenient. Also, an accessory device providing company needs to separately provide instructions for the accessory device to enable a user to recognize an application that interoperates with the corresponding accessory device, which is burdensome.

According to an aspect of the present an electronic device provides content corresponding to an accessory device that is connected to the electronic device, based on a content control policy corresponding to the accessory device.

According to another aspect of the present disclosure, an accessory content control device is provided which includes a communication interface and at least one processor configured to authenticate identification information of an accessory device connected with an electronic device when the identification information of the accessory device is received, through the communication interface, set content corresponding to the accessory device when the identification information of the accessory device is successfully authenticated, and control the communication interface to transmit the content information corresponding to the accessory device to the electronic device.

According to another aspect of the present disclosure, an operation method of an accessory content control device is provided which includes authenticating identification information of an accessory device connected to an electronic device when the identification information of the accessory device is received, setting content corresponding to the accessory device when identification information of the accessory device is successfully authenticated, and transmitting content information corresponding to the accessory device to the electronic device.

According to another aspect of the present disclosure, an electronic device is provided which includes a communication interface and at least one processor. The processor controls transmitting identification information of an accessory device connected to an electronic device to an external device through the communication interface when the identification information of the accessory device is received through the communication interface, receiving a result of authenticating the identification information of the accessory device from the external device, receiving service policy information of content corresponding to the accessory device from one or more external devices using the communication interface when the authentication result indicates a successful authentication, and operating one or more pieces of content associated with the identification information of the accessory device based on the service policy information of the content corresponding to the accessory device.

According to another aspect of the present disclosure, an operation method of an electronic device is provided which includes transmitting identification information of an accessory device connected to the electronic device to at least one external device when the identification information of the accessory device is received, receiving an authentication result of the identification information of the accessory device from the external device, setting service policy information of content corresponding to the accessory device when the authentication result indicates a successful authentication, and controlling operation of one or more pieces of content associated with the identification information of the accessory device based on the service policy information of the content corresponding to the accessory device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
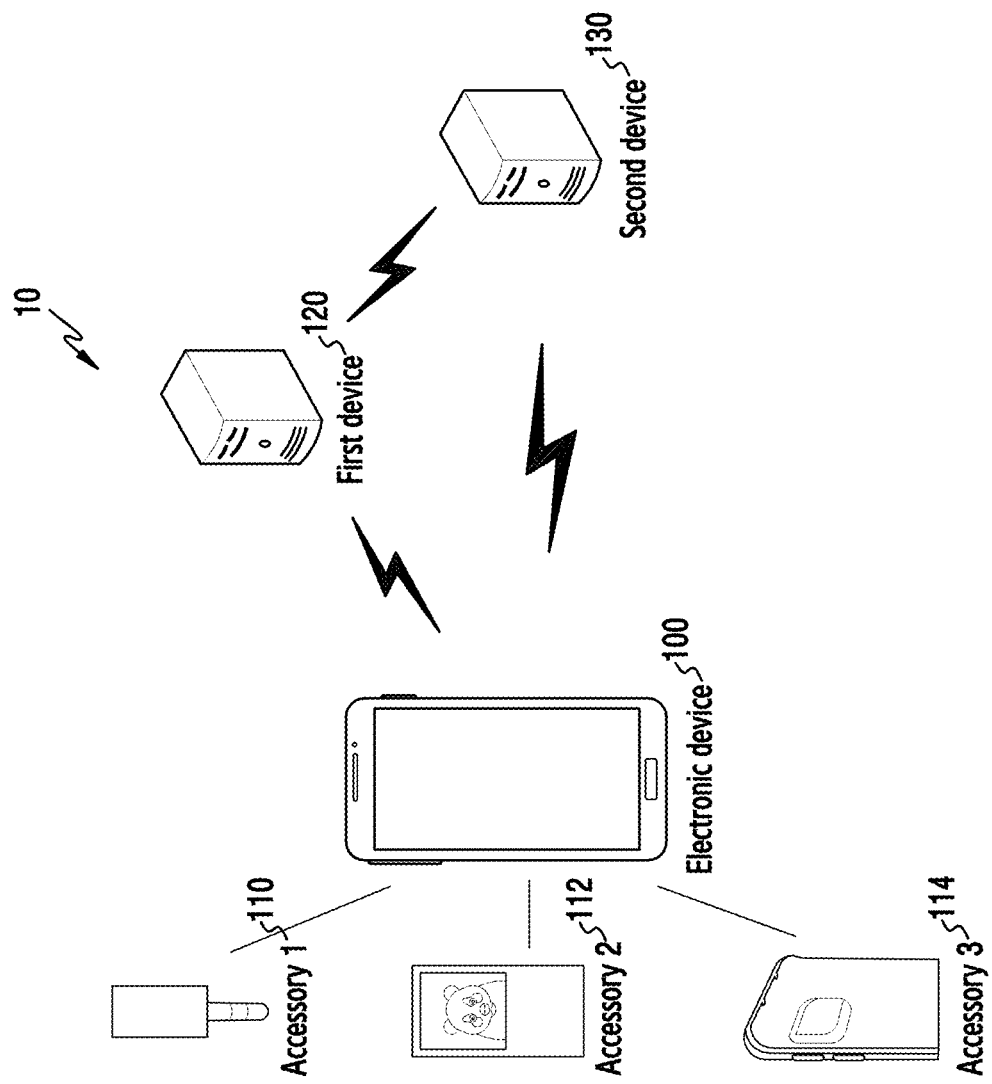
FIG. 1 is a diagram illustrating a configuration of a system for providing a service corresponding to an accessory device according to an embodiment of the present disclosure.

Hereinafter, certain embodiments of the present disclosure are described with reference to the accompanying drawings. It should be understood, however, that there is no limiting the embodiments of the present disclosure to the particular forms disclosed, but, on the contrary, it is intended to cover all modifications, equivalents, and alternatives falling within the spirit and scope of the embodiments of the present disclosure. Like reference numerals denote like components throughout the drawings. A singular expression includes a plural concept unless there is a contextually distinctive difference therebetween.

In the present disclosure, the expressions "A or B", "A and/or B", and the like may include all possible combinations of items enumerated together. Although expressions such as "$1^{st}$" "$2^{nd}$" "first", and "second" may be used to express corresponding elements, it is not intended to limit the corresponding elements. When a certain (e.g., $1^{st}$) element is mentioned as being "operatively or communicatively coupled with/to" or "connected to" a different (e.g., $2^{nd}$) element, the certain element is directly coupled with/to another element or may be coupled with/to the different element via another (e.g., 3$^{rd}$) element.

An expression "configured to" as used in the present disclosure may be interchangeably used with, for example, "suitable for", "having the capacity to", "adapted to", "made to", "capable of", or "designed to" in a hardware or software manner according to a situation. In a certain situation, the expression "a device configured to" may imply that the device is "capable of" together with other devices or components. For example, "a processor configured to perform A, B, and C" may imply a dedicated processor (e.g., an embedded processor) for performing a corresponding operation or a general-purpose processor (e.g., central processing unit (CPU) or an application processor) capable of performing corresponding operations by executing one or more software programs stored in a memory device.

An electronic device according to an embodiment of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to an embodiment of the present disclosure, the electronic device (ex. home appliance) may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller machine (ATM), point of sales (POS) terminal, or Internet of things (IoT) device (e.g., a light bulb, various sensors, electric or gas meter, a sprinkler device, a fire alarm, a thermostat, a streetlamp, a toaster, a sporting good, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device (or foldable device). Further, the electronic device is not limited to the aforementioned devices, and may include a new electronic device according to the development of new technology Hereinafter, an electronic device according to an embodiment of the present disclosure will be described with reference to the accompanying drawings. As used herein, the term "user" may indicate a person who uses an electronic device or a device (e.g., an artificial intelligence electronic device) that uses an electronic device.

FIG. 1 is a diagram illustrating a configuration of a system for providing a service corresponding to an accessory device according to an embodiment of the present disclosure. Hereinafter, a service may include at least one of content-related information and policy information for controlling a function related to content.

Referring to FIG. 1, a system 10 includes an electronic device 100, at least one accessory device 110, 112, and 114, a first device 120, and a second device 130. The first device 120 may include a server or a cloud device for a service related to an accessory, or a hub device for controlling a service in a smart home environment. The second device 130 may include a server or a cloud device for providing a service or content, or a hub device for providing a service in a smart home environment. According to an embodiment of the present disclosure, the first device 120 and the second device 130 may be configured as a single device.

According to an embodiment of the present disclosure, the electronic device 100 may be connected to at least one accessory device 110, 112, and 114 through a wired or wireless communication interface, and may receive or transmit information. The electronic device 100 may be connected with the accessory device 1 110 (e.g., an ear cap, a thermometer, a heart rate meter, earphones, and the like) through an ear jack (e.g., 3.5 mm input). The electronic device 100 may be connected with the accessory device 2 112 (e.g., a second battery, and the like) through a universal serial bus (USB) connector. The electronic device 100 may be connected with the accessory device 3 114 (e.g., a cover and the like) through a near field communication (NFC) communication interface or a connection electrode. The electronic device 100 may be connected with an accessory device through at least one of short-range communication (e.g., Bluetooth™ (BT)/Bluetooth™ low energy (BLE), wireless LAN, and the like), cellular communication, a wired/wireless charging port, an audio input/output circuit, and an optical communication port.

According to an embodiment of the present disclosure, the accessory device 110, 112, or 114 may transmit identification information to the electronic device 100 to which the accessory device 110, 112, or 114 is connected. The accessory device 110, 112, or 114 may include a communication interface for transmitting identification information, a chip for storing identification information, a memory, or a pattern circuit. An accessory device may include various types (kinds) of accessory devices, such as a cover type, an ear-jack type, an external-battery type, a charger type, a pen type, a keyboard type, a wired-connector type, a wireless communication type, a product type, and the like. The accessory device 1 110 may include an ear-jack type, which is connected to the electronic device 100 through an ear jack of the electronic device 100. The accessory device 2 112 may include a battery type or charger type, which is connected to the electronic device 100 for supplying power. The accessory device 3 114 may include a cover type accessory device, which is connected to the electronic device 100, such as a folding type, a back-cover type, a battery-cover type, a cover type, a bar type, a wallet type, a view-cover type, a waterproof type, an adhesive ring type (e.g., a tassel case), or a detachable keyboard type. The accessory device may include an accessory of a type that is connected to the electronic device 100 through a wired interface (e.g., a USB connector and the like), an accessory of a type that is connected to the electronic device 100 through a wireless interface (e.g., short-range communication or cellular communication), or an accessory device of a type that is connected to the electronic device 100 through an electrode (e.g., an electronic pen). The accessory device may further include a wired charger, a charger for vehicles, earphones, a speaker, a home appliance, a keyboard, an external display, and the like. The accessory device 110, 112, or 114 may include an authentication module for secure authentication (e.g., a secure memory, a secure circuit, a secure chip, a biometric reader, and the like). The accessory device 110, 112, or 114 may generate or store identification information or security information of the accessory device 110, 112, or 114. At least one of the electronic device 100, the first device 120, and the second device 130 may further include a secure authentication module that performs authentication by verifying whether the identification information or the security information of the corresponding accessory device 110, 112, or 114 is registered or available using a security scheme based on the identification information or the security information of the accessory device 110, 112, or 114. The security scheme may include a hash scheme, a public-key encryption scheme such as an RSA or ECC, a data encryption standard (DES), an advanced encryption standard (AES), a parity check scheme, an inquiry about registration in a service list, and the like.

According to an embodiment of the present disclosure, the electronic device 100 may authenticate (or allow the use of) the accessory device 110, 112, or 114 based on the identification information (ID) or security information of the accessory device 110, 112, or 114 connected to the electronic device 100. The electronic device 100 may transmit at least one of the identification information and the security information of the accessory device 110, 112, or 114 to the first device 120 in order to authenticate the accessory device 110, 112, or 114. The electronic device 100 may transmit at least one of the identification information provided from the accessory device 110, 112, or 114, and the security information based thereon, to the first device 120. The electronic device 100 may receive authentication information according to an authentication operation performed in the first device 120, and may determine whether to authenticate the accessory device 110, 112, or 114 based on the received authentication information. The security information may include a key value associated with a password, a pattern, biometric information, and the like, which is set to enable at least one of the electronic device 100, the first device 120, and the second device 130 to authenticate the accessory device 110, 112, or 114.

According to an embodiment of the present disclosure, the security information may be received from the accessory device 110, 112, or 114, or may be generated in the electronic device 100 based on information received from the accessory device 110, 112, or 114. The accessory device 110, 112, or 114 may include a chip for secure authentication (e.g., a secure chip such as S3FW6MA for NFC wireless authentication), or may further include a secure authentication module in a chip including an identification of the accessory device, a memory, or a pattern circuit. The accessory device 110, 112, or 114 may generate security information corresponding to the accessory device 110, 112, or 114 using the chip for secure authentication or the secure authentication module. The accessory device 110, 112, or 114 may further include a module (e.g., an iris, fingerprint, face, heart-rate, or vein-pattern reader), which is capable of receiving biometric information to generate security information. The electronic device 100 may generate, through a processor, the security information of the accessory device 110, 112, or 114 based on the identification information of the accessory device 110, 112, or 114. That is, the electronic device 100 may generate an encrypted key value by applying a hash function based on the identification information of the accessory device, or may generate new security information through a calculation based on a key value, which is obtained by processing biometric information received using a sensor module included in the electronic device 100, and the identification information of the accessory device 110, 112, or 114.

The electronic device 100 may further determine (e.g. authentication of the identification information) availability of the identification information provided from the accessory device 110, 112, or 114. When the identification information of the accessory device 110, 112, or 114 is available, the electronic device 100 may transmit at least one of the identification information and the security information of the corresponding accessory device 110, 112, or 114 to the first device 120. To determine the availability of the identification information of the accessory device 110, 112, or 114, the electronic device 100 determines whether a connection exists based on a signal received from the accessory device 110, 112, or 114. When it is determined that a connection exists, the electronic device 100 determines that the identification information is available. When identification information of the accessory device is included in the signal received from the accessory device 110, 112, or 114, the electronic device 100 determines that the identification information is available. When it is determined that an accessory device type detected from the signal received from the accessory device 110, 112, or 114 corresponds to an electronic device type stored in the electronic device 100, the electronic device 100 may determine that identification information is available.

According to an embodiment of the present disclosure, the first device 120 authenticates the accessory device 110, 112, or 114 based on at least one of identification information and security information of the accessory device 110, 112, or 114, which is received from the electronic device 100. The first device 120 may transmit authentication information (success or failure) associated with the accessory device 110, 112, or 114 to the electronic device 100.

According to an embodiment of the present disclosure, when the first device 120 determines that authentication is successful based on authentication information associated with the accessory device 110, 112, or 114, the first device 120 may determine a service (e.g., a theme change service, a game function, content download, a social networking service (SNS), a location-based service, and the like) corresponding to the identification information of the accessory device. The first device 120 may use service identification information corresponding to the identification information of the accessory device to determine a service. The service identification information may be identification information including or related to at least one of a service type, content identification information, capability information of an electronic device, service policy information of content, user group information (e.g., a contact group), and at least one other service identification information. The first device 120 may determine a service using the service identification information which is included in the identification information of the accessory device 110, 112, or 114. The first device 120 may detect service identification information corresponding to the identification information of the accessory device 110, 112, or 114 from a previously stored service list (e.g., a database (DB), a table, or a file). At least one device out of the electronic device 100, the first device 120, and the second device 130 may generate or update a service list by associating service identification information, received from the electronic device 100 or the second device 130, with the identification information of the accessory device. That is, the service list may include at least one piece of service information associated with the identification information of the at least one accessory device by at least one device out of the first device 120 and the second device 130, so that the electronic device 100 provides content corresponding to the accessory device 110, 112, or 114 according to a content control policy corresponding to the accessory device 110, 112, or 114. A service may include at least one of content corresponding to an accessory device to be executed or provided in the electronic device 100 and a content control policy corresponding to the accessory device.

According to an embodiment of the present disclosure, when the accessory device 110, 112, or 114 is successfully authenticated (based on identification information or security information of the accessory device), the first device 120 may determine a service based on service identification information provided from the electronic device 100. The first device 120 may determine a service corresponding to the electronic device 100 based on identification information (e.g. a user ID or a device ID) of the electronic device 100. For example, a user ID may include at least one of: a telephone number of an electronic device, a MAC address, a serial number, and a user account (e.g., subscriber information, login information, service user identification information, and the like), as identification information used for identifying an electronic device or a user of the electronic device.

According to an embodiment of the present disclosure, the first device 120 may additionally detect identification information of content corresponding to service identification information. When the accessory device 110, 112, or 114 is successfully authenticated, the first device 120 may detect identification information of at least one piece of content corresponding to the service identification information.

According to an embodiment of the present disclosure, the first device 120 may transmit content to the electronic device 100 or may control display of content based on service identification information corresponding to identification information of an accessory device.

According to an embodiment of the present disclosure, the first device 120 may transmit service information corresponding to identification information of an accessory device to the electronic device 100. The first device 120 may transmit at least one of content identification information and service identification information corresponding to identification information of an accessory device to the electronic device 100. The content identification information may include identification information associated with content or a content group including at least one of an image, text, a video, an audio file, a multimedia file, an electronic book, a bit stream, a document, an application, an item (e.g., identification information for activating a special function, or a game item), and a three-dimensional (3D) graphic. The content identification information may include one or more of: a content name, a content location (e.g., a device where the content is stored or an address on a network), a content version, an application package identification, a resource group, an index for identifying content, and metadata of content (e.g., information of exchangeable image file format (EXIF), ID3 TAG, and multipurpose internet mail extensions (MIME) type), thereby including information for identifying and accessing content corresponding to an accessory device. The first device 120 may transmit service policy information of content corresponding to the identification information of the accessory device 110, 112, or 114 to the electronic device 100. The electronic device 100 may control the display and update of the content in the electronic device 100 based on the service policy information of the content received from the first device 120. The service policy information may include information for controlling at least one of content and a content group that correspond to the identification information of the accessory device 110, 112, or 114. Therefore, the service policy information may include a set of policies, which is set for each piece of content or for each content group, when a service includes a plurality of pieces of content.

According to an embodiment of the present disclosure, the electronic device 100 may provide content corresponding to the accessory device 110, 112, or 114, based on service information provided from the first device 120. The electronic device 100 may analyze authentication information provided from the first device 120, and may determine availability of the corresponding authentication information (e.g., whether authentication is successfully performed). When it is determined that the corresponding authentication information is available, the electronic device 100 may determine identification information of content associated with the accessory device 110, 112, or 114, based on the service information provided from the first device 120.

According to an embodiment of the present disclosure, the electronic device 100 may request content associated with the accessory device 110, 112, or 114 from the first device 120 or the second device 130, and may receive the content associated with the accessory device 110, 112, or 114. The electronic device 100 may determine the identification information of the content associated with the accessory device 110, 112, or 114 based on the service identification information provided from the first device 120. The electronic device 100 may request the content from the first device 120 or the second device 130 based on the content identification information, or may receive the content from the first device 120 or the second device 130. As another example, the electronic device 100 may transmit a content request signal to the first device 120 using content identification information. The first device 120 may transmit the content request signal associated with the content identification information to the second device 130 based on the content request signal of the electronic device 100. The electronic device 100 may receive content corresponding to the content request signal from the second device 130.

According to an embodiment of the present disclosure, the electronic device 100 may register or update the content associated with the accessory device 110, 112, or 114. When the content associated with the accessory device 110, 112, or 114 is an application, the electronic device 100 may install, remove, or update the corresponding application based on a connection state of the accessory device 110, 112, or 114.

According to an embodiment of the present disclosure, the second device 130 may access the first device 120, and may register a service (e.g., content identification information) corresponding to a predetermined accessory device 110, 112, or 114.

According to an embodiment of the present disclosure, when a content request signal (e.g., a content request signal associated with service identification information or content identification information) is received from the electronic device 100 or the first device 120, the second device 130 may transmit content corresponding to the content request signal to the electronic device 100. When the second device 130 is provided with identification information of the accessory device 110, 112, or 114 connected to the electronic device 100 from the first device 120, the second device 130 may update service information (e.g., a game item, a game group, and the like) of the electronic device 100 to correspond to a connection of the accessory device 110, 112, or 114. When the electronic device 100 is connected to the second device 130 to use a service, the second device 130 may provide a service to the electronic device 100 based on the updated service information. The second device 130 may include a device (e.g., a server) for providing an application or content.

According to an embodiment of the present disclosure, the second device 130 may update a service corresponding to a predetermined accessory device 110, 112, or 114 registered in the first device 120. The first device 120 may transmit service update information to the electronic device 100 based on updating of service information corresponding to the accessory device 110, 112, or 114. When updating a service (or service information) corresponding to the accessory device 110, 112, or 114 is detected, the first device 120 may determine whether the electronic device 100 is connected to the accessory device 110, 112, or 114. The first device 120 may transmit information (e.g., a service update notification or an updated content) corresponding to updating the service to the electronic device 100, based on a connection state between the electronic device 100 and the accessory device 110, 112, or 114. When updating service information corresponding to the accessory device 110, 112, or 114 is detected, the first device 120 may transmit service update information based on service policy information included in, or associated with, service identification information corresponding to the accessory device 110, 112, or 114. That is, the first device 120 may selectively transmit the service update information based on a condition set in the service policy information (e.g., whether an accessory device is installed, a time, a place, whether an application is executed, the right to use content, and the like).

According to an embodiment of the present disclosure, the electronic device 100 may provide a service based on service update information when the service update information related to the accessory device 110, 112, or 114 is received. For example, only when the accessory device 110, 112, or 114 is connected may the electronic device 100 receive the service update information from the first device 120 or the second device 130. The electronic device 100 may receive or display the service update information based on service policy information included in, or associated with, service identification information corresponding to the accessory device 110, 112, or 114. That is, the electronic device 100 may receive the service update information or display the service update information based on a condition set in the service policy information (e.g., whether an accessory device is installed, a time, a place, whether an application is executed, the right to use content, and the like).

According to an embodiment of the present disclosure, the first device 120 or the second device 130 may determine whether the accessory device 110, 112, or 114 is installed in the electronic device 100. The first device 120 or the second device 130 may receive, from the electronic device 100, information associated with whether the accessory device 110, 112, or 114 is installed every time the electronic device 110, 112, or 114 is installed or removed. The first device 120 or the second device 130 queries the electronic device 100 as to whether the accessory device 110, 112, or 114 is installed, and receives a result indicating whether the accessory device is installed in the electronic device 100, thereby receiving information associated with installation in the electronic device 100. The first device 120 monitors whether the accessory device 110, 112, or 114 is installed in the electronic device 100, and informs the second device 130 whether the accessory device 110, 112, or 114 is installed in the electronic device 100. To this end, the second device 130 may search the first device 120 in advance as to whether the accessory device 110, 112, or 114 is installed in the electronic device 100.

According to an embodiment of the present disclosure, the electronic device 100 may analyze at least one of identification information and security information of the accessory device 110, 112, or 114 connected to the electronic device 100, and may authenticate the accessory device 110, 112, or 114 in the electronic device 100. When it is determined that at least one of the identification information and the security information of the accessory device 110, 112, or 114 is available, the electronic device 100 may authenticate the accessory device 110, 112, or 114 in the electronic device 100. The electronic device 100 may determine whether the identification information of the accessory device 110, 112, or 114 satisfies a previously defined rule. When the identification information or the security information of the accessory device 110, 112, or 114 satisfies a previously defined rule, the electronic device 100 may determine that authentication has been successfully performed. The previously defined rule may include a predetermined identification-information-generating policy (e.g., a parity policy for identification information, a range of each field value, whether mapping is performed based on a predetermined security-related key value, and the like). The electronic device 100 may authenticate the security information of the accessory device 110, 112, or 114 based on the authentication information included in the identification information of the accessory device 110, 112, or 114. The electronic device 100 may authenticate the identification information of the accessory device 110, 112, or 114 based on authentication information provided from the accessory device 110, 112, or 114, together with the identification information of the accessory device 110, 112, or 114. Authentication information may include at least one of: a value related to previously registered user biometric information (e.g., iris, face, heart rate, fingerprint information, and the like), account information, a security key value, and security information. That is, when a comparison between the authentication information received from the accessory device 110, 112, or 114 and authentication information obtained through another unit (e.g., a password input, an iris, a face, a heartbeat, a fingerprint, a pattern input, a voice input, and the like) shows that the two pieces of authentication information correspond to the same user, it is determined that the authentication information of the accessory device 110, 112, or 114 is available. To this end, when two pieces of authentication information are of the same type as each other, patterns of the two pieces of authentication information may be compared. When two pieces of authentication information are of different types from each other, whether the authentication information corresponds to the same user may be determined for each piece of authentication information through the electronic device 100 or an external electronic device. When the electronic device 100 successfully authenticates the accessory device 110, 112, or 114, the electronic device 100 may transmit identification information of the accessory device 110, 112, or 114 to the first device 120.

According to an embodiment of the present disclosure, the first device 120 may transmit content corresponding to identification information of an accessory device to the electronic device 100, based on content information provided from the second device 130. Accordingly, the electronic device 100 may register or update the content corresponding to the accessory device 110, 112, or 114 based on content information provided from the first device 120.

Figure 2:
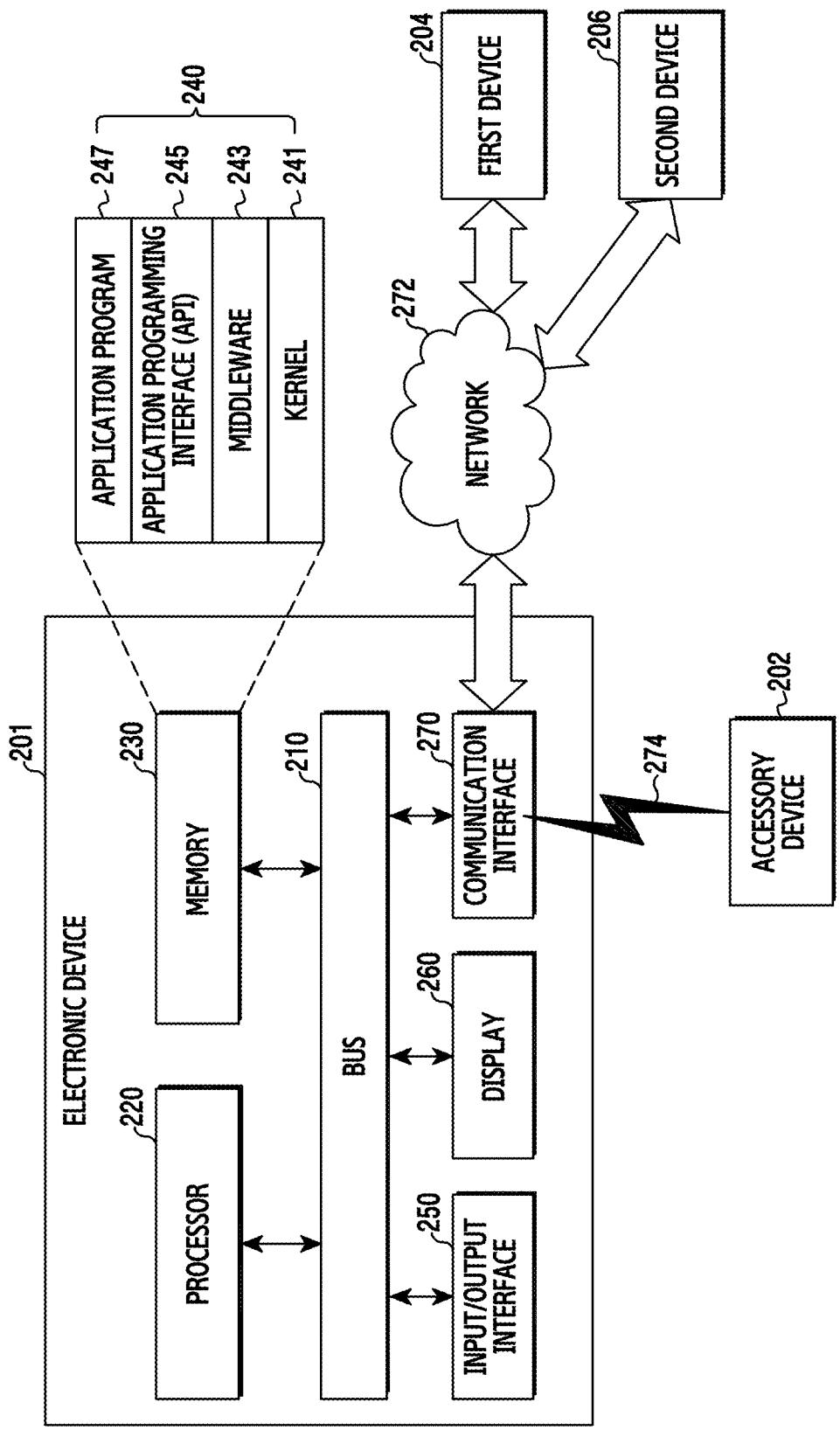
FIG. 2 is a diagram illustrating an electronic device in a network environment according to an embodiment of the present disclosure.

FIG. 2 illustrates an electronic device 201 in a network environment according to an embodiment of the present disclosure. Hereinafter, the electronic device 201 may include the electronic device 100 of FIG. 1. An accessory device 202 may include the accessory device 110, 112, or 114 of FIG. 1. A first device 204 may include the first device 120 of FIG. 1. A second device 206 may include the second device 130 of FIG. 1.

Referring to FIG. 2, the electronic device 201 includes a bus 210, a processor 220 (e.g., including processing circuitry), a memory 230, an input/output interface 250 (e.g., including input/output circuitry), a display 260 (e.g., including display circuitry), and a communication interface 270 (e.g., including communication circuitry). According to an embodiment of the present disclosure, the electronic device 201 may omit at least one of the elements, or may further include other elements.

The bus 210 includes, for example, a circuit which interconnects the elements 220 to 270 and delivers communication (e.g., a control message and/or data) between the elements.

The processor 220 may include one or more of a central processing unit (CPU), an application processor (AP), an image signal processor (ISP), and a communication processor (CP). The processor 220 may, for example, carry out operations or data processing relating to the control and/or communication of at least one other element of the electronic device 201.

According to an embodiment of the present disclosure, when the accessory device 202 is connected through the input/output interface 250 or the communication interface 270, the processor 220 may detect identification information of the corresponding accessory device 202. The processor 220 may determine whether the accessory device 202 is connected (e.g., installed) through the input/output interface 250 or the communication interface 270. When a reception strength or a change of a signal received from the accessory device 202 is included in each predetermined range, the processor 220 may determine that the accessory device 202 is connected to the electronic device 201. That is, when a reception strength or a change of a signal received from the accessory device 202 is included in each predetermined range, the processor 220 may determine that the identification information of the accessory device 202 is available. The processor 220 may determine whether the accessory device 202 is connected to the electronic device 201 or perform an install operation or a disconnect operation, based on sensor data detected through at least one of the input/output interfaces 250 contained in the electronic device 201 (e.g., a proximity sensor, a pressure sensor, an image sensor, or an acceleration sensor). When an NFC signal of an NFC unit contained in a cover-type accessory device is received, the processor 220 may determine that the cover-type accessory device is installed to or disconnected from the electronic device 201 based on sensor data detected by another sensor. The processor 220 may determine whether the accessory device 202 is connected based on a signal received from the accessory device 202 (e.g., a signal strength range, the continuity of a signal, a signal holding time, and the like). The processor 220 may determine that the accessory device 202 is installed in the electronic device 201 when a signal (e.g., a signal including identification information of an accessory device) received from the accessory device 202 has a strength greater than or equal to a predetermined strength, and shows a rate of change in a signal strength that is less than a predetermined range during at least a predetermined period of time. The identification information of the accessory device may include at least one of a serial number of the accessory device, an authentication-related key value, and a unique value (e.g., eSIM, MAC address, IMEI) of a chip contained in the accessory device. Additionally, the identification information of the accessory device may further include a value related to biometric information (e.g., a fingerprint, an iris, a vein pattern, a face, and the like) of a user that is registered when the accessory device is generated or purchased. The identification information of the accessory device may assign different values to accessory devices of the same type. The identification information of the accessory device may include unique identification information processed by a secure module (e.g., a secure chip) of the accessory device. The identification information of the accessory device may include a value that is sequential based on a point in time when the second device 206 (e.g., the second device 130 of FIG. 1) registers service information of the accessory device in the first device 204 (e.g., the first device 120 of FIG. 1).

According to an embodiment of the present disclosure, the processor 220 may authenticate the accessory device 202 connected to the electronic device 201. The processor 220 may control an authentication module of the electronic device 201 to authenticate an accessory device based on at least one of identification information and security information of the accessory device. The authentication module may be configured as at least a part of the processor 220, or may be configured as a separate circuit that is distinguished from the processor 220. The processor 220 may control the communication interface 270 to transmit at least one of the identification information and the security information of the accessory device to the first device 120 in order to authenticate the accessory device.

According to an embodiment of the present disclosure, the processor 220 may provide content corresponding to an accessory device when the accessory device is successfully authenticated. When the accessory device is successfully authenticated, the processor 220 may control the display 260 to display content provided from the accessory device, the first device, or the second device.

According to an embodiment of the present disclosure, the processor 220 may provide or change the content corresponding to the accessory device 202 based on state information (e.g., a location or time) of the electronic device 201 using service policy information of the content corresponding to the accessory device 202. The processor 220 may provide content corresponding to at least one of time information about the time at which the accessory device 202 is connected to the electronic device 201 and location-related information of the electronic device 201. The processor 220 may selectively activate content based on at least one of information about the time at which the accessory device 202 is connected to the electronic device 201 and location-related information of the electronic device 201.

The processor 220 may determine information associated with whether to change or activate content by transmitting, to the first device 120, state information of the electronic device 201 to which the accessory device 202 is connected. When a connection state of the accessory device 202 is maintained, the processor 220 may control the communication interface 270 to transmit at least one of the time information of the electronic device 201 and the location-related information of the electronic device 201 to the first device 204. The processor 220 may change or display an accessory-associated content provided through an input/output interface (e.g., a display or a speaker), based on service policy information received from the first device 204 or content identification information associated with service policy information. That is, when the first device 204 receives the state information of the electronic device 201 from the electronic device 201, the first device 204 may transfer service policy information or content identification information corresponding to the service policy information to the electronic device 201 so that the electronic device 201 controls content based on the service policy information included in the memory of the first device 204.

According to an embodiment of the present disclosure, the processor 220 may control content corresponding to an accessory device based on the right to use the content. The processor 220 may determine an amount of time for which a corresponding content has been used (e.g., the amount of time that elapses from a start of use of the content or the cumulative time for which the content has been used) or the number of times that the corresponding content has been used, based on service policy information of the content stored in the electronic device 201 or the first device 204. The amount of time which the content has been used may be determined based on the point in time when use of the corresponding content started in the electronic device 201 or the point in time when service of the corresponding content began to be provided in the second device 206. When an available time of content corresponding to the accessory device 202 expires, the processor 220 may update the available time of the accessory device 202 through the first device 204 or the second device 206. The processor 220 may control the display 260 to display expenses to be expended to extend the available period or initialize the amount of use time, using an electronic payment module included in the electronic device 201. When it is determined that the expenses have been paid through the electronic payment module, the processor 220 may extend the available period of the accessory device 202 or may initialize the amount of use time. To this end, the electronic device 201 may exchange information with a third device that supports online payment methods, through the communication interface 270.

According to an embodiment of the present disclosure, the processor 220 may detect the disconnection of an accessory device. The processor 220 may determine that the accessory device 202 is disconnected when a signal strength of a signal received from the accessory device 202 is less than a reference value, when a change in a reception strength is out of a reference range, or when a change of a reception strength is irregular. The processor 220 may determine whether the accessory device 202 is disconnected based on sensor data detected through at least one of a proximity sensor, a pressure sensor, an image sensor, and an acceleration sensor.

According to an embodiment of the present disclosure, when the accessory device 202 is disconnected, the processor 220 may remove or maintain content corresponding to the accessory device 202. The processor 220 may remove or maintain the corresponding content based on service information corresponding to the accessory device 202 together with service policy information of the content provided from the first device 204. When the accessory device 202 is disconnected, the processor 220 may control the communication interface 270 to transmit information about disconnection of the accessory device 202 to the first device 204. When the accessory device 202 is disconnected, the processor 220 may control the communication interface 270 to request, from the first device 204, the service policy information of the content corresponding to the accessory device 202. The processor 220 may remove or maintain the corresponding content based on the service policy information provided from the first device 204. The processor 220 may remove at least a part of, or the entire content based on the service policy information. The processor 220 may deactivate at least a part of, or the entire content based on the service policy information. In this instance, the content may be maintained in a deactivated state in the electronic device 201, or may be removed after a predetermined period of time.

According to an embodiment of the present disclosure, the processor 220 may partially control content according to a connection state of the accessory device 202 based on service policy information. That is, the processor 220 may control a quantity or a quality of the content based on whether the accessory device 202 is connected. When the accessory device 202 is connected and is authenticated, the processor 220 may control the display 260 to display a part of the content that was not displayed when the accessory device 202 was not connected and authenticated. That is, the processor 220 may control the display 260 to display, in the state in which the accessory device 202 is connected, at least one of a video including a closed-door still shot, a closed-door director's-version video, a closed-door audio, an electronic book additionally including closed-door pages, and a closed-door additional episode of a game, which have not been displayed until the accessory device 202 is connected. When the accessory device 220 is connected and authenticated, the processor 202 may control the display 260 to display a high-quality version of content, which is different from content when the accessory device 202 is not connected and authenticated. That is, the processor 220 may provide at least one of a low-resolution content, content having a low picture quality, content having a low sound quality, a black-and-white content, a less spectacular game effect, a low-performance game item and function (e.g., striking power, defensive power, agility, physical strength), a two-dimensional (2D) image, and a mono sound source, until the accessory device 202 is connected. The processor 220 may provide at least one of a high-resolution content, content having a high-quality picture, content having a high-quality sound, a color content, a more spectacular game effect, a high-performance game item, a high-performance game function, a three-dimensional (3D) image, a 3D sound source, when the accessory device 202 is connected. When the accessory device 202 is initially connected, the processor 220 may download, from the first device 204 or the second device 206, a full version of a movie, which has not been provided before the accessory device 202 is connected to the electronic device 201, and may provide the same. When the connection between the accessory device 202 and the electronic device 201 is disconnected, the processor 220 may change the movie to a trailer movie and to provide the same. When the accessory device 202 is not connected to the electronic device 201, the processor 220 may reproduce music for one minute. When the accessory device 202 is connected to the electronic device 201, the processor 220 may reproduce a full version of the corresponding music based on service policy information associated with the accessory device 202. Therefore, the processor 220 may perform control to make a version of content provided when the accessory device 202 is installed in the electronic device 201 different from a version of the content provided when the accessory device 202 is not installed in the electronic device 201, and to provide different versions of content.

According to an embodiment of the present disclosure, the service policy information may be information set in advance in the first device 204 to correspond to the accessory device 202. The electronic device 201 transmits identification information of the accessory device 202 to the first device 204, and may receive at least one piece of service policy information of multiple pieces of content associated with the identification information from the first device 204, and may store the same. The service policy information may be included in the identification information of the accessory device 202 that the electronic device 201 receives, or may be separately received. The service policy information may be set in advance in the memory 230 of the electronic device 201. Accordingly, when the accessory identification information is recognized, a service policy corresponding thereto may be selected from the memory 230 of the electronic device 201.

The memory 230 may include a volatile and/or non-volatile memory. The memory 230 may store, for example, instructions or data relevant to at least one other element of the electronic device 201. According to an embodiment of the present disclosure, the memory 230 may store software and/or a program 240. The program 240 includes, for example, a kernel 241, middleware 243, an application programming interface (API) 245, or application programs 247. At least some of the kernel 241, the middleware 243, and the API 245 may be referred to as an operating system (OS).

The kernel 241 may control or manage the system resources (e.g., the bus 210, the processor 220, the memory 230, and the like) that are used to execute operations or functions implemented in other programs (e.g., the middleware 243, the API 245, and the application programs 247). Furthermore, the kernel 241 may provide an interface through which the middleware 243, the API 245, or the application programs 247 may access the individual elements of the electronic device 201 to control or manage system resources.

The middleware 243 may function as, for example, an intermediary for allowing the API 245 or the application programs 247 to communicate with the kernel 241 to exchange data. Furthermore, the middleware 243 may process one or more task requests received from the application programs 247 according to the priority thereof. The middleware 243 may assign a priority to use the system resources (e.g., the bus 210, the processor 220, the memory 230, and the like) of the electronic device 201 to one or more of the application programs 247, and may process the one or more task requests. The API 245 is an interface used by the application programs 247 to control a function provided from the kernel 241 or the middleware 243, and may include, for example, at least one interface or function (e.g., instruction) for file control, window control, image processing, text control, and the like.

The input/output interface 250 may function as, for example, an interface that may forward instructions or data, which are input from a user or an external device, to the other element(s) of the electronic device 201. The input/output interface 250 may include at least one of an ear jack, a charging port, an audio input/output circuit, and a connection electrode, with which an accessory device may be connected. The input/output interface 250 may be at least one sensor device that may receive sensor data associated with, for example, biometric information, a movement, a temperature, a sound, an image, and the like.

The display 260 may include, for example, a liquid-crystal display (LCD), a light-emitting diode (LED) display, an organic light-emitting diode (OLED) display, a micro electro mechanical system (MEMS) display, or an electronic paper display. The display 260 may display, for example, various types of content (e.g., text, images, videos, icons, and/or symbols) for a user. The display 260 may include a touch screen and may receive, for example, a touch, gesture, proximity, or hover input using an electronic pen or the user's body part.

The communication interface 270 may set communication between the electronic device 201 and an external device (e.g., the accessory device 202, the first device 204, or the second device 206). The communication interface 270 may be connected to a network 272 through wireless or wired communication to communicate with the first device 204 or the second device 206.

The wireless communication may include, for example, cellular communication that uses at least one of LTE, LTE-advance (LTE-A), code division multiple access (CDMA), wideband CDMA (WCDMA), universal mobile telecommunications system (UMTS), wireless broadband (WiBro), global system for mobile communications (GSM), and the like. According to an embodiment of the present disclosure, the wireless communication may include, for example, at least one (e.g., short-range communication 274) of Wi-Fi, Li-Fi, Bluetooth™, Bluetooth™ low energy (BLE), ZigBee™, near field communication (NFC), magnetic secure transmission, radio frequency (RF), and body-area network (BAN). The wireless communication may include global navigation satellite system (GNSS). The GNSS may be, for example, a global positioning system (GPS), a global navigation satellite system (Glonass), a Beidou navigation satellite system (Beidou), or Galileo the European global satellite-based navigation system. Hereinafter, in this disclosure, the term "GPS" may be interchangeable with the term "GNSS". The wired communication may include, for example, at least one of a universal serial bus (USB), a high-definition multimedia interface (HDMI), recommended standard-232 (RS-232), and a plain old telephone service (POTS). The network 272 may include a telecommunications network, for example, at least one of a computer network (e.g., a LAN or a WAN), the Internet, and a telephone network.

Each of the accessory device 202, the first device 204, and the second device 206 may be a device (e.g., an accessory device or a server) of a type the same as or different from the electronic device 201. According to an embodiment of the present disclosure, all or some of the operations performed by the electronic device 201 may be performed by another electronic device or a plurality of electronic devices (e.g., the accessory device 202 or the first device 204 or second device 206). When the electronic device 201 has to perform a function or a service automatically or by request, the electronic device 201 may request another device (e.g., the accessory device 202 or the first device 204 or second device 206), to perform at least some functions relating thereto, instead of autonomously performing the function or service, or in addition to performing the function or service. The other electronic device (e.g., the accessory device 202, or the first device 204 or the second device 206) may perform the requested functions or the additional functions and may transfer the result of execution to the electronic device 201. The electronic device 201 may provide the received result as it is, or may additionally process the received result to provide the requested functions or services. To this end, for example, cloud computing, distributed computing, or client-server computing technology may be used.

Figure 3:
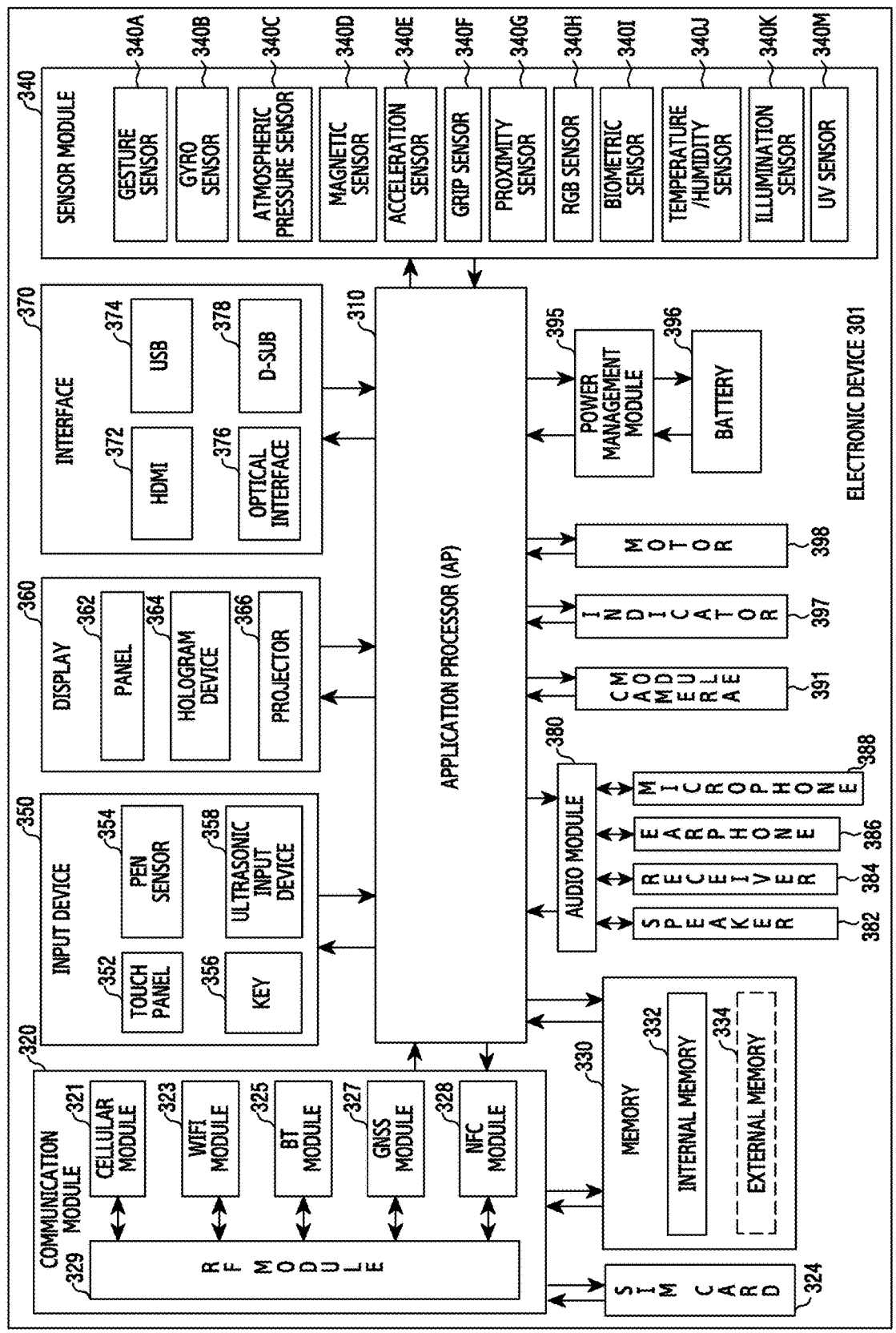
FIG. 3 is a block diagram illustrating an electronic device according to an embodiment of the present disclosure.

FIG. 3 is a block diagram illustrating an electronic device 301 according to an embodiment of the present disclosure. The electronic device 301 may include, for example, a part or the entirety of the electronic device 201 illustrated in FIG. 2.

Referring to FIG. 3, the electronic device 301 includes at least one processor (e.g., AP) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected thereto and may perform various data processing and operations by driving an operating system or an application program. The processor 310 may be embodied, for example, as a system on chip (SoC). According to an embodiment of the present disclosure, the processor 310 may further include a graphic processing unit (GPU) and/or an image signal processor (ISP). The processor 310 may also include at least some (e.g., a cellular module 321) of the elements illustrated in FIG. 3. The processor 310 may load, in a volatile memory, instructions or data received from at least one of the other elements (e.g., a non-volatile memory), process the loaded instructions or data, and store resultant data in the non-volatile memory.

The communication module 320 may have a configuration equal or similar to that of the communication interface 270 of FIG. 2. The communication module 320 may include, for example, a cellular module 321, a Wi-Fi module 323, a Bluetooth™ module 325, a GNSS module 327, an NFC module 328, and an RF module 329.

The cellular module 321 may provide, for example, a voice call, a video call, a text message service, an Internet service, and the like through a communication network. According to an embodiment of the present disclosure, the cellular module 321 may identify or authenticate the electronic device 301 in the communication network by using the subscriber identification module (e.g., a subscriber identity module (SIM) card 324. The cellular module 321 may perform at least some of the functions that the processor 310 may provide. The cellular module 321 may include a communication processor (CP).

According to an embodiment of the present disclosure, at least some (two or more) of the cellular module 321, the Wi-Fi module 323, the Bluetooth™ module 325, the GNSS module 326, and the NFC module 327 may be included in a single integrated chip (IC) or IC package.

The RF module 329, for example, may transmit/receive a communication signal (e.g., an RF signal). The RF module 329 may include, for example, a transceiver, a power amp module (PAM), a frequency filter, a low-noise amplifier (LNA), an antenna, and the like. According to an embodiment of the present disclosure, at least one of the cellular module 321, the Wi-Fi module 323, the Bluetooth™ module 325, the GNSS module 326, and the NFC module 327 may transmit/receive an RF signal through a separate RF module. The subscriber identification module 324 may include, for example, a card that includes a subscriber identification module or an embedded SIM, and may contain unique identification information (e.g., an integrated circuit card identifier (ICCID)) or subscriber information (e.g., an international mobile subscriber identity (IMSI)).

The memory 330 (e.g., the memory 230 of FIG. 2) includes, for example, an embedded memory 332 or an external memory 334. The embedded memory 332 may include, for example, at least one of a volatile memory (e.g., a DRAM, an SRAM, an SDRAM, and the like) and a non-volatile memory (e.g., a onetime programmable ROM (OTPROM), programmable ROM (PROM), erasable and programmable ROM (EPROM), electrically erasable and programmable ROM (EEPROM), mask ROM, flash ROM, NAND flash memory, and NOR flash memory, a hard disc drive, or a solid state drive (SSD)). The external memory 334 may include a flash drive, for example, a compact flash (CF), a secure digital (SD), a micro-SD, a Mini-SD, an eXtreme digital (xD), a multi-media card (MMC), a memory stick, and the like. The external memory 334 may be functionally or physically connected to the electronic device 301 through various interfaces.

The sensor module 340 may, for example, measure a physical quantity or detect the state of operation of the electronic device 301, and may convert the measured or detected information into an electrical signal. The sensor module 340 includes, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, blue (RGB) sensor), a biometric sensor 340I, a temperature/humidity sensor 340J, an illumination sensor 340K, and an ultraviolet (UV) sensor 340M. The sensor module 340 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a module for measuring time by interoperating with a communication module, or providing a time or measurement of time using a clock or timer contained therein. The sensor module 340 may further include a control circuit for controlling one or more sensors included therein. According to an embodiment of the present disclosure, the electronic device 301 may further include a processor, which is configured to control the sensor module 340, as a part of the processor 310 or separately from the processor 310 in order to control the sensor module 340 while the processor 310 is in a sleep state. The temperature/humidity sensor 340J may include a plurality of temperature sensors disposed in different locations.

The input device 350 includes, for example, a touch panel 352, a (digital) pen sensor 354, a key 356, or an ultrasonic input device 358. The touch panel 352 may use, for example, at least one of a capacitive type, a resistive type, an infrared type, and an ultrasonic type. Furthermore, the touch panel 352 may further include a control circuit. The touch panel 352 may further include a tactile layer to provide a tactile reaction to a user. The (digital) pen sensor 354 may include, for example, a recognition sheet that is a part of, or separate from, the touch panel. The key 356 may include, for example, a physical button, an optical key, or a keypad. The ultrasonic input device 358 may detect ultrasonic waves, which are generated by an input tool, through a microphone 388 to determine data corresponding to the detected ultrasonic waves.

The display 360 (e.g., the display 260 of FIG. 2) includes a panel 362, a hologram device 364, a projector 366, and/or a control circuit for controlling them. The panel 362 may be embodied to be, for example, flexible, transparent, or wearable. The panel 362 and the touch panel 352 may be configured as one or more modules. The hologram device 364 may show a three-dimensional image in the air using light interference. The projector 366 may display an image by projecting light onto a screen. The screen may be located, for example, inside or outside the electronic device 301. The interface 370 includes, for example, an HDMI 372, a USB 374, an optical interface 376, or a D-subminiature (D-sub) 378. The interface 370 may be included, for example, in the communication interface 270 illustrated in FIG. 2. The interface 370 may include, for example, a mobile high-definition link (MHL) interface, an SD card/multi-media card (MMC) interface, or an infrared data association (IrDA) standard interface.

The audio module 380, for example, may convert a sound into an electrical signal, and vice versa. At least some elements of the audio module 380 may be included, for example, in the input/output interface 250 illustrated in FIG. 2. The audio module 380 may process sound information that is input or output through, for example, a speaker 382, a receiver 384, earphones 386, the microphone 388, and the like.

The camera module 391 is a device that may take a still image and a moving image. According to an embodiment of the present disclosure, the camera module 391 may include one or more image sensors (e.g., a front sensor or a rear sensor), a lens, an image signal processor (ISP), or a flash (e.g., an LED or xenon lamp). The power management module 395 may manage the power of the electronic device 301.

The power management module 395 may include a power management integrated circuit (PMIC), a charger IC, or a battery gauge. The PMIC may use a wired and/or wireless charging method. The wireless charging method may include, for example, a magnetic-resonance method, a magnetic-induction method, an electromagnetic wave method, and the like. Additional circuits (e.g., a coil loop, a resonance circuit, a rectifier, and the like) for wireless charging may be further included. The battery gauge may measure the remaining charge of the battery 396 and a voltage, current, or temperature while charging. The battery 396 may include, for example, a rechargeable battery and/or a solar battery.

The indicator 397 may indicate a particular state (e.g., a booting state, a message state, a charging state, and the like) of the electronic device 301 or a part (e.g., the processor 310) thereof. The motor 398 or a haptic device may convert an electrical signal into a mechanical vibration and may generate a vibration, a haptic effect (e.g., pressure or texture), and the like. The electronic device 301 may include a mobile TV support device (e.g., a GPU) that may process media data according to a standard such as digital multimedia broadcasting (DMB), digital video broadcasting (DVB), MediaFlo™, and the like.

Each of the above-described elements described in the present disclosure may be configured using one or more components, and the names of the corresponding elements may vary based on the type of electronic device. According to an embodiment of the present disclosure, the electronic device 301 may omit some elements or may further include additional elements. Some elements are coupled to constitute one entity but the entity may perform the same functions as those of the corresponding elements before being coupled to each other.

Figure 4:
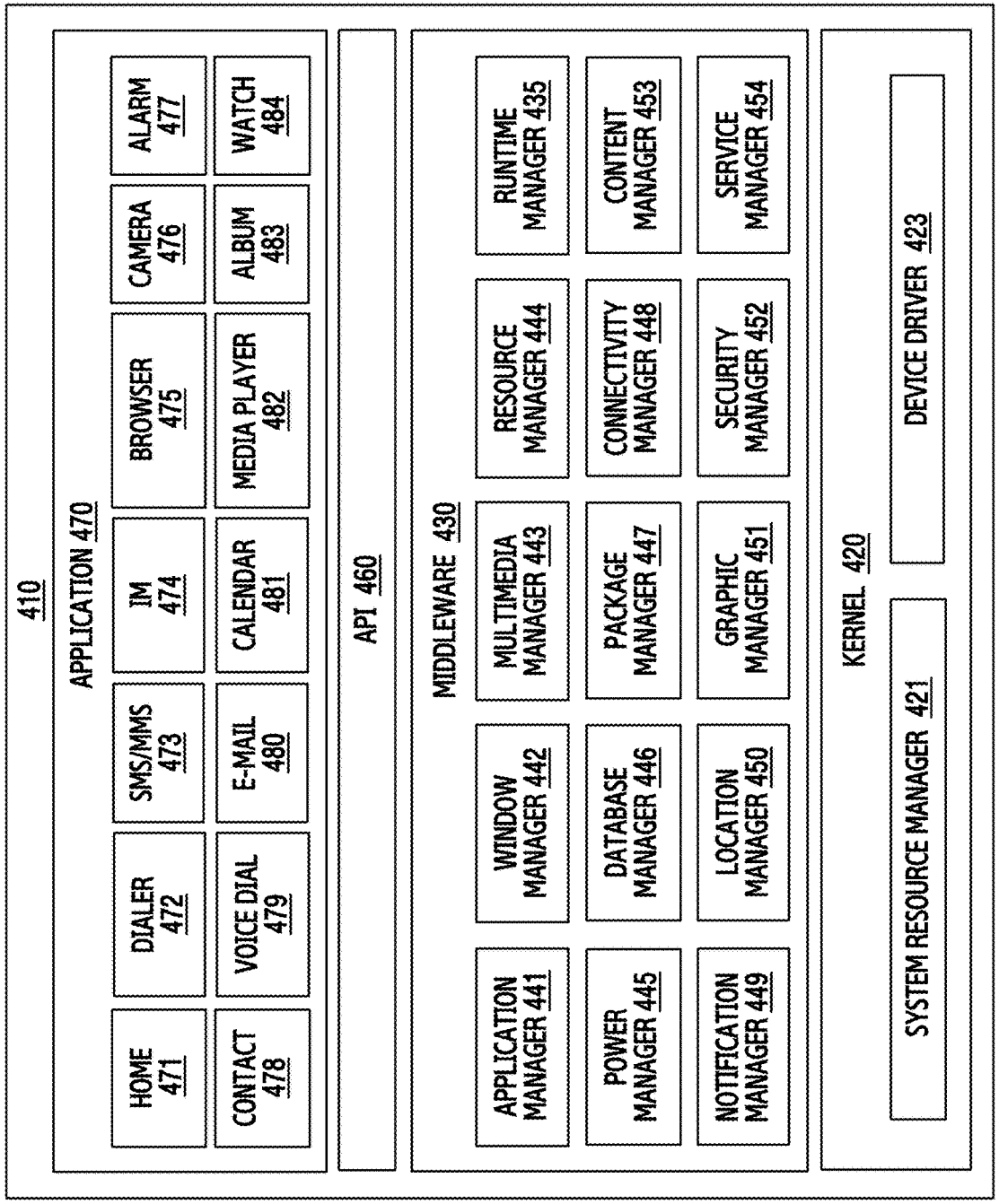
FIG. 4 is a block diagram illustrating a program module according to an embodiment of the present disclosure.

FIG. 4 is a block diagram illustrating a program module according to an embodiment of the present disclosure. The program module 410 (e.g., the program 240 of FIG. 2) may include an operating system (OS) that controls resources relating to an electronic device (e.g., the electronic device 201 of FIG. 2) and/or various applications (e.g., the application programs 247 of FIG. 2) that are driven by the operating system. The operating system may include, for example, Android™, iOS™, Windows™, Symbian™, Tizen™, or Bada™.

Referring to FIG. 4, the program module 410 includes a kernel 420 (e.g., the kernel 241 of FIG. 2), middleware 430 (e.g., the middleware 243 of FIG. 2), an API 460 (e.g., the API 245 of FIG. 2), and/or applications 470 (e.g., the application programs 247). At least a part of the program module 410 may be preloaded on an electronic device, or may be downloaded from an external electronic device (e.g., the accessory device 202, the first device 204, or the second device 206 of FIG. 2).

The kernel 420 includes, for example, a system resource manager 421 and/or a device driver 423. The system resource manager 421 may control, allocate, or retrieve system resources. According to an embodiment of the present disclosure, the system resource manager 421 may include a process management unit, a memory management unit, or a file system management unit. The device driver 423 may include, for example, a display driver, a camera driver, a Bluetooth™ driver, a shared-memory driver, a USB driver, a keypad driver, a Wi-Fi driver, an audio driver, or an inter-process communication (IPC) driver. The middleware 430 may provide a function required by the applications 470 in common, or may provide various functions to the applications 470 through the API 460 to enable the applications 470 to use the limited system resources within the electronic device.

According to an embodiment of the present disclosure, the middleware 430 includes at least one of a runtime library 435, an application manager 441, a window manager 442, a multi-media manager 443, a resource manager 444, a power manager 445, a database manager 446, a package manager 447, a connectivity manager 448, a notification manager 449, a location manager 450, a graphic manager 451, a security manager 452, a content manager 453, and a service manager 454.

The runtime library 435 may include, for example, a library module that a compiler uses in order to add a new function through a programming language while the applications 470 are executed. The runtime library 435 may perform input/output management, memory management, or arithmetic function processing. The application manager 441 may manage, for example, the life cycles of the applications 470. According to an embodiment of the present disclosure, the application manager 441 may interoperate with the first device 120 of FIG. 1 so as to install, delete, or update an application corresponding to an accessory device that is connected to the electronic device 201. The window manager 442 may manage GUI resources used for a display screen. The multimedia manager 443 may identify formats required for reproducing various media files and may encode or decode a media file using a codec suitable for the corresponding format. The resource manager 444 may manage the source code of the applications 470 or memory space. The power manager 445 may manage, for example, the capacity or power of a battery and may provide power information required to operate the electronic device. The power manager 445 may interoperate with a basic input/output system (BIOS). The database manager 446 may, for example, generate, search, or change databases to be used by the applications 470. The package manager 447 may manage the installation or update of an application that is distributed in the form of a package file.

The connectivity manager 448 may manage, for example, a wireless connection. The notification manager 449 may provide an event (e.g., an arrival message, an appointment, a proximity notification, and the like) to a user. The location manager 450 may manage location information measured inside or outside a room by an electronic device using a wireless communication technology, such as satellite communication (GNSS), cellular network identification, an RFID, an NFC, a Wi-Fi fingerprint, and the like, or using a barometer, an acceleration sensor, a gyro sensor, a pedometer, or a geomagnetic sensor. The graphic manager 451 may manage a graphic effect to be provided to a user and a user interface relating to the graphic effect. The security manager 452 may provide, for example, system security or user authentication. The content manager 453 may manage content provided from, for example, the first device 120 or the second device 130 of FIG. 1. The service manager 454 may interoperate with, for example, the first device 120 of FIG. 1, and may perform management to provide a service that the electronic device 201 requires.

According to an embodiment of the present disclosure, the middleware 430 may include a telephony manager for managing a voice or video call function of the electronic device or a middleware module that is capable of forming a combination of the functions of the above-described elements. The middleware 430 may provide a module specialized for each type of operating system. Furthermore, the middleware 430 may dynamically delete some existing elements, or may add new elements. The API 460 is, for example, a set of API programming functions, and may be provided as different configurations depending on the operating system. For example, in the case of Android™ or iOS™, one API set may be provided for each platform, and in the case of Tizen™, two or more API sets may be provided for each platform.

The applications 470 include, for example, a home button 471, a dialer 472, SMS/MMS 473, instant messaging (IM) 474, a browser 475, a camera 476, an alarm 477, contacts 478, voice dialing 479, e-mail 480, a calendar 481, a media player 482, an album 483, a watch 484, a health care application (e.g., for measuring exercise quantity or blood glucose level), an application providing environment information (e.g., atmospheric pressure, humidity, or temperature information), and the like.

According to an embodiment of the present disclosure, the applications 470 may include an information exchange application that may support the exchange of information between the electronic device and an external electronic device. The information exchange application may include, for example, a notification relay application for relaying predetermined information to an external electronic device or a device management application for managing an external electronic device. The notification relay application may relay notification information generated in the other applications of the electronic device to an external electronic device, or may receive notification information from an external electronic device and provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device. The applications 470 may include applications (e.g., a health care application of a mobile medical appliance) that are designated according to the attributes of an external electronic device. The applications 470 may include applications received from an external electronic device. At least some of the program module 410 may be embodied (executed) as software, firmware, hardware (e.g., the processor 310 of FIG. 3), or a combination of at least two of them, and may include a module, a program, a routine, an instruction set, or a process for implementing one or more functions.

Figure 5:
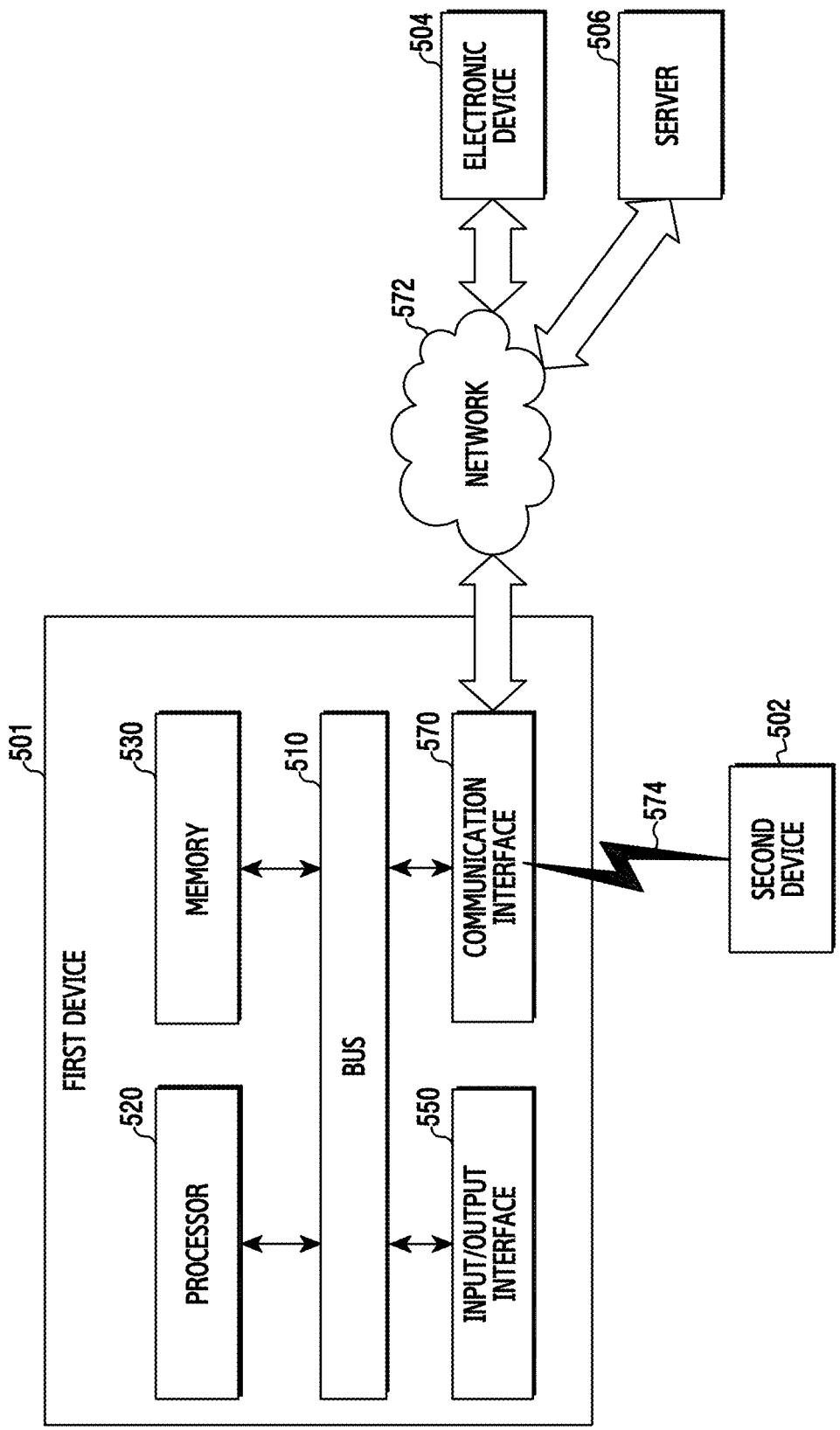
FIG. 5 is a block diagram illustrating a first device according to an embodiment of the present disclosure.

FIG. 5 is a block diagram illustrating a first device according to an embodiment of the present disclosure. Hereinafter, a first device 501 may include the first device 120 of FIG. 1. A second device 502 may include the second device 130 of FIG. 1.

Referring to FIG. 5, the first device 501 includes a bus 510, a processor 520 (e.g., including processing circuitry), a memory 530, an input/output interface 550 (e.g., including input/output circuitry), and a communication interface 570 (e.g., including communication circuitry). According to an embodiment of the present disclosure, the first device 501 may omit at least one of the above elements or may further include other elements.

The bus 510 may include, for example, a circuit which interconnects the elements 520 to 570 and delivers communication (e.g., a control message and/or data) between the elements.

The processor 520 may include one or more of a central processing unit, an application processor (AP), and a communication processor (CP). The processor 520, for example, may carry out operations or data processing relating to the control and/or communication of at least one other element of the first device 501.

According to an embodiment of the present disclosure, the processor 520 may generate a service corresponding to an accessory device that is connectable to an electronic device 504. The processor 520 may determine a service corresponding to an accessory device based on content information provided from the second device 502. The processor 520 may control the memory 530 to receive the content information from the second device 502 and to store information by associating identification information of an accessory device with the content information. Based on the content information (e.g., a content type) received from the second device 502, the processor 520 may control the memory 530 to store information by associating information associated with an application, or player (or viewer) information (e.g., a name, version, or universal resource locator (URL)) corresponding to the content type, with identification information of an accessory device.

According to an embodiment of the present disclosure, the processor 520 may map identification information of content corresponding to a service, which corresponds to an accessory device, to identification information of the service. The processor 520 may control the memory 530 to store information by associating accessory device identification information, identification information of a service corresponding to the accessory device identification information, and identification information of content corresponding to the service identification information. The processor 520 may determine identification information of a service corresponding to accessory device identification information or identification information of content corresponding to service identification information using the association of the stored identification information.

According to an embodiment of the present disclosure, the processor 520 may manage service policy information for operating a service corresponding to an accessory device or content associated with a service. The service policy information may include at least one of a point in time when at least one service corresponding to an accessory device or content associated with the service is activated, the right to use a service or content associated with the service, and a method of processing a service corresponding to disconnection of an accessory device or content associated with the service. With respect to at least one piece of content corresponding to at least one piece of service identification information, the service policy information may include information for controlling at least one of whether to display content in the electronic device 504, controlling the right to use content, and changing a plurality of pieces of content corresponding to disconnection of an accessory device. The processor 520 may generate, change, or delete service policy information corresponding to an accessory device, and may manage the service policy information by associating or including the service policy information with/in service identification information. Therefore, the processor 520 may determine service policy information to be applied to the electronic device 504 which is connected to an accessory device through service identification information corresponding to identification information of the accessory device, or may transmit the service policy information to the electronic device 504. The service policy information may include information for operating (activating, changing, deleting, the right of use, and the like) a service corresponding to service identification information.

According to an embodiment of the present disclosure, the service identification information may include an identification indicating at least one of a theme change service, a scheduler service, a contact service, a message service, a social network service, a game service, a push service, a lock screen service, a background screen service, a UI change service, a bookmark service, a multimedia content reproduction service, a preferred information related service, an advertising service, a web service, and a location-based service. The service identification information may further include a type of accessory device (e.g., a cover, ear jack, charger, HMD, watch, battery, wired device, or wireless device type) or a unique function-related value. The unique function-related value may be structured for each functional category corresponding to an accessory device, may use a random number value, may be encoded, or may include a redundancy code that enables error correction. The unique function-related value may include identification information of a function related to content associated with an accessory device. When content is a multimedia content, the unique function-related value may include information corresponding to player-related information (e.g., a player application, a web browser, a resolution, a supported codec, and the like) enabling the corresponding multimedia content to be reproduced. For the location-based service, the function-related unique value may include location information for identifying a range of locations within which content may be displayed in the electronic device 504. The unique function-related value may include at least one of a type of media, an application, a time, a place, capability information of the electronic device 504, service policy information, user group information, and user account information.

According to an embodiment of the present disclosure, the processor 520 may authenticate an accessory device connected to an electronic device. The processor 520 may authenticate the corresponding accessory device based on at least one of identification information and security information associated with the corresponding accessory device, which is provided from the electronic device 504 through the communication interface 570. The processor 520 may authenticate the accessory device based on a biometric authentication related value provided from the electronic device 504. The processor 520 may control the communication interface 570 to transmit an authentication result (success or failure) to the electronic device 504 or to both the electronic device 504 and the second device 502.

According to an embodiment of the present disclosure, the processor 520 may determine a service corresponding to identification information of an accessory device when the accessory device connectable to the electronic device 504 is successfully authenticated. The processor 520 may detect identification information of the service corresponding to the identification information of the accessory device that is connected to the electronic device 504 from a service list stored in the memory 530. The processor 520 may additionally detect identification information of content corresponding to the service identification information. The processor 520 may detect identification information of a service corresponding to an accessory device by additionally taking into consideration identification information (e.g., a user ID or a device ID) of an electronic device to which the accessory device is connected. The processor 520 may detect content identification information corresponding to content that provides a display resolution appropriate for a corresponding device or service identification information corresponding to the content identification information, through identification information of the electronic device 504 to which an accessory device is connected. A device ID is identification information for identifying capability information of an electronic device, and may include information (e.g., a model name) for determining the capability of the electronic device 504. The capability of the electronic device 504 may include hardware specifications, such as a size, a shape, a type of input/output device, a location, a resolution of a display, a processing speed, a communication module, a communication speed, an available memory capability, and the like, or software specifications, such as a software version and compatibility. The processor 520 may receive a user ID as identification information of the electronic device 504 to which an accessory device is connected, and may determine user profile information of the corresponding device based on the user ID. The processor 520 may select content appropriate for the age of a corresponding user based on the user profile information of the corresponding device, and may detect content identification information corresponding to the content or service identification information corresponding to the content identification information.

According to an embodiment of the present disclosure, the processor 520 may control the communication interface 570 to transmit at least one of service identification information and content identification information to at least one of the electronic device 504 and the second device 502. The processor 520 may select content identification information based on service identification information.

According to an embodiment, of the present disclosure the processor 520 may control the provisioning of content to the electronic device 504 to which an accessory device is connected. When the processor 520 receives a content request signal from the electronic device 504, the processor 520 may detect content corresponding to content identification information included in the content request signal. The processor 520 may control the communication interface 570 to transmit the content corresponding to the content request signal to the electronic device. The processor 520 may determine whether to change or activate content based on state information (e.g., a location, a time, or a content version) of the electronic device 504, which is provided from the electronic device 504, and content identification information (e.g., service policy information of content) associated with an accessory device. The processor 520 may control the communication interface 570 to transmit content change information or content activation information to the electronic device 504. The processor 520 may detect another piece of content associated with the same content identification information based on additional information for selecting content. The processor 520 may select at least one piece of content based on a time when content is selected through the electronic device 504 from among a plurality of pieces of content corresponding to the same content identification information and location information of the electronic device 504.

According to an embodiment of the present disclosure, the processor 520 may control updating of a service corresponding to an accessory device. The processor 520 may determine whether the electronic device 504 to which an accessory device is connected exists when service update information (e.g., a content change notification or a changed service policy) of a predetermined accessory device is received from the second device 502. When the electronic device 504 to which an accessory device is connected exists, the processor 520 may transmit service update information to the corresponding electronic device 504.

According to an embodiment of the present disclosure, the processor 520 may control processing of content corresponding to an accessory device, performed in the electronic device 504, when accessory disconnection information is received from the electronic device 504. When the processor 520 receives accessory disconnection information, the processor 520 may detect service policy information corresponding to an accessory device. The processor 520 may control the communication interface 570 to transmit content-processing information included in the service policy information to the electronic device 504. When accessory disconnection information is received from the electronic device 504, the processor 520 may transfer the accessory disconnection information to the second device 502, thereby controlling the content provided from the second device 502 to the electronic device 504 according to service policy information. The second device 502 may transmit, to the electronic device 504, a signal for controlling a service used in the electronic device 504 according to the service policy information.

The memory 530 may include a volatile and/or non-volatile memory. The memory 530 may store, for example, instructions or data relating to at least one other element of the first device 501.

The input/output interface 550 may function as, for example, an interface that may forward instructions or data, which are input from a user or an external device, to the other element(s) of the first device 501.

The communication interface 570 may establish communication between the first device 501 and an external device (e.g., the second device 502, the electronic device 504, or the server 506). The communication interface 570 may be connected to the network 572 through wireless or wired communication to communicate with the electronic device 504 or the server 506.

According to an embodiment of the present disclosure, the first device 501 may further include a display for displaying various kinds of content (e.g., text, an image, a video, an icon, and/or a symbol) to a user.

According to an embodiment of the present disclosure, an electronic device includes an output device, a communication circuit, a processor configured to be electrically connected to the output device and the communication circuit, and a memory configured to be electrically connected to the processor, and to store at least one piece of policy information associated with at least one accessory device, wherein, upon execution, the memory stores instructions to enable the processor to perform establishing a connection with the at least one accessory device using the communication circuit, receiving content associated with the at least one accessory device from an external device different from the at least one accessory device, via the communication circuit, and outputting at least a part of the received content via the output device based on at least a part of the at least one piece of policy information stored in the memory.

According to an embodiment of the present disclosure, the output device may include a display or a speaker, wherein the instructions, when executed, cause the processor to display at least one of a background screen, a menu, an icon, and a notification corresponding to the at least a part of the received content via the display, or output a sound corresponding to the at least a part of the received content via the speaker.

According to an embodiment of the present disclosure, the instructions may enable the processor to receive the at least one stored piece of policy information from the accessory device or the external electronic device via the communication circuit.

According to an embodiment of the present disclosure, the instructions may enable the processor to perform receiving accessory device identification information from the at least one accessory device using the communication circuit and transmitting a request for the content to the external electronic device based on at least a part of the received accessory device identification information via the communication circuit.

According to an embodiment of the present disclosure, the instructions may enable the processor to perform transmitting electronic device identification information associated with the electronic device or account information of a user of the electronic device to an external electronic device, using the communication circuit and receiving content corresponding to the electronic device identification information or the account information from the external electronic device via the communication circuit.

According to an embodiment of the present disclosure, the instructions may enable the processor to perform transmitting property information associated with the electronic device to the external electronic device using the communication circuit and receiving content corresponding to the property information from the external electronic device via the communication circuit.

According to an embodiment of the present disclosure, the property information may include information associated with at least one of a processing speed of the processor, a communication speed of the communication circuit, an available capacity of the memory, compatibility of software stored in the memory, a sensor included in the electronic device, a type of the output device, a size of the output device, a resolution of the output device, and a form of the output device.

According to an embodiment of the present disclosure, the instructions may enable the processor to perform releasing a connection with the at least one accessory device using the communication circuit and maintaining or interrupting output of at least a part of the content based on at least a part of the at least one piece of policy information.

According to an embodiment of the present disclosure, the at least one piece of policy information may include first policy information associated with the content or second policy information associated with the content and other content received from the external electronic device.

According to an embodiment of the present disclosure, an electronic device may include an output device, a communication circuit, a processor configured to be electrically connected to the user interface and the communication circuit, and a memory configured to be electrically connected to the processor, wherein, the memory stores instructions that upon execution, enable the processor to perform establishing a connection with at least one accessory device using the communication circuit, transmitting property information associated with the electronic device to an external electronic device different from the at least one accessory device, using the communication circuit, receiving content corresponding to the property information from the external electronic device via the communication circuit, and outputting the received content via the output device.

According to an embodiment of the present disclosure, an electronic device includes an output device, a communication circuit, a processor configured to be electrically connected to the user interface and the communication circuit, and a memory configured to be electrically connected to the processor, wherein, the memory stores instructions that upon execution, enable the processor to perform establishing a connection with at least one accessory device using the communication circuit, receiving accessory device identification information associated with the at least one accessory device from the accessory device using the communication circuit, requesting content from an external electronic device, which is different from the at least one accessory device, based on at least a part of the received accessory device identification information, using the communication circuit, receiving the content from the external electronic device via the communication circuit, and outputting the received content via the output device.

According to an embodiment of the present disclosure, an accessory content control device may include a communication interface and at least one processor, wherein the processor is configured to perform authenticating identification information of an accessory device connected with an electronic device when the identification information of the accessory device is received via the communication interface, setting content corresponding to the accessory device when the identification information of the accessory device is successfully authenticated, and controlling the communication interface to transmit the content information corresponding to the accessory device to the electronic device.

According to an embodiment of the present disclosure, the processor may determine whether overlapping usages of the accessory device exist based on the identification information of the accessory device, and may restrict use of the content corresponding to the accessory device when overlapping usages of the accessory device exist.

According to an embodiment of the present disclosure, the processor may determine whether the accessory device is available based on the identification information of the accessory device and identification information of the electronic device, and may restrict use of the content corresponding to the accessory device when it is determined that the accessory device is unavailable.

According to an embodiment of the present disclosure, when the identification information of the accessory device is successfully authenticated, the processor may set content corresponding to the accessory device and service policy information of the content.

According to an embodiment of the present disclosure, when accessory disconnection information is received from the electronic device, the processor may determine a processing scheme of content corresponding to the accessory device based on service policy information of the content, and may control the communication interface to transmit the processing scheme of the content to the electronic device.

According to an embodiment of the present disclosure, when the identification information of the accessory device is successfully authenticated, the processor may control the communication interface to transmit the identification information of the accessory device to a service-providing device.

According to an embodiment of the present disclosure, a memory is further included, and the processor may detect content corresponding to a content request signal from the memory when the content request signal is received from the electronic device, and may control the communication interface to transmit the content corresponding to the content request signal to the electronic device.

According to an embodiment of the present disclosure, the processor may generate a group based on a service type corresponding to the accessory device when the identification information of the accessory device is successfully authenticated, and may control the communication interface to transmit the group information to the electronic device or the service-providing device.

According to an embodiment of the present disclosure, the processor may determine identification information of the electronic device when the identification information of the accessory device is successfully authenticated, may generate a group based on the identification information of the electronic device and a service type corresponding to the accessory device, and may control the communication interface to transmit the group information to the electronic device or a service-providing device.

According to an embodiment of the present disclosure, the service policy information may include at least one of a quality of content, a right of use thereof, and a content-processing scheme, which are provided based on information associated with a connection between the electronic device and the accessory device.

Figure 6:
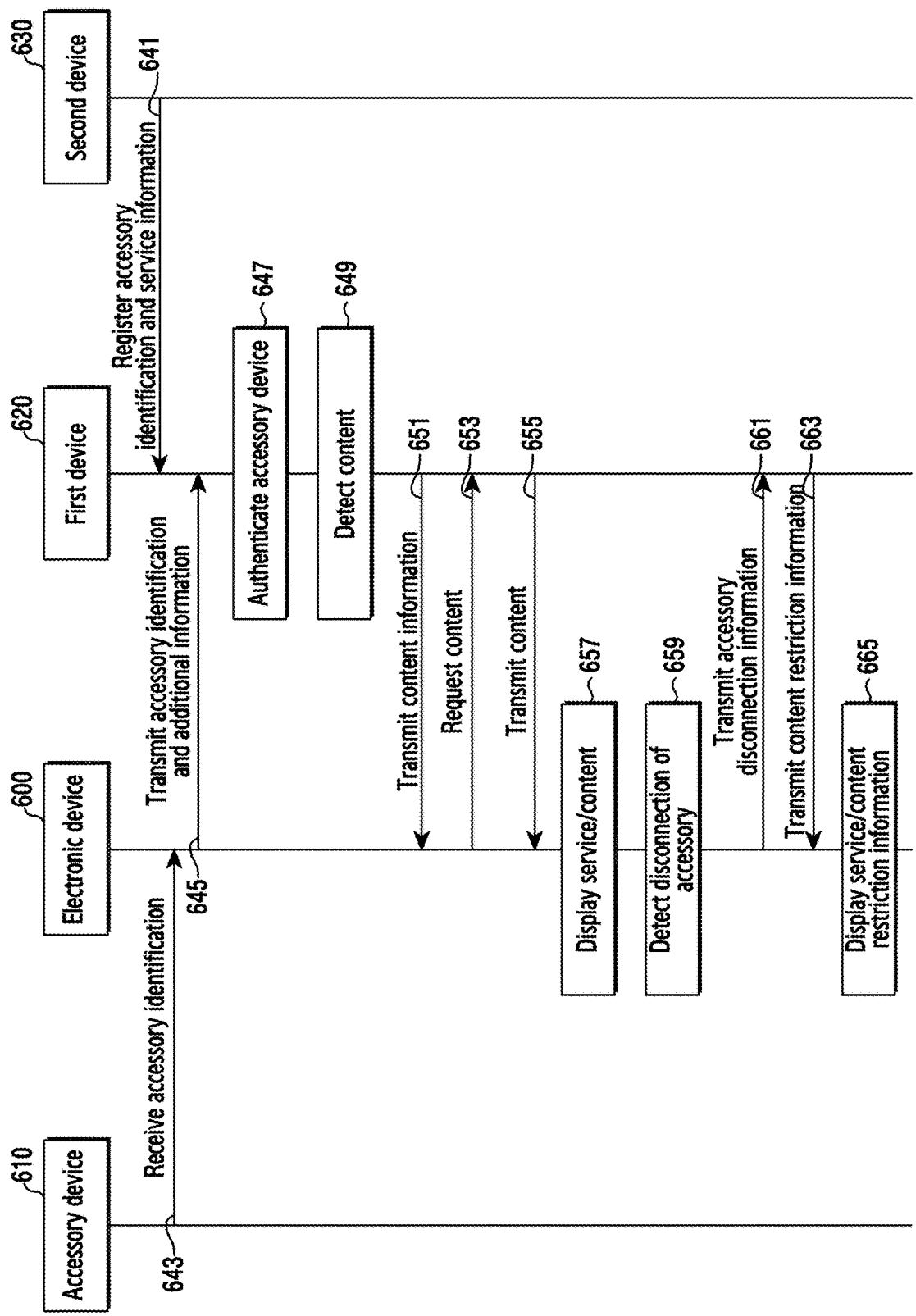
FIG. 6 is a signal flow diagram for providing a service corresponding to an accessory device according to an embodiment of the present disclosure.

FIG. 6 is a signal flow diagram for providing a service corresponding to an accessory device by a system according to an embodiment of the present disclosure. Hereinafter, an electronic device 600 may include the electronic device 100 of FIG. 1. A first device 620 may include the first device 120 of FIG. 1. A second device 630 may include the second device 130 of FIG. 1.

Referring to FIG. 6, the second device 630 accesses the first device 620 to register identification information of an accessory device 610 that is connectable to the electronic device 600 and service information (e.g., at least one of service identification information and content identification information) corresponding to the accessory device 610, in operation 641. According to an embodiment of the present disclosure, the second device 630 may receive, from the first device 620, information (e.g., a webpage or a database input interface for registering service information), which includes and displays identification information of the accessory device 610 that is connectable to the electronic device 600. The second device 630 may input service information corresponding to the identification information of the accessory device 610 using the information that includes and displays the identification information of the accessory device 610 that is connectable to the electronic device 600, thereby registering the corresponding service information (e.g., storing the same in a service list).

The electronic device 600 receives the identification information of the accessory device 610 from the accessory device 610 that is connected to the electronic device 600 in operation 643. The electronic device 600 may determine the availability of identification information of an accessory device based on a reception strength of a signal received from the accessory device and sensor data obtained through at least one sensor. When the accessory device 610 is connected to the electronic device 600 or the identification information of the accessory device 610 satisfies a predetermined rule (e.g., a data field or authentication), the electronic device 600 may determine that the identification information of the accessory device 610 is available. The electronic device may determine the availability of the accessory device 610 using security information that is included in the identification information of the accessory device 610.

The electronic device 600 transmits, to the first device 620, the identification information of the accessory device 610 that is connected to the electronic device 600, in operation 645. The electronic device 600 may transmit, to the first device 620, at least one piece of additional information from among a user ID of the electronic device 600, a device ID, the security information of the accessory device 610, and the service identification information of the accessory device 610. The electronic device 600 may transmit the identification information of the accessory device 610 and the additional information as a single signal, or may separately transmit them as different signals.

The first device 620 authenticates the corresponding accessory device 610 based on the identification information or security information of the accessory device 610 provided from the electronic device 600, in operation 647.

According to an embodiment of the present disclosure, the first device 620 detects content corresponding to the identification information of the accessory device 610 when the accessory device 610 is successfully authenticated, in operation 649. The first device 620 may detect service identification information corresponding to the identification information of the accessory device 610 when the accessory device 610 is successfully authenticated. The first device 620 may detect content identification information corresponding to the electronic device 600 from among at least one piece of content identification information corresponding to the service identification information. The first device 620 may select content identification information corresponding to the electronic device 600 out of the at least one piece of content identification information corresponding to the service identification information based on the identification information of the electronic device 600.

The first device 620 transmits content information corresponding to the accessory device 610 to the electronic device 600 in operation 651. The first device 620 may transmit, to the electronic device 600, authentication information of the accessory device 610 and the identification information of the content corresponding to the accessory device 610. The first device 620 may transmit the authentication information and the content identification information as a single signal, or may separately transmit the same as different signals. When the accessory device 610 is successfully authenticated, the first device 620 may detect service identification information corresponding to the identification information of the accessory device 610 and may transmit the same to the electronic device 600, thereby transmitting the content identification information or service policy information associated with the content.

The electronic device 600 may determine a service policy of at least one piece of content corresponding to content identification information based on the authentication information and the content identification information provided from the first device 620. When it is determined that the authentication information (e.g., authentication success information) provided from the first device 620 is available, the electronic device 600 may determine that content corresponding to content identification information is installable. When content corresponding to the content identification information is installed in advance in the electronic device 600, the electronic device 600 may determine not to install the corresponding content. When the version of the content corresponding to the content identification information, which has been installed in the electronic device 600, is different from a version included in the content identification information, the electronic device 600 may install the corresponding content.

According to an embodiment of the present disclosure, the first device 620 authenticates the accessory device 610 in operation 647, and transmits a result thereof to the electronic device 600. In this instance, when it is determined that authentication is successfully performed based on the received result, the electronic device 600 may detect service identification information corresponding to the identification information of the accessory device 610 from a memory of the electronic device 600. The first device 620 authenticates the accessory device 610 in operation 647, and transmits a result thereof to the electronic device 600. In this instance, when it is determined that authentication is successfully performed based on the received result, the electronic device 600 may request, from the accessory device 610, service identification information corresponding to the identification information of the accessory device 610 and may receive the same from the accessory device 610 through a communication interface. The electronic device 600 may determine content identification information corresponding to the service identification information which corresponds to the identification information of the accessory device 610.

When the electronic device 600 determines to install the content corresponding to content identification information, the electronic device 600 transmits a content request signal to the first device 620, in operation 653. The first device 620 detects content corresponding to the content request signal based on the request from the electronic device 600, and transmits the same to the electronic device 600, in operation 655.

The electronic device 600 installs the content provided from the first device 620, and displays a service screen in operation 657. The electronic device 600 may dynamically output content corresponding to state information (e.g., a time, location, and the like) of the electronic device 600.

When disconnection of the accessory device 610 is detected in operation 659, the electronic device 600 transmits information about disconnection of the accessory device 610 to the first device 620 in operation 661. According to an embodiment of the present disclosure, when disconnection of the accessory device 610 is detected in operation 659, the electronic device 600 may transmit information about disconnection of the accessory device 610 to the second device 630. When information about disconnection of the accessory device 610 is received from the electronic device 600, the first device 620 transmits disconnection information to the second device 630 in operation 661.

According to an embodiment of the present disclosure, the first device 620 may detect a content-processing scheme corresponding to disconnection of the accessory device 610 from a service policy of content corresponding to the accessory device 610. The first device 620 transmits a content-processing scheme corresponding to disconnection of the accessory device 610 to the electronic device 600 in operation 663. The content-processing scheme may include service restriction information associated with content, and information associated with whether to delete content data.

The electronic device 600 may delete or deactivate at least a part of, or the entire content based on the content-processing scheme provided from the first device 620 in operation 665. In this instance, the electronic device 600 may display, on a display, the service restriction information corresponding to the content.

According to an embodiment of the present disclosure, the electronic device 600 may receive or detect a content-processing scheme corresponding to disconnection information of the accessory device 610 from service policy information of content corresponding to the accessory device 610, which is stored in the memory of the electronic device 600. Also, the electronic device 600 may update service policy information stored in the electronic device 600 based on service policy information received from the first device 620 or the second device 630.

Figure 7:
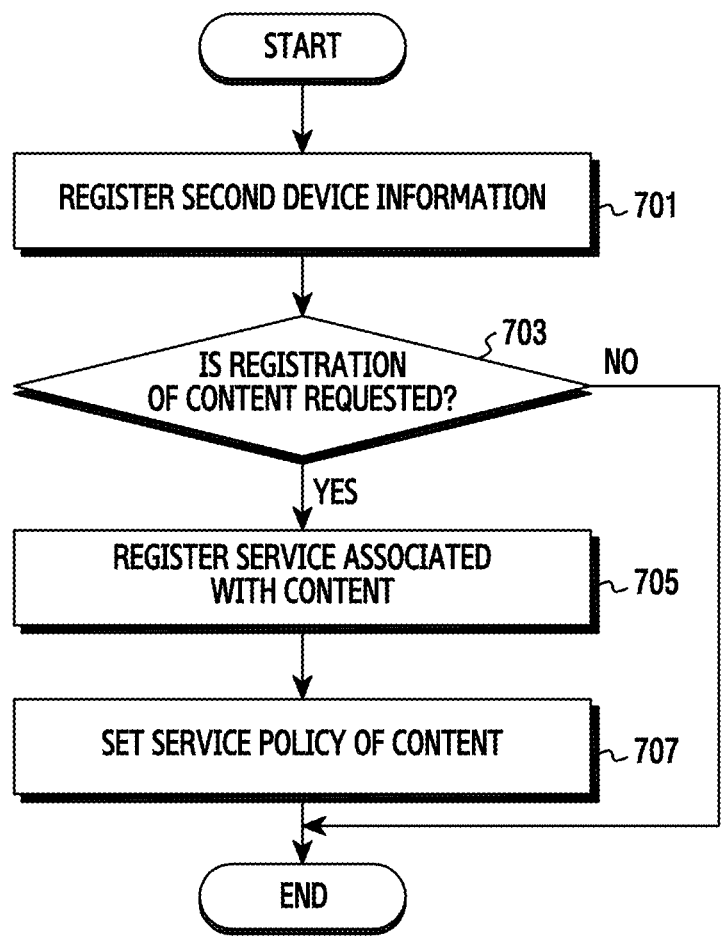
FIG. 7 is a flowchart illustrating a process of registering a service corresponding to an accessory device, by a first device according to an embodiment of the present disclosure.

FIG. 7 is a flowchart illustrating a process of registering a service corresponding to an accessory device, by a first device according to an embodiment of the present disclosure. Hereinafter, the first device may include the first device 501 of FIG. 5 or at least a part (e.g., the processor 520) of the first device 501.

Referring to FIG. 7, the first device registers information of a second device (e.g., the second device 630 of FIG. 6) as a device for providing a service corresponding to an accessory, in operation 701. The processor 520 may register the second device 630 as a device for providing a service corresponding to an accessory through the first device 501 at the request of the second device 630. The processor 520 may allocate identification information for identifying the second device 630 to the second device 630. The processor 520 may update a service device list to include the identification information of the second device 630 (e.g., at least one of subscriber identification, content provider identification (CP ID), service-provider identification, accessory identification information, the network address of a device, a MAC address, and a device serial number). The service device list may include a list of at least one device that may provide a service corresponding to an accessory through the first device 501.

The first device determines whether a content registration request signal is received from the second device, in operation 703. When the content registration request signal is received through the communication interface 570, the processor 520 may determine whether identification information of the second device that transmits the content registration request signal is included in the service device list of the first device 501. When the identification information of the second device that transmits the content registration request signal is included in the service device list of the first device 501, the processor 520 may determine that the content registration request signal is received. According to an embodiment of the present disclosure, when identification information of an accessory device is registered in a service list in association with the identification information of the second device 502 or 630, but content identification information is not registered or is not updated during at least a predetermined period of time, the first device may transmit a content registration request signal to the second device 502 or 630 and may determine whether a response signal is received from the second device 502 or 630. For example, after the first device receives accessory device identification information from the electronic device 504 or 600 to which an accessory device is connected, when identification information of the accessory device is included in a service list but content identification information is not registered in association therewith or is not updated for at least a predetermined period of time, the first device may transmit a content registration request signal to the second device 502 or 630, and may determine whether a response signal is received from the second device 502 or 630.

In operation 705, when a signal (e.g., at least one of content, content identification information, and service identification information) corresponding to the content registration request signal is received from the second device, the first device registers a service of an accessory device corresponding to content. The processor 520 may match identification information of the accessory device for providing content and identification information of content received from the second device. The processor 520 may generate service identification information of the accessory device based on a signal corresponding to the content registration request signal received from the second device. The first device may generate the accessory device identification information using at least one of subscriber identification information, CP ID, service provider identification information, service identification information, additional information, and authentication information.

The first device sets service policy information for the content corresponding to the accessory device, in operation 707. Through negotiation with the second device 630, the processor 520 may set the service policy information for the content corresponding to the accessory device to include at least one of an activation point of content corresponding to an accessory device, content updating, content changing, content control based on state information of the electronic device, content control according to a type of accessory device or additional information, content control based on state information of the electronic device, the right to use content, content control according to the capability of an electronic device or a user, service update information, and a service processing scheme corresponding to disconnection of the accessory device.

Figure 8:
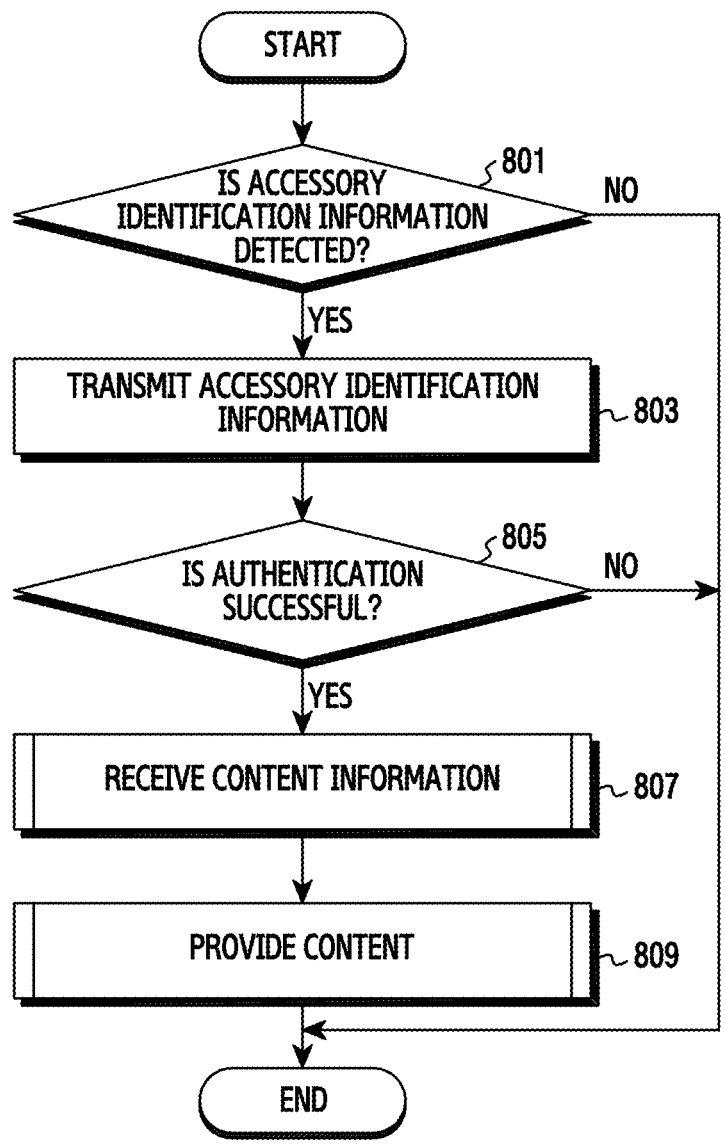
FIG. 8 is a flowchart illustrating a process of providing a service corresponding to an accessory device by an electronic device according to an embodiment of the present disclosure.

FIG. 8 is a flowchart illustrating a process of providing a service corresponding to an accessory device by an electronic device according to an embodiment of the present disclosure. In the following description, the electronic device may include the electronic device 201 or at least a part (e.g., the processor 220) of the electronic device 201 of FIG. 2.

Referring to FIG. 8, the electronic device determines whether identification information of an accessory device is detected in operation 801. The processor 220 may determine whether the identification information of the accessory device that is connected through the input/output interface 250 or the communication interface 270 is detected.

When the identification information of the accessory device is detected, the electronic device transmits property information of the accessory device (e.g., identification information of the accessory device) to the first device (e.g., the first device 620 of FIG. 6) in operation 803. The processor 220 may determine whether the identification information of the accessory device is available when the identification information of the accessory device is detected. The processor 220 may determine whether the identification information of the accessory device is available based on reception strength of a signal received by the accessory device, a change in reception strength of the signal, a type of accessory device, or sensor data of at least one sensor that is electrically connected to the electronic device 201. When the identification information of the accessory device is available, the processor 220 may control the communication interface 270 to transmit the identification information of the accessory device to the first device 620. When the identification information of the accessory device is available, the processor 220 may determine that an accessory device of a corresponding accessory type is connected to the electronic device 201.

According to an embodiment of the present disclosure, the processor 220 may control the communication interface 270 to transmit, to the first device, additional information together with the identification information of the accessory device. The processor 220 may control the communication interface 270 to transmit, to the first device 620, the identification information of the accessory device including additional information. The processor 220 may control the communication interface 270 to transmit, to the first device 620, the identification information of the accessory device and additional information separately at different times. The additional information may include at least one of a user ID of the electronic device 600, a device ID, security information of the accessory device 610, a type of the accessory device 610, a service type corresponding to the accessory device 610, service identification information corresponding to the accessory device 610, and service identification information of the accessory device 610. The additional information may further include at least one of CP ID of the second device 630 that is registered in the first device 620 in association with the accessory device 610, service-provider identification, content version information (e.g., an operating system or a software version) of content to be provided to the electronic device 600 to which the accessory device 610 is connected, a type of accessory, and a type of service. The service type may indicate type information of a service associated with the accessory device 610, and may include identification information indicating at least one of, for example, a setup wizard function interoperation, a theme interoperation, a game function, a push service function, and a group function.

The electronic device determines whether the accessory device is successfully authenticated in operation 805. When authentication information is received from the first device 620 through the communication interface 270, the processor 220 may determine whether the authentication information is available. When the authentication information received from the first device 620 is information corresponding to successful authentication, the processor 220 may determine that the corresponding authentication information is available. When the authentication information received from the first device 620 includes at least one of service identification information corresponding to identification information of the accessory device 610 and content identification information, the processor 220 may determine that the corresponding authentication information is available. When the authentication information received from the first device 620 includes the identification information of the accessory device 610, the processor 220 determines that the corresponding authentication information is available. When a second authentication key, which is generated based on a first authentication key transmitted to the first device 620 for authenticating the accessory device 610, is the same as authentication information received from the first device 620, the processor 220 may determine that the corresponding authentication information is available. When the authentication information provided from the first device 620 is available, the processor 220 may determine an authentication result included in the authentication information. When it is determined that the authentication information provided from the first device 620 is available, the processor 220 may transmit, to the first device 620, a response signal with respect to the authentication information.

According to an embodiment of the present disclosure, when the accessory device is successfully authenticated, the electronic device receives content (or a service) corresponding to the accessory device in operation 807. When the accessory device 610 is successfully authenticated, the processor 220 controls the communication interface 270 to transmit a content request signal to the first device 620. The processor 220 receives, from the first device 620, content corresponding to the content request signal. When the accessory device 610 is successfully authenticated, the processor 220 may determine an application or a function corresponding to content identification information (or service identification information) provided from the first device 620. The processor 220 may determine whether to request content based on whether the application is installed and version information. When the processor 220 determines to request content, the processor 220 may control the communication interface 270 to transmit a content request signal to the first device 620 or the second device 630. To this end, the processor 220 may determine a device to which a content request signal is to be transmitted, based on service identification information.

The electronic device outputs the content corresponding to the accessory device in operation 809. That is, the electronic device may output the content corresponding to the accessory device through a user interface of the electronic device. The processor 220 may change a lock screen, a background screen, or a UI of the electronic device 201 to correspond to the content that corresponds to the accessory device. The processor 220 may add a telephone number of a user (e.g., a celebrity) or group corresponding to the accessory device to a contact information application of the electronic device 201. The contact information application may include at least one of an address book, social network contact information, a video call address book, and a messenger. The processor 220 may add an event (e.g., a birthday or a concert event) corresponding to the accessory device to a schedule application of the electronic device 201. The processor 220 may provide a location-based service based on the content corresponding to the accessory device. The schedule application may include a calendar or a scheduling application.

According to an embodiment of the present disclosure, the electronic device outputs the content corresponding to the accessory device based on service policy information corresponding to the accessory device in operation 809. The processor 220 may output, through a user interface, at least a part of the content corresponding to the accessory device based on at least a part of the service policy information corresponding to the accessory device, which is stored in the memory 230 of the electronic device or is provided from the first device.

According to an embodiment of the present disclosure, when the accessory device is successfully authenticated, the electronic device receives, through a communication interface, the content (or service) corresponding to the accessory device from a memory of the accessory device, in operation 807.

Figure 9:
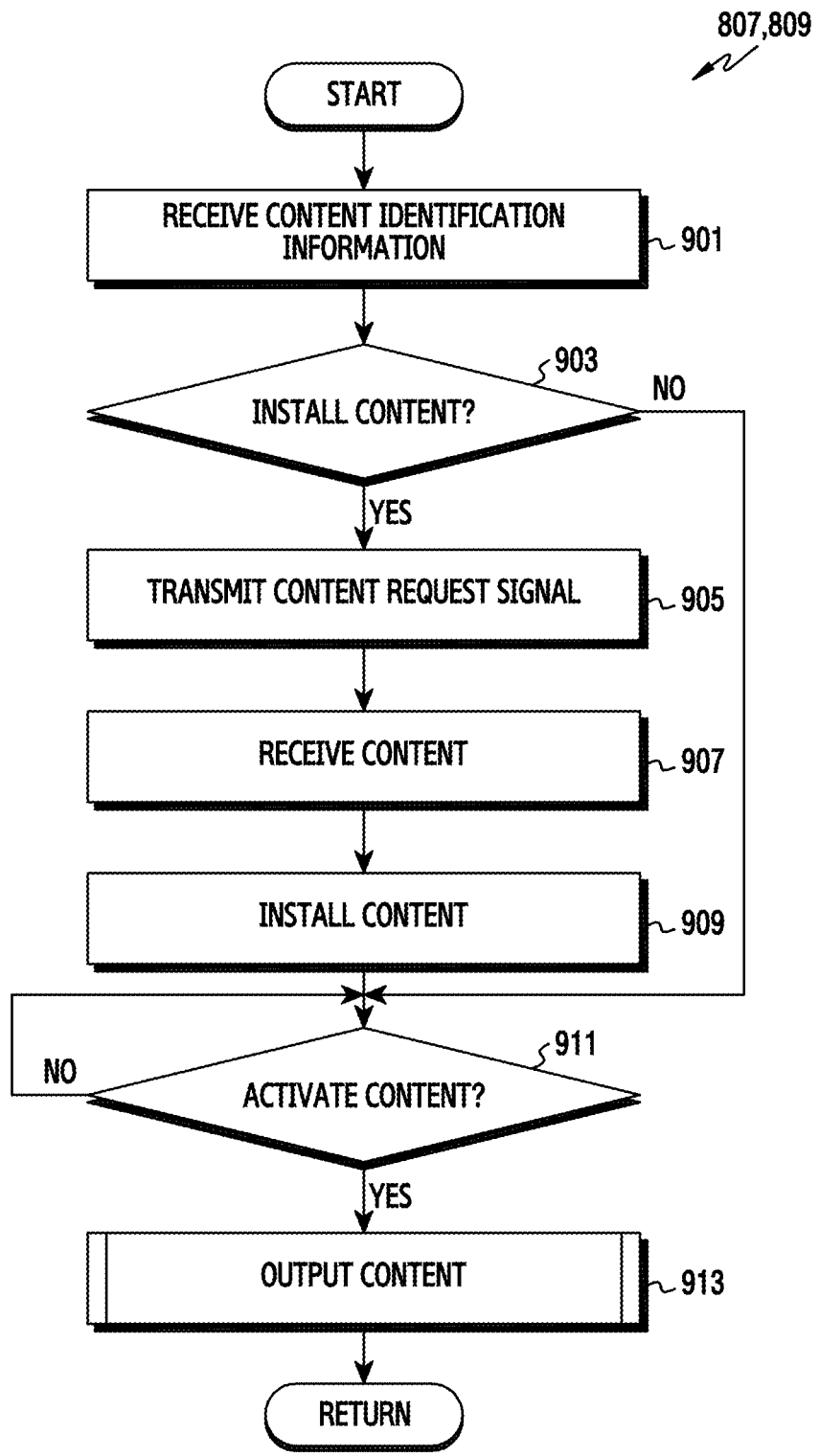
FIG. 9 is a flowchart illustrating a process of providing content corresponding to an accessory device by an electronic device according to an embodiment of the present disclosure.
Figure 10A:
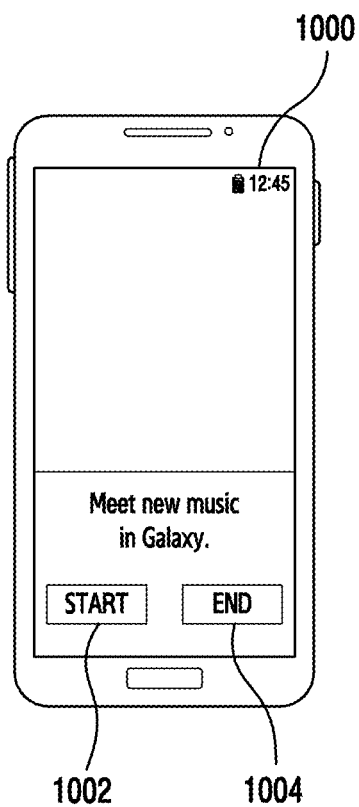
FIGS. 10A to 10C are diagrams illustrating screen configurations that provide content corresponding to an accessory device, according to an embodiment of the present disclosure.
Figure 10B:
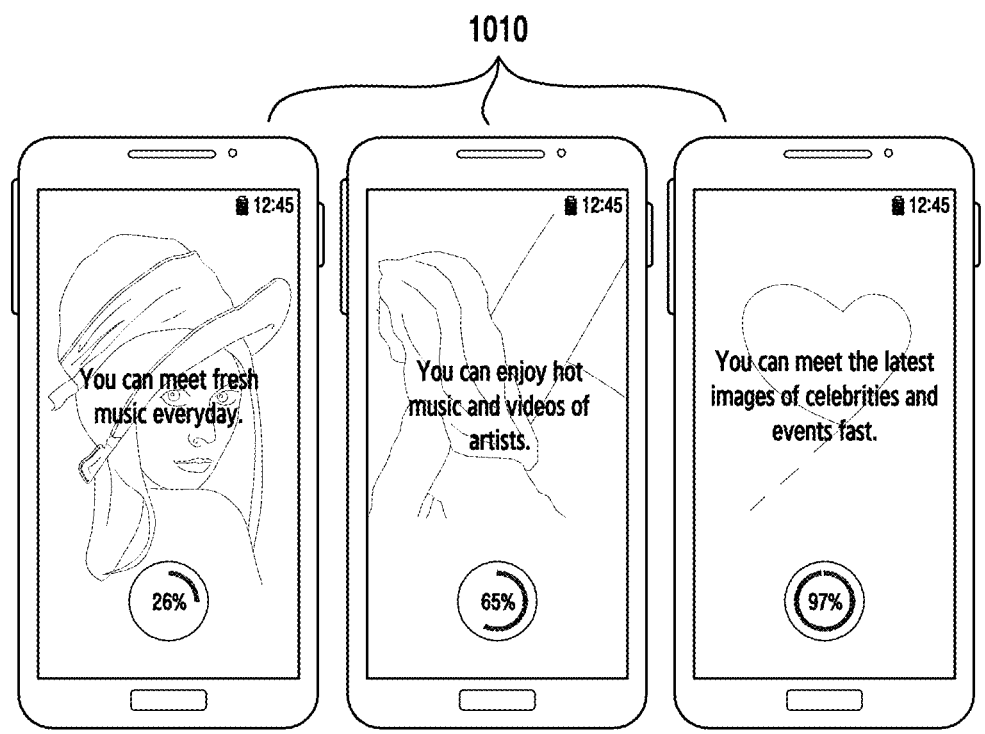
Figure 10C:
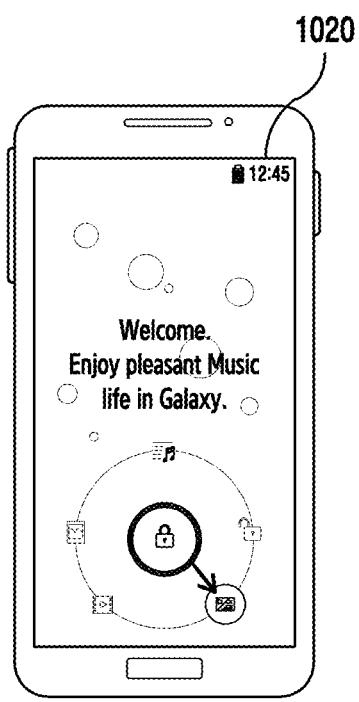

FIG. 9 is a flowchart illustrating a process of providing content corresponding to an accessory device by an electronic device according to an embodiment of the present disclosure. FIGS. 10A to 10C are diagrams illustrating screen configurations that provide content corresponding to an accessory device, according to an embodiment of the present disclosure. Hereinafter, operations for providing content corresponding to an accessory device will be described, corresponding to operations 807 to 809 of FIG. 8. In the following description, the electronic device may include the electronic device 201 or at least a part (e.g., the processor 220) of the electronic device 201 of FIG. 2.

Referring to FIG. 9, the electronic device receives content identification information (or service identification information) from a first device when an accessory device is successfully authenticated (e.g., operation 805 of FIG. 8), in operation 901. When it is determined that authentication information provided from the first device 620 is available, the processor 220 may determine that the first device 620 is authenticated. When the authentication information (e.g., one or more out of a type of accessory, a type of content, and content-related information such as a resolution), which is received from the first device 620 based on identification information of the accessory device 610, corresponds to the capability of the electronic device 201 or matches information (e.g., additional information, accessory device type information, service type information, and the like) that is received from the accessory device 610 but is not transmitted to the first device 620, the processor 220 may determine that the authentication information is available. The processor 220 may receive, from the first device 620, a result value (e.g., an encrypted key value) obtained by performing authentication based on the identification information or security information of the accessory device 610, and may verify the corresponding result value using an authentication module so as to determine an availability. When it is determined that the authentication information received from the first device 620 is available, the processor 220 may determine that content or service-related information received from the first device 620 through the communication interface 270 is authenticated. The processor 220 may control the content or service-related information provided from the first electronic device 620 to be output in at least one form of an image, audio, or haptic feedback, so that a user recognizes the content or service related information. The processor 220 may control the display 260 to display information (e.g., a name, a version, and the like) related to content or an application corresponding to the accessory device 610. The processor 220 may control the display 260 to additionally display the information, such as terms for installing content or an application, the right of control, a privacy policy, and the like. When it is determined that the authentication information provided from the first device 620 is unavailable, the processor 220 may determine that the first device 620 is not authenticated. Accordingly, the processor 220 may discard the content or service-related information received from the first device 620 through the communication interface 270. The content or service related information may include identification information of the content, the name of an application, a URL, and the like.

The electronic device determines whether it is allowed to install content corresponding to the content identification information provided from the first device in operation 903. The processor 220 may determine an application or a function corresponding to the content identification information (e.g., content type information, dedicated application identification information, and the like) provided from the first device. The processor 220 may determine whether an application or content corresponding to the content identification information is installed, and may determine the version of the application or the content. When the application or the content corresponding to the content identification information is not installed, the processor 220 may install the application or the content corresponding to the content identification information. When the version of the application or the content corresponding to the content identification information is different from a version provided from the first device, the processor 220 may install the application or the content corresponding to the content identification information. The processor 220 may identify an application installed in the electronic device 201 based on a multipurpose internet mail extensions (MIME) type. The processor 220 may determine an application having an API corresponding to service identification information provided from the first device. The processor 220 may determine whether an application corresponding to the service identification information is installed based on whether the application corresponding to the service identification information is installed and on the version of the application. The processor 220 may control the display 260 to display a service screen 1000 for determining whether the content corresponding to content identification information (or service identification information) provided from the first device is installed, as shown in FIG. 10A. The service screen 1000 may include a change request button, start 1002 and a change restriction button, end 1004. The processor 220 may install the content corresponding to the content identification information when an input for the change request button, start 1002 is detected. The processor 220 may restrict or defer the installation of the content corresponding to the content identification information when an input for the change restriction button, end 1004 is detected.

When the electronic device determines to install the content corresponding to the content identification information, the electronic device transmits a content request signal to the first device 620 in operation 905.

The electronic device receives, from the first device 620, content corresponding to the content request signal, in operation 907. The content may be in the form of an application package (APK), a library, or a resource compressed file. Also, the content may further include detailed application information (e.g., a version, an issuing date, a supported language, a device operation policy, and the like). The detailed application information may determine whether to install a corresponding application that has been installed in the electronic device.

The electronic device installs the content received from the first device 620 in the electronic device, in operation 909. The processor 220 may control the display 260 to display a progress 1010 of the installation of the content corresponding to the content request signal, as shown in FIG. 10B. When it is determined that an application is an old version based on service policy information installed in the electronic device 201, the processor 220 may delete the corresponding application and may install a new version of an application.

In operation 911, when it is determined that the installation of the content is not allowed or when the content corresponding to the content identification information is installed, the electronic device may determine whether to activate the content. The processor 220 may detect reference information for activating the content from service policy information. The processor 220 may determine whether state information (e.g., a time or a location) of the electronic device 201 corresponding to the reference information for activating the content is detected. The processor 220 may control the communication interface 270 to transmit the state information (e.g., a time or a location) of the electronic device 201 to the first device 620 or the second device 630. The processor 220 may determine whether an activation signal of the content is received from the first device 620 or the second device 630 through the communication interface 270.

When it is determined to active the content, the electronic device outputs the content in operation 913. The processor 220 may control the display 260 to display a service screen 1020 of a theme corresponding to the accessory device, as shown in FIG. 10C.

According to an embodiment of the present disclosure, the electronic device may automatically install the content or application corresponding to the accessory device based on a service type corresponding to the accessory device when a service type included in service identification information of the content corresponding to the accessory device is a setup wizard or theme service-related information. That is, the processor 220 may automatically transmit a content request signal to the first device 620 without a user input. When application identification information corresponding to the accessory device 610 is received from the first device 620, the processor 220 may install the corresponding application automatically or in response to a user input.

According to an embodiment of the present disclosure, the electronic device may output notification information associated with deletion or installation information of content or an application.

According to an embodiment of the present disclosure, the electronic device 600 is allowed to install a corresponding content based on content identification information provided from the first device 620, and may be provided with the content corresponding to the content identification information from the first device 620 (or second device 630) and install the same when it is allowed to activate the content.

According to an embodiment of the present disclosure, the electronic device 600 may be allowed to install a corresponding content by receiving the same from the accessory device 610 or based on content identification information stored in advance in the memory of the electronic device 600 associated with the accessory device 610, and may be provided with and install at least one piece of content corresponding to the content identification information from the first device 620 (or the second device 630) at or before a point in time when it is allowed to activate the content.

Figure 11:
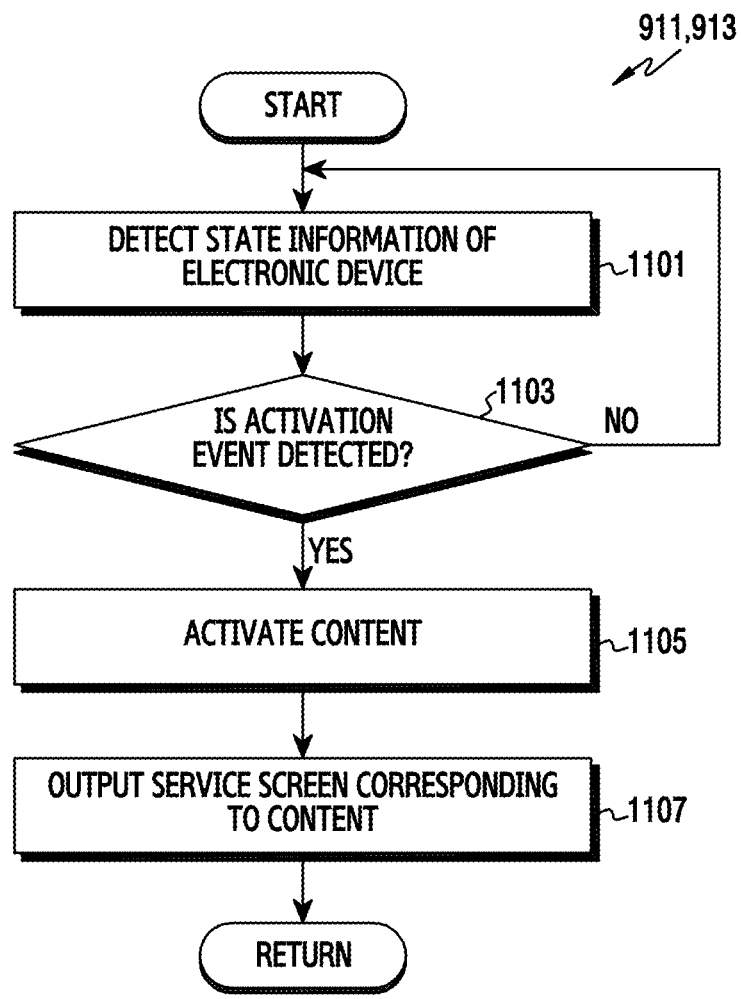
FIG. 11 is a flowchart illustrating a process of selectively providing content based on state information of an electronic device according to an embodiment of the present disclosure.

FIG. 11 is an example of a flowchart illustrating a process of selectively providing content based on state information of an electronic device according to an embodiment of the present disclosure. Hereinafter, operations for providing content corresponding to an accessory device will be described, corresponding to operations 911 to 913 of FIG. 9. In the following description, the electronic device may include the electronic device 201 or at least a part (e.g., processor 220) of the electronic device 201 of FIG. 2.

Referring to FIG. 11, the electronic device detects state information of the electronic device in operation 1101. The processor 220 may detect time information or location information using at least one sensor electrically connected to the electronic device 201.

The electronic device determines whether an event of activating content occurs based on the state information of the electronic device in operation 1103. The processor 220 may determine whether a time or a location of the electronic device 201 corresponding to service policy information is detected. When the state information of the electronic device 201 that corresponds to the service policy information is detected, the processor 220 may determine that the event for activating content has occurred.

When it is determined that the event for activating content has not occurred, the electronic device detects state information of the electronic device again in operation 1101. The processor 220 may detect the state information of the electronic device 201 periodically.

When it is determined that the event for activating content has occurred, the electronic device activates content corresponding to an accessory device in operation 1105. When the event for activating the content corresponding to the accessory device 610 has occurred, the processor 220 may activate an application or a function for providing the content.

The electronic device outputs a service screen of the content corresponding to the accessory device in operation 1107. When an electronic device cover associated with a concert by a predetermined singer is installed to the electronic device 201, the processor 220 may receive content related to the concert (e.g., notification information, schedule information corresponding to a scheduler, and a concert-related multimedia or application) from the first device 620 or the second device 630 and install the same. When the electronic device 201 is located in a place where the concert is given at the show time, the processor 220 may execute an application related to the concert (e.g., event information, an advertisement, an electronic display board function application, or a group message), may change a background screen to be related to the concert, or may provide a multimedia reproduction service or a real-time streaming service. Alternatively, when the show time is near, the processor 220 may provide an information service associated with the location of the concert by executing a map application.

According to an embodiment of the present disclosure, when the state information of the electronic device 201, which corresponds to the service policy information, is detected, the processor 220 determines and provides content appropriate for the state information of the electronic device 201 in operation 1105 of FIG. 11. When the time and place do not correspond to the service policy information, the processor 220 provides a first content. When the time and place correspond to the service policy information, the processor provides a second content. Also, when the time is before the show time and the place is the corresponding place based on the service policy information, the processor 220 may provide a third content. When the time is after the show time and the place is the corresponding place, the processor 220 may provide a fourth content. For example, content may be selected based on a service policy corresponding to the accessory device 610 connected to the electronic device 201, and based on state information detected by the electronic device 201.

Figure 12:
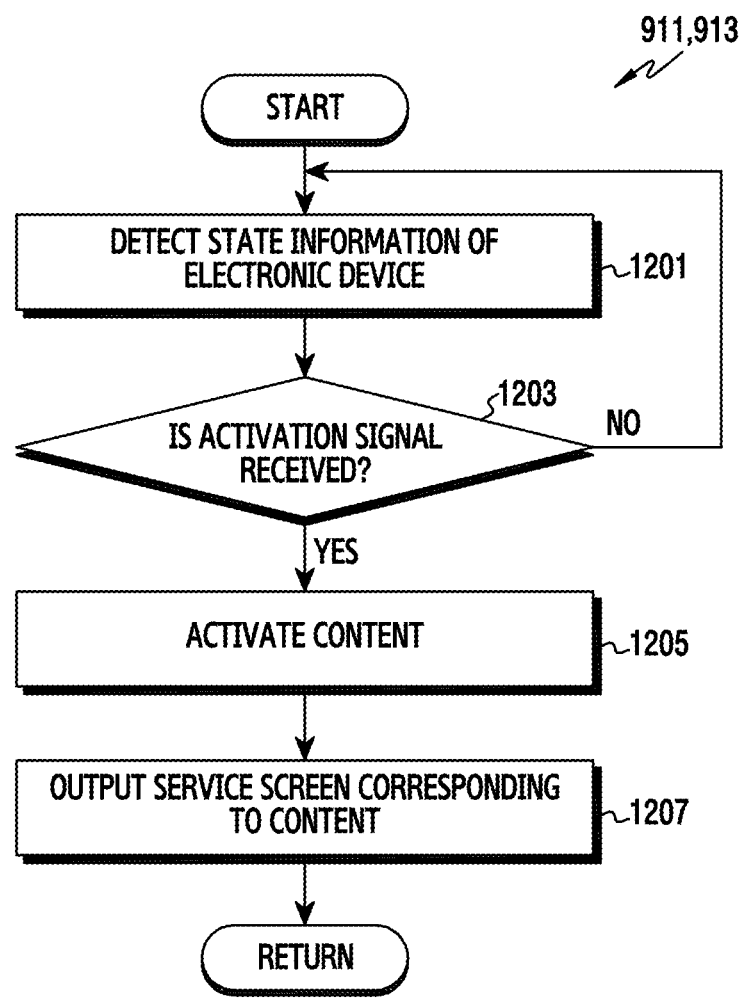
FIG. 12 is a flowchart illustrating a process of selectively providing content based on state information by an electronic device according to another embodiment of the present disclosure.

FIG. 12 is another example of a flowchart illustrating a process of selectively providing content based on state information by an electronic device according to an embodiment of the present disclosure. Hereinafter, operations for providing content corresponding to an accessory device will be described, corresponding to operations 911 to 913 of FIG. 9. In the following description, the electronic device may include the electronic device 201 or at least a part (e.g., the processor 220) of the electronic device 201 of FIG. 2.

Referring to FIG. 12, the electronic device transmits state information of the electronic device to a first device in operation 1201. The processor 220 may control the communication interface 270 to periodically transmit, to the first device 620, time information or location information detected using at least one sensor electrically connected to the electronic device 201. When the state information of the electronic device 201 is changed, the processor 220 may control the communication interface 270 to transmit the changed state information (e.g., time information or location information) to the first device 620.

The electronic device determines whether an activation signal is received from the first device in operation 1203. The processor 220 may determine whether the activation signal of content is received from the first device 620 through the communication interface 270.

When the activation signal of content is not received, the electronic device may transmit state information of the electronic device again in operation 1201. When the activation signal is not received until a reference time has elapsed from a point in time when the state information of the electronic device 201 is transmitted, or when a deactivation maintain signal is received, the processor 220 may maintain content in a deactivated state. The processor 220 may determine whether an event for transmitting state information of the electronic device 201 occurs. When such an event is detected, the processor 220 may transmit state information of the electronic device 201 to the first device 620. The event for transmitting state information of the electronic device 201 may occur based on a transmission period of state information or on whether state information has changed.

When the activation signal of content is received, the electronic device activates content corresponding to an accessory device connected to the electronic device in operation 1205.

The electronic device outputs a service screen of the content corresponding to the accessory device in operation 1207.

According to an embodiment of the present disclosure, the electronic device may deactivate the content based on the state information of the electronic device. The processor 220 may activate the content corresponding to the accessory device based on the state information of the electronic device 201. When the state information of the electronic device 201 which corresponds to the activated content is not detected based on a change in the state information of the electronic device 201, the processor 220 may deactivate the corresponding content.

According to an embodiment of the present disclosure, transmission of state information of an electronic device and activation/deactivation of content based on the state information may be controlled based on service policy information stored in a memory of the electronic device. When the activation signal of content is received, the electronic device may receive at least one of content and service policy information of the corresponding content, and may store the same in the memory of the electronic device in operation 1205 of FIG. 12.

Figure 13:
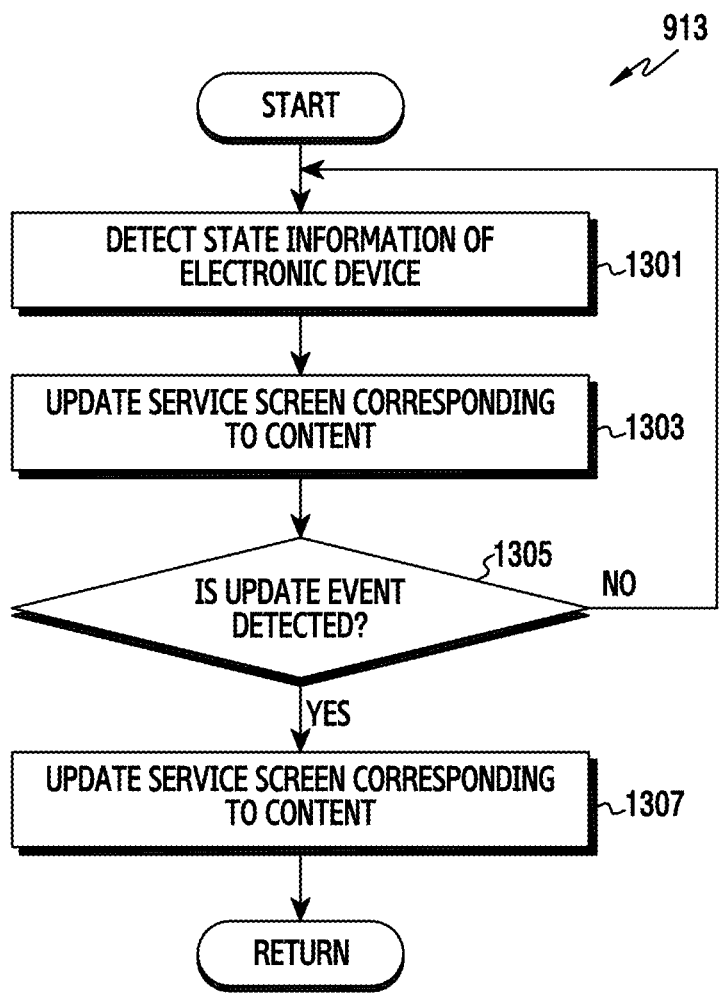
FIG. 13 is a flowchart illustrating a process of updating content corresponding to an accessory device by an electronic device according to an embodiment of the present disclosure.

FIG. 13 is an example of a flowchart illustrating a process of updating content corresponding to an accessory device by an electronic device according to an embodiment of the present disclosure. FIGS. 15A to 15D are diagrams illustrating screen configurations that update content corresponding to an accessory device, according to an embodiment of the present disclosure. Hereinafter, operations for providing content corresponding to an accessory device will be described, corresponding to operations 913 of FIG. 9. In the following description, the electronic device may include the electronic device 201 or at least a part (e.g., processor 220) of the electronic device 201 of FIG. 2.

Referring to FIG. 13, the electronic device detects state information of the electronic device when content corresponding to an accessory device is activated (e.g., operation 911 of FIG. 9) in operation 1301. The processor 220 may detect time information or location information of the electronic device 201 using at least one sensor electrically connected to the electronic device 201.

The electronic device outputs content corresponding to the accessory device based on the state information of the electronic device in operation 1303. That is, the processor 220 controls outputting of the content corresponding to the accessory device based on the state information of the electronic device, according to service policy information of the content in operation 1303. The processor 220 may receive a plurality of pieces of content from the first device 620 or the second device 630. The processor 220 may select a piece of content corresponding to the state information of the electronic device 201, from among the plurality of pieces of content corresponding to the accessory device 610. The processor 220 may control the display 260 to display a service screen of the content corresponding to the state information of the electronic device 201.

The electronic device determines whether a content update event occurs based on the state information of the electronic device in operation 1305. The processor 220 may determine whether state information of the electronic device 201 is detected, which corresponds to content different from content currently output in the electronic device 201 among the plurality of pieces of content corresponding to the accessory device 610.

Figure 15A:
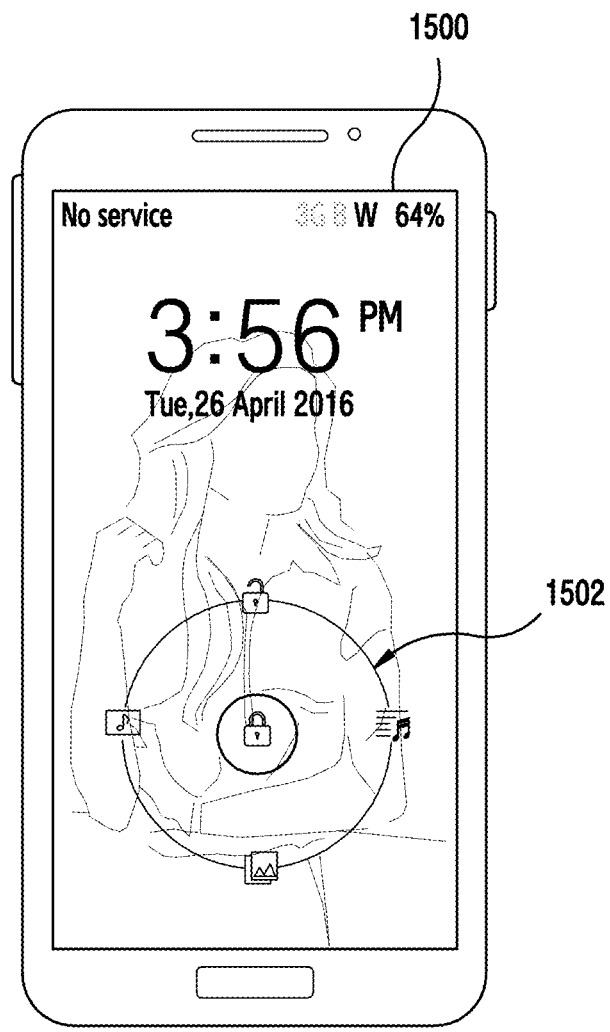
FIGS. 15A to 15D are diagrams illustrating screen configurations that update content corresponding to an accessory device, according to an embodiment of the present disclosure.

When the occurrence of the content update event is detected, the electronic device updates the content corresponding to the accessory device based on the state information of the electronic device in operation 1307. The processor 220 may receive a plurality of lock screens (e.g., FIGS. 15A to 15D) corresponding to the accessory device 610 connected to the electronic device 201 from the first device 620 or the second device 630 through the communication interface 270. The processor 220 may control the display 260 to display a first lock screen 1500 corresponding to the location information of the electronic device 201 from among a plurality of background screens corresponding to the accessory device 610, as shown in FIG. 15A. When the location of the electronic device 201 is changed, the processor 220 may control the display 260 to change the lock screen of the electronic device 201 to a second lock screen 1510 which corresponds to changed location information of the electronic device 201, from among the plurality of lock screens corresponding to the accessory device 610.

Figure 15B:
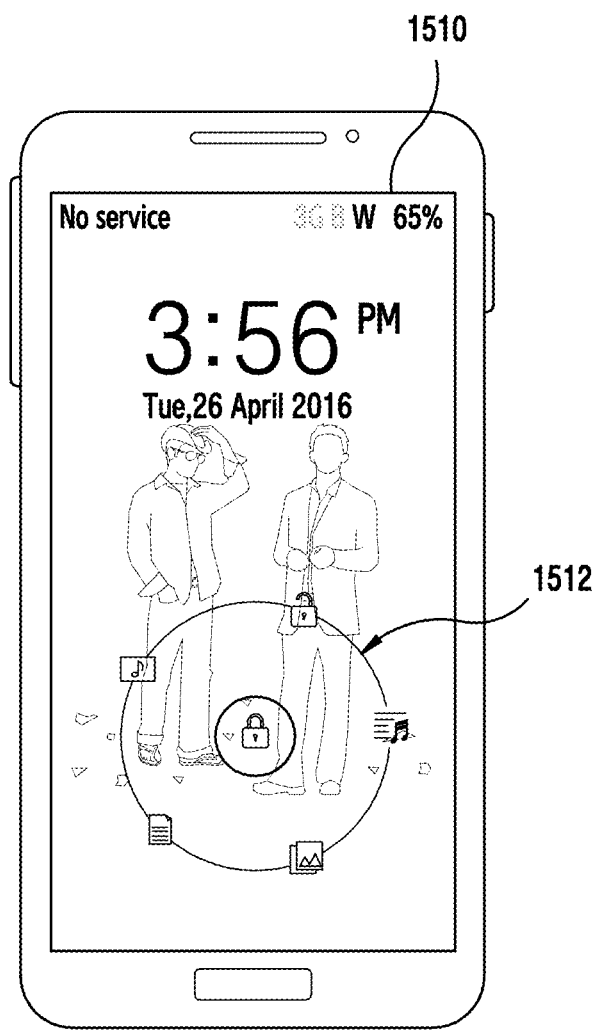

According to an embodiment of the present disclosure, when the lock screen of the electronic device 201 is changed, the processor 220 may change a widget 1502 displayed on the first lock screen 1500 of FIG. 15A to a widget 1512 corresponding to the second lock screen 1510, as shown in FIG. 15B. The widget 1502 of FIG. 15A displays a service shortcut key (e.g., an icon) that performs unlocking, searches a music list, and selects (inputs a touch on a display) and drives an image viewer or a music player. The widget 1512 of FIG. 15B displays a service shortcut key for editing documents, in the widget 1502 of FIG. 15A. When the lock screen of the electronic device 201 is changed, the processor 220 may maintain the widget 1502 displayed in the first lock screen 1500 of FIG. 15A even in a third lock screen 1520, as shown in a widget 1522 of FIG. 15C. For example, a lock screen or a widget may be changed when the processor 220 detects a change in the state of the electronic device 201, when the right to use content is changed, or when service policy information of content corresponding to the accessory device 610 is changed in the first device 620 (e.g., updating of content received from the second device 630).

Figure 14A:
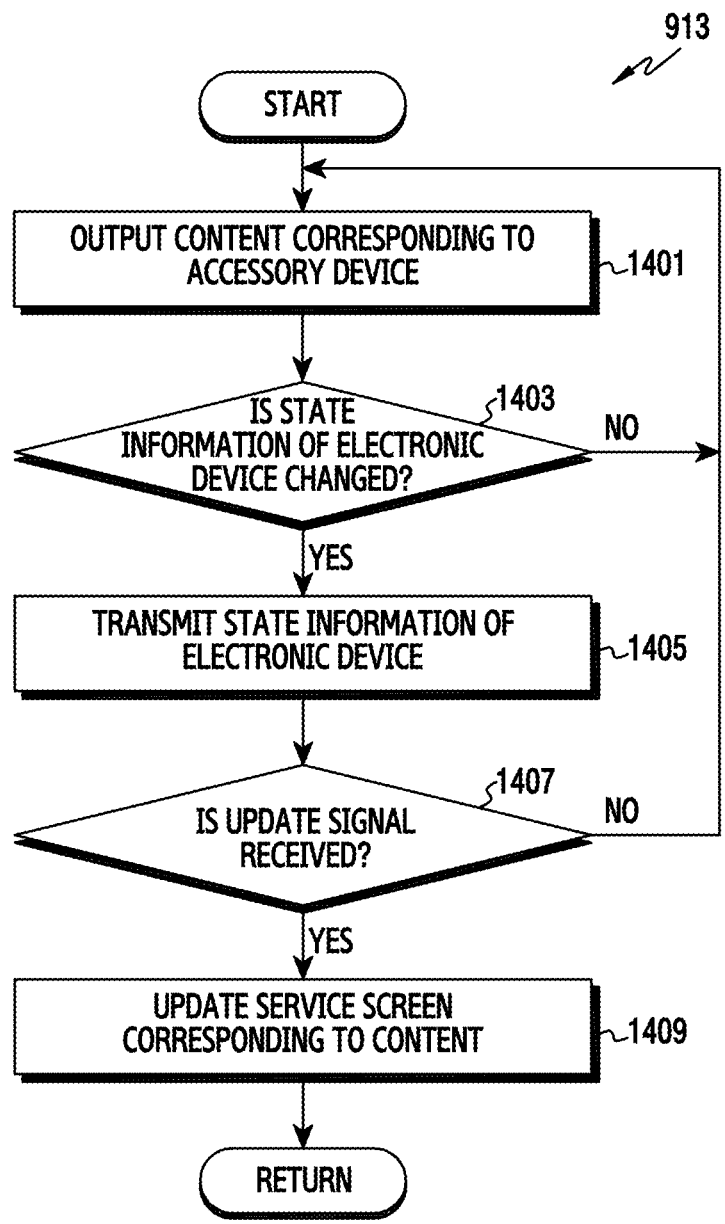
FIG. 14A is a flowchart illustrating a process of updating content corresponding to an accessory device by an electronic device according to another embodiment of the present disclosure.
Figure 14B:
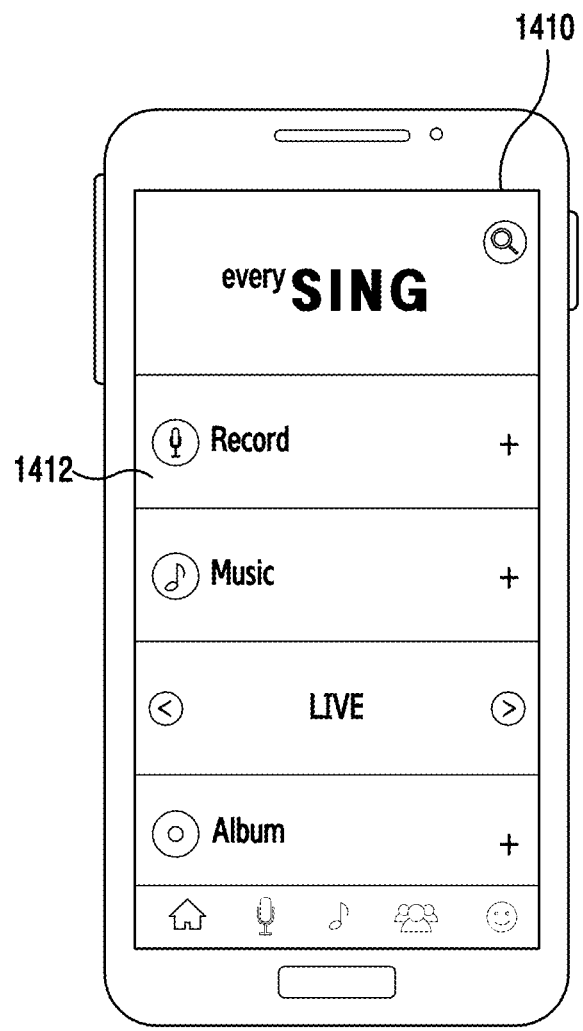
FIGS. 14B to 14H illustrate content configurations of a theme-service-related screen, according to an embodiment of the present disclosure.
Figure 14C:
Figure 14D:
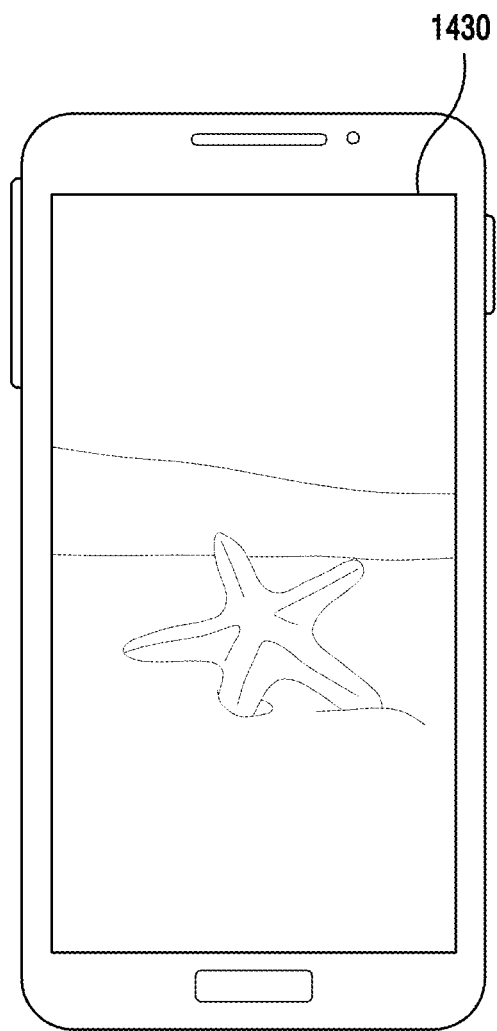
Figure 14E:
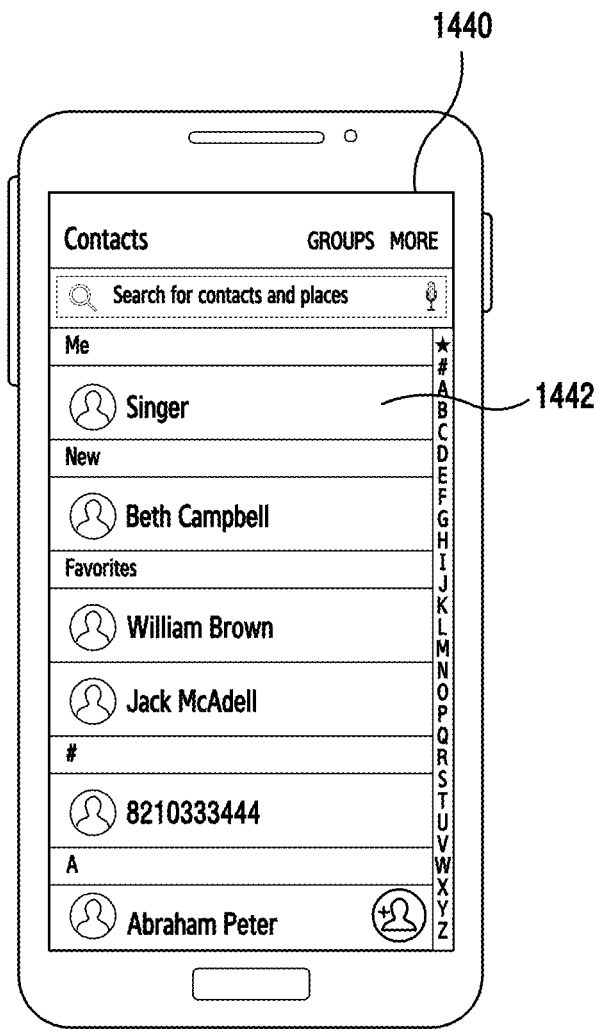
Figure 14F:
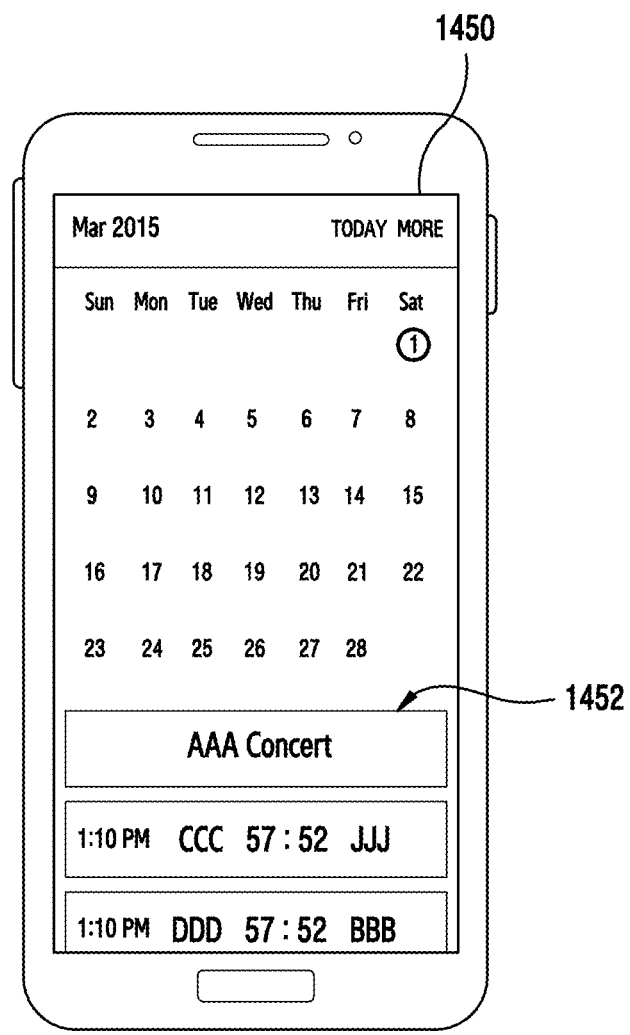
Figure 14G:
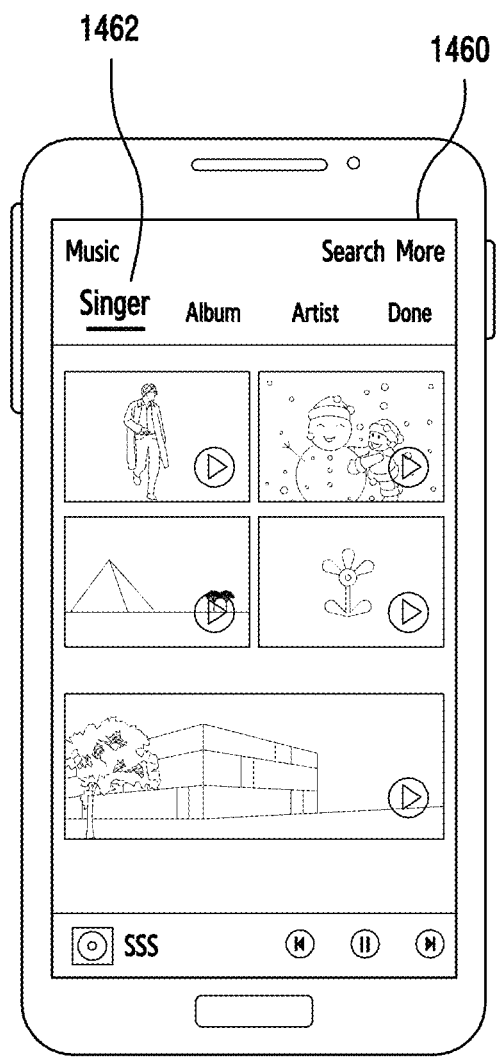
Figure 14H:
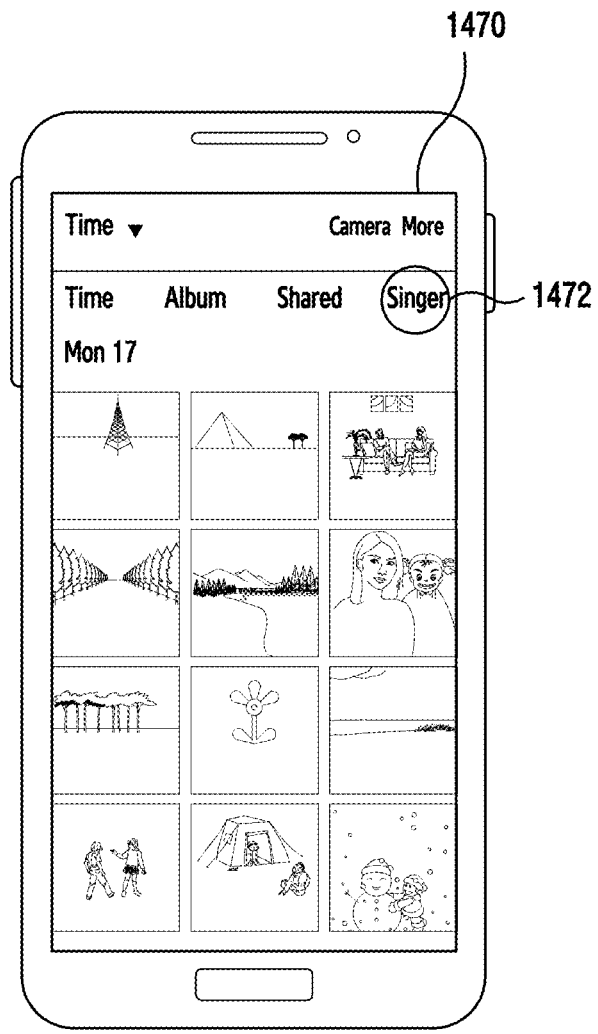

FIG. 14A is a flowchart illustrating a process of updating content corresponding to an accessory device by an electronic device according to another embodiment of the present disclosure. FIGS. 14B to 14H illustrate content configurations of a theme-service-related screen, according to an embodiment of the present disclosure. Hereinafter, operations for providing content corresponding to an accessory device will be described, corresponding to operation 913 of FIG. 9. In the following description, the electronic device may include the electronic device 201 or at least a part (e.g., processor 220) of the electronic device 201 of FIG. 2.

Figure 15C:
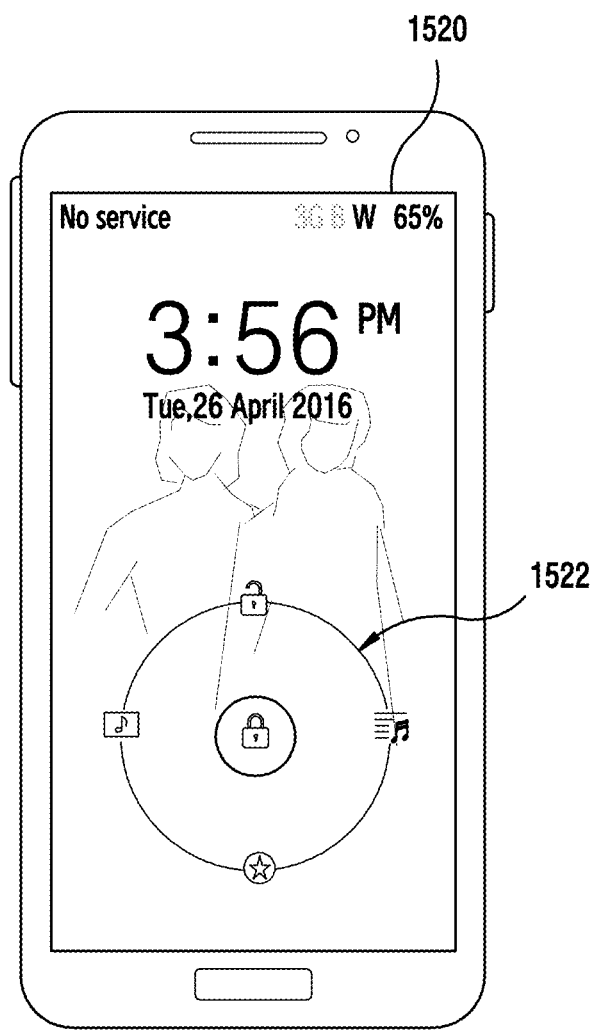

Referring to FIG. 14A, when content corresponding to an accessory device is activated (operation 911 of FIG. 9), the electronic device outputs the content corresponding to the accessory device in operation 1401. The processor 220 may control the display 260 to display content corresponding to content identification information provided from the first device 620 as a lock screen 1520 of the electronic device 201, as illustrated in FIG. 15C.

The electronic device determines whether state information of the electronic device is changed in operation 1403. The processor 220 may determine whether location information of the electronic device 201 is changed using at least one sensor electrically connected to the electronic device 201. The location information of the electronic device 201 may include an area or a place where the electronic device 201 is located.

In operation 1401, the electronic device maintains output of the content corresponding to the accessory device when the state information of the electronic device is maintained.

In operation 1405, the electronic device transmits the state information of the electronic device to the first device when the state information of the electronic device is changed. When the location information of the electronic device 201, which has been detected using a sensor, is changed, the processor 220 may control the communication interface 270 to transmit the changed location information of the electronic device 201 to the first device 620.

In operation 1407, the electronic device determines whether a content update signal is received from the first device. When the content update signal is not received, the electronic device may maintain the content corresponding to the accessory device. Accordingly, the electronic device maintains output of the content corresponding to the accessory device in operation 1401.

Figure 15D:
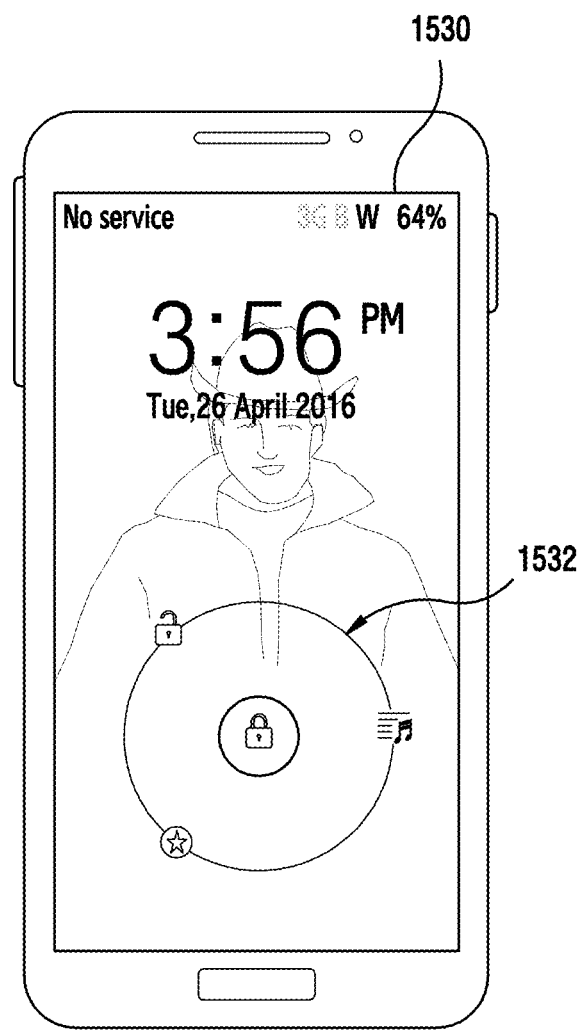

When the content update signal is received from the first device, the electronic device updates the content corresponding to the accessory device with content included in the content update signal in operation 1409. The first device 620 may determine whether to change the content based on a service policy of the content corresponding to the accessory device connected to the electronic device 201 and changed location information of the electronic device 201. When the first device 620 determines to change the content, the first device 620 transmits, to the electronic device 201, a content update signal including identification information of content to be used for changing. Accordingly, the processor 220 of the electronic device 201 may update the content corresponding to the accessory device 610 with the content received from the first device 620 through the communication interface 270. Particularly, the processor 220 may control the display 260 to change the lock screen of the electronic device 201 from the third lock screen 1520 of FIG. 15C to a fourth lock screen 1530 provided from the first device 620, as shown in FIG. 15D. In this instance, the processor 220 may change the widget 1522 displayed in the third lock screen 1520 to a widget 1532 corresponding to the fourth lock screen 1530, as shown in FIG. 15D.

According to an embodiment of the present disclosure, the electronic device may provide a plurality of pieces of content based on service identification information corresponding to an accessory device. The processor 220 may change a plurality of pieces of content from among a widget 1410 of a home screen, a lock screen display function 1420, a background screen display function 1430, an address book linkage 1440, an event schedule 1450, an application GUI 1460, and a gallery list 1470, to correspond to identification information of a theme service corresponding to the accessory device, as shown in FIGS. 14B to 14H. Based on an input for selecting a predetermined widget 1412, the processor 220 may execute a function associated with the corresponding widget 1412 out of the widgets 1410 of the home screen corresponding to the accessory device. The processor 220 may add a phone number 1442 of a user or a user group (e.g., a singer) corresponding to the accessory device to an address book of the electronic device 201. The processor 220 may add an event 1452 (e.g., a concert event) corresponding to the accessory device to a schedule list of the electronic device 201. The processor 220 may add, to the service screen 1460 of a multimedia application, a dedicated icon 1462 including a multimedia list related to a user (e.g., a singer) corresponding to the accessory device. The processor 220 may add, to the service screen 1470 of a gallery application, a dedicated icon 1472 including an image related to a user (e.g., a singer) corresponding to the accessory device. Also, the processor 220 may change a plurality of pieces of content from among an always-on display (AOD) function, a background image of a messenger application, an icon, a messenger group, and an audio file. Therefore, a single piece of service identification information may include a plurality of pieces of related service identification information, thereby being associated with a plurality of pieces of content identification information.

According to an embodiment of the present disclosure, the electronic device may operate content corresponding to an accessory device by linking the content with an application or a function installed in the electronic device. When an accessory device that provides an entertainment theme is connected to the electronic device 201, the processor 220 may detect and control an application or a function associated with the entertainment theme from among applications or functions installed in advance on the electronic device 201, using service identification information. To enable content corresponding to the entertainment theme to be used through the application or the function associated with the entertainment theme, the processor 220 may add a software module that interoperates with the corresponding application or function, and may control the same using service control policy information. The processor 220 may configure or change service identification information (e.g., content identification information (e.g., image or animation-related information) related to a background screen service or a lock screen service) associated with the theme service provided by the accessory device. The processor 220 may change a lock screen service or a background screen service based on a time or a place. The processor 220 may provide a user-customized page based on an accessory device. Particularly, the processor 220 may control the display 260 to display a service screen corresponding to an accessory device in an initial screen of a web browser. The processor 220 may periodically update the corresponding service screen by interoperating with the first device 620. The processor 220 may provide a user-customized widget based on an accessory device. Particularly, the processor 220 may control the display 260 to display a dedicated widget corresponding to an accessory device in at least one of a home screen, a standby screen, and a lock screen. The processor 220 may update the corresponding dedicated widget by interoperating with the first device 620, periodically or in real time. The processor 220 may operate content corresponding to an accessory device by linking with a multimedia application. Particularly, the processor 220 may generate a dedicated icon or a list for managing a multimedia content (e.g., an image, a video, a music, and the like) associated with a celebrity corresponding to an accessory device, in a multimedia reproduction application. The processor 220 may provide content searchable in an electronic device to which an accessory device is connected. Particularly, when an accessory device corresponding to a predetermined movie is connected to the electronic device 201, the processor 220 may provide at least one of a closed-door still shot, a closed-door director's video, and a closed-door audio.

Alternatively, when an accessory device corresponding to a multimedia content is connected to the electronic device, the processor 220 may provide content having a long run time, content having a high resolution, or content having a high-quality picture. The processor 220 may link content corresponding to the accessory device with a search about a related product (e.g., an album, a ticket, a character product, clothes, and the like) and an online service. The processor 220 may add a dedicated service corresponding to the content corresponding to the accessory device to an application previously installed in the electronic device 201. Particularly, the processor 220 may display an advertisement or an event schedule corresponding to the accessory device in a service screen of the previously installed application, in the form of an overlay, a multi-window, a banner, and the like. Display of the content, as described above, may be controlled based on whether the accessory device is connected to the electronic device according to service policy information. Also, control, as described above, may include control schemes different for each group of predetermined pieces of content out of a plurality of pieces of content.

Figure 16:
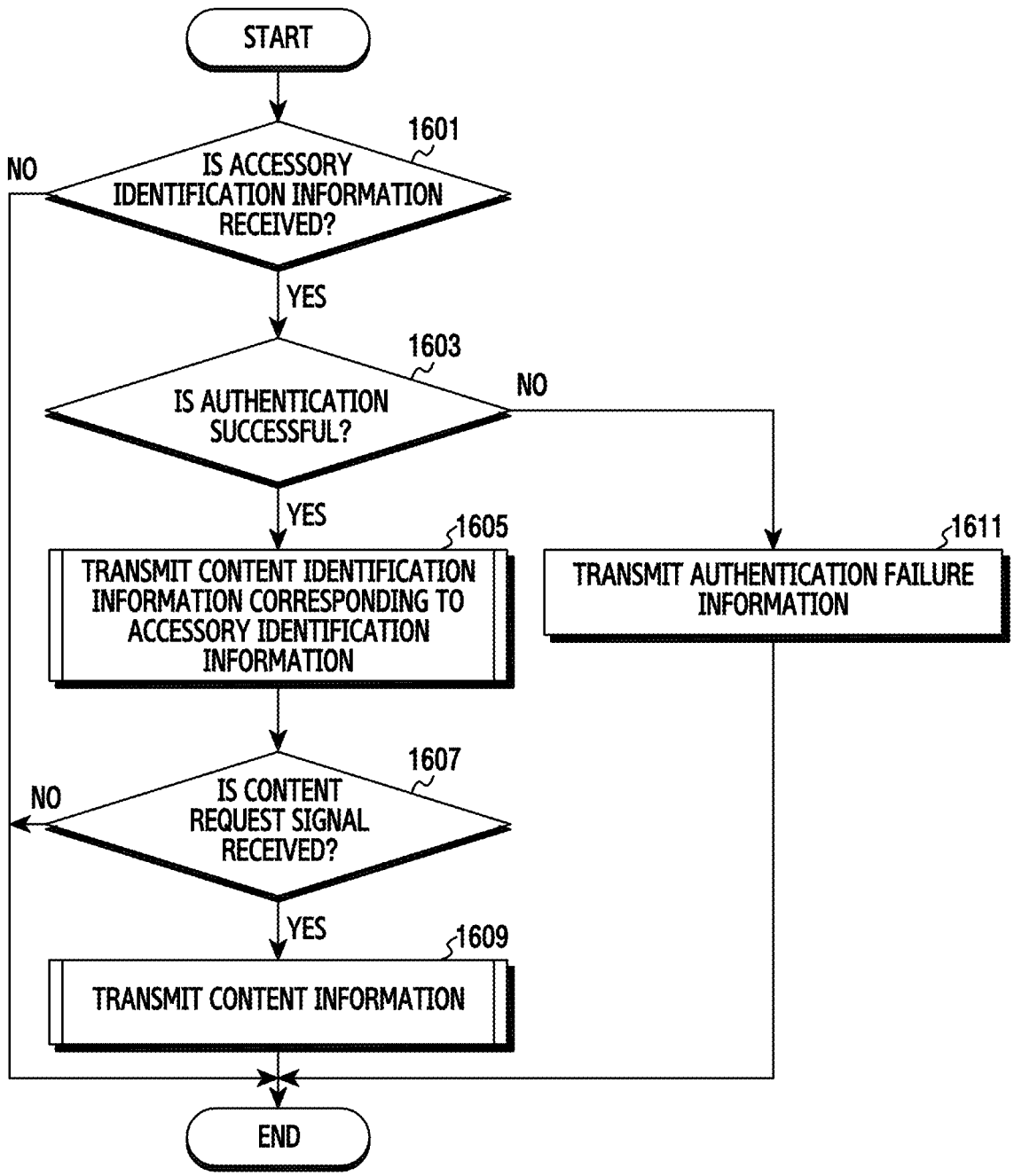
FIG. 16 is a flowchart illustrating a process in which a first device performs a service corresponding to an accessory device, according to an embodiment of the present disclosure.

FIG. 16 is a flowchart illustrating a process in which a first device performs a service corresponding to an accessory device, according to an embodiment of the present disclosure. Hereinafter, the first device may include the first device 501 of FIG. 5 or at least a part (e.g., the processor 520) of the first device 501.

Referring to FIG. 16, the first device determines whether identification information of an accessory device is received from an electronic device in operation 1601. The processor 520 may determine whether identification information of the accessory device 610, connected to the electronic device 600, is received through the communication interface 570 from the electronic device 600 that is registered (e.g., registration of service account information (e.g., a Google™ account for an Android™ smart phone, a manufacturer service subscriber account, an iCloud™ account, and the like), registration of identification, or registration of a user) to the first device 501.

When identification information of an accessory device is received from the electronic device, the first device determines whether authentication of the accessory device is allowed in operation 1603. When the identification information of the accessory device 610 is received through the communication interface 570, the processor 520 may determine whether the identification information or security information of the accessory device 610 is included in a service list of the first device 501. When the identification information of the corresponding accessory device 610 is included in the service list of the first device 501, the processor 520 may determine whether the accessory device 610 is successfully authenticated by applying an authentication algorithm to the identification information of the accessory device 610. The processor 520 may authenticate the accessory device 610 based on security information associated with the accessory device 610, instead of the identification information of the accessory device 610. The processor 520 may authenticate the accessory device 610 using the identification information of the accessory device 610 together with the security information.

According to an embodiment of the present disclosure, the processor 520 may determine the availability of a service according to a service policy corresponding to the accessory device 610 when the accessory device 610 is successfully authenticated. In association with determination of the availability of the service (e.g. right), the processor 520 may determine whether the identification information or the security information of the accessory device 610 associated with the electronic device 600 overlaps identification information or security information of an accessory device installed on another electronic device. When no other accessory device that overlaps the successfully authenticated accessory device 610 exists, the processor 520 may determine that the corresponding accessory device 610 is available. When another accessory that overlaps the successfully authenticated accessory device 610 exists, the processor 520 may determine whether two accessory devices are connected or installed to different respective electronic devices. Even if it is determined that the two accessory devices are connected or installed to different electronic devices, respectively, at the same time, when the identification information corresponds to identification information of an accessory device that is allowed to a plurality of electronic devices (e.g., group allocation identification information for the same guild, members of the same group, or subscribers of the same SNS group), the processor 520 may determine that the corresponding accessory device 610 is available.

When it is determined that the identification information corresponds to identification information of an accessory device allowed to a plurality of electronic device, the processor 520 may calculate the number of electronic devices associated with the identification information of the same accessory device based on service policy information, and may change service identification information or content identification information based on the number. For example, a control command may be transferred to the electronic device 501 or the second device 630 to enable members of the same guild including game users who use the same accessory and join in combat in the same area, to change a game-related content (e.g., a parameter, such as striking power, defensive power, agility, and the like, the effect of the use of an item, an item, and the like) according to the number of the users. For example, a control command may be transferred to the electronic device 501 or the second device 630, in order to change content (e.g., a video quality, the number of downloadable sound sources, a multimedia playback time length (duration), and the like) according to the number of users (or the number of electronic devices to which the accessory is installed) when a celebrity's fan club members who use the same accessory coexist in a predetermined area.

According to an embodiment of the present disclosure, when a plurality of different electronic devices or pieces of user identification information associated with the successfully authenticated accessory device 610 is detected, the processor 520 may transfer the right to use content to the corresponding accessory device 610. When the right to use content is transferred, the processor 520 may determine that the corresponding accessory device 610 is available.

According to an embodiment of the present disclosure, in association with determining of the availability of the right to use content, the processor 520 may determine whether an accessory device type of the accessory device 610 corresponding to the identification information of the accessory device 610 matches a device type of the electronic device 600. When the accessory device type of the accessory device 610 (e.g., a portable phone cover model) matches a device type of the electronic device 600 (e.g., a portable phone model), the processor 520 may determine that the corresponding accessory device 610 is available. That is, the processor 520 may determine the availability by determining whether an accessory device is designed to be appropriate for the size and the shape of a predetermined electronic device. When it is determined that the successfully authenticated accessory device 610 is available, the processor 520 may control the communication interface 570 to transmit authentication success information to the electronic device 600. When the identification information of the accessory device 610 is not included in a service list of the first device 501, the processor 520 may determine that the accessory device 610 is a non-authentic device. When it is determined that the successfully authenticated accessory device 610 is not available, the processor 520 may determine that the accessory device 610 may have been hacked or replicated.

When the accessory device identification information received from the electronic device is successfully authenticated, the first device transmits identification information of content corresponding to the identification information of the accessory device to the electronic device in operation 1605. The processor 520 may detect service identification information corresponding to the identification information of the accessory device 610 from the service list stored in the memory 530. The processor 520 may extract identification information of content that is connected with the service identification information. The processor 520 may control the communication interface 570 to transmit at least one of the service identification information or the identification information of the content to the electronic device 600.

The first device determines whether a content request signal is received from the electronic device in operation 1607. For example, after transmitting the content identification information (or service identification information) to the electronic device, the processor 520 may determine whether a content request signal is received within a reference time. When the content request signal is not received until the reference time has elapsed, the processor 520 may determine that the electronic device 600 does not provide content corresponding to the accessory device.

When the content request signal is received from the electronic device, the first device selects and transmits content corresponding to the content request signal to the electronic device in operation 1609. The processor 520 may select content corresponding to the content identification information of the content request signal from among a plurality of pieces of content stored in the memory 530. The processor 520 may control the communication interface 570 to transmit, to the electronic device 600, the content corresponding to the content identification information of the content request signal.

When authentication of the accessory device received from the electronic device fails, the first device transmits authentication failure information to the electronic device in operation 1611. When the authentication of the accessory device 610 fails, when it is determined that the accessory device 610 is not authentic, or when the accessory device 610 is hacked or replicated, the processor 520 may control the communication interface 570 to transmit authentication failure information to the electronic device 600.

Figure 17:
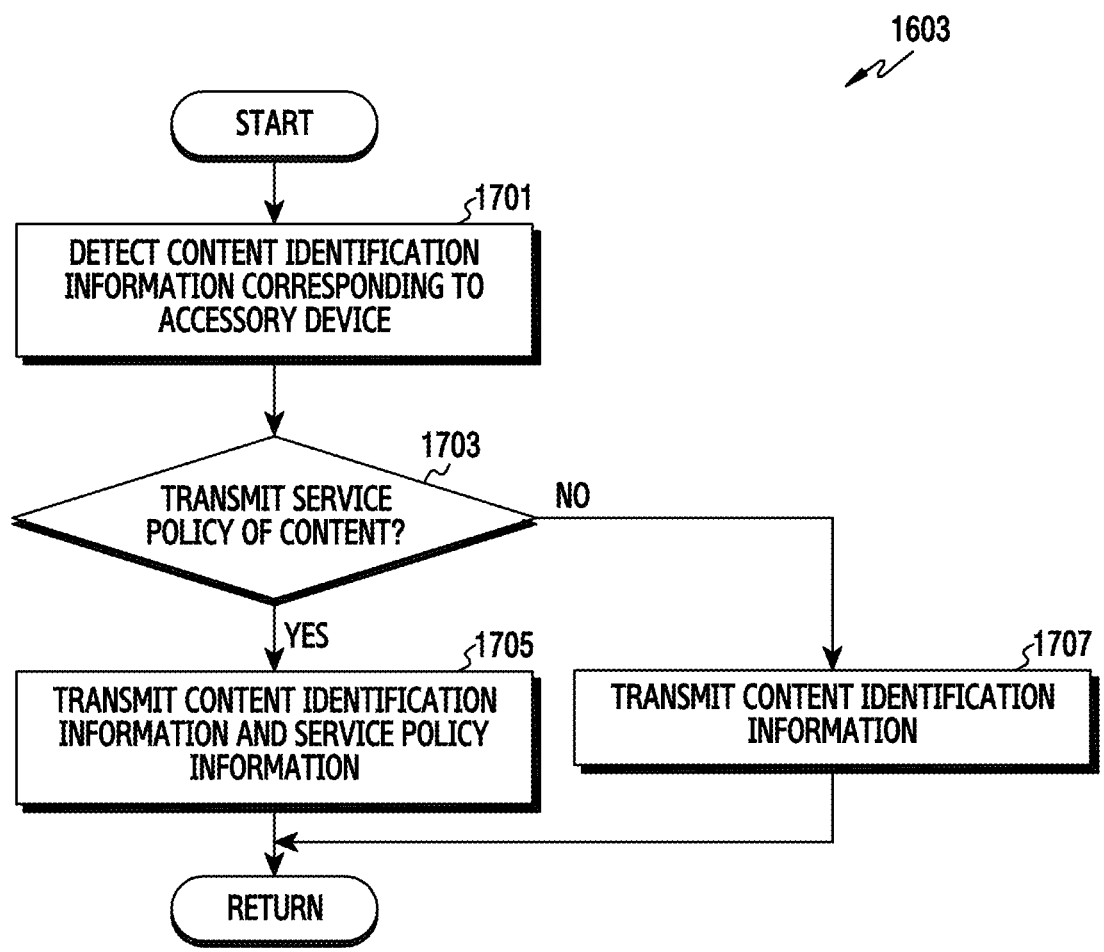
FIG. 17 is a flowchart illustrating a process of transmitting content corresponding to an accessory device and service policy information, by a first device according to an embodiment of the present disclosure.

FIG. 17 is a flowchart illustrating a process of transmitting content corresponding to an accessory device and service policy information, by a first device according to an embodiment of the present disclosure. Hereinafter, the operation of transmitting identification information of content corresponding to an accessory device in operation 1605 of FIG. 16, will be described. Hereinafter, a first device may include the first device 501 of FIG. 5 or at least a part (e.g., the processor 520) of the first device 501.

Referring to FIG. 17, when an accessory device connected to an electronic device is successfully authenticated (operation 1603 of FIG. 16), the first device detects identification information of content corresponding to the accessory device in operation 1701. The processor 520 may detect the identification information of the content corresponding to the identification information of the accessory device (or service identification information) from a service list determined through negotiation with the second device 630. The processor 520 may detect the identification information of the content corresponding to the accessory device by additionally taking into consideration additional information of the electronic device, which is provided from the electronic device.

The first device determines whether to transmit a service policy of the content corresponding to the accessory device, in operation 1703. The processor 520 may determine whether to transmit the service policy information based on the entity that controls the content corresponding to the accessory device 610. When the first device 501 controls driving the content corresponding to the accessory device 610, the processor 520 may determine not to transmit the service policy information. When the electronic device 600 controls driving the content corresponding to the accessory device 610, the processor 520 may transmit the service policy information.

When the first device determines to transmit the service policy information, the first device transmits the identification information of the content corresponding to the accessory device and the service policy information of the corresponding content to the electronic device in operation 1705. When the first device determines not to transmit the service policy information, the first device transmits the identification information of the content corresponding to the accessory device to the electronic device in operation 1707.

Figure 18:
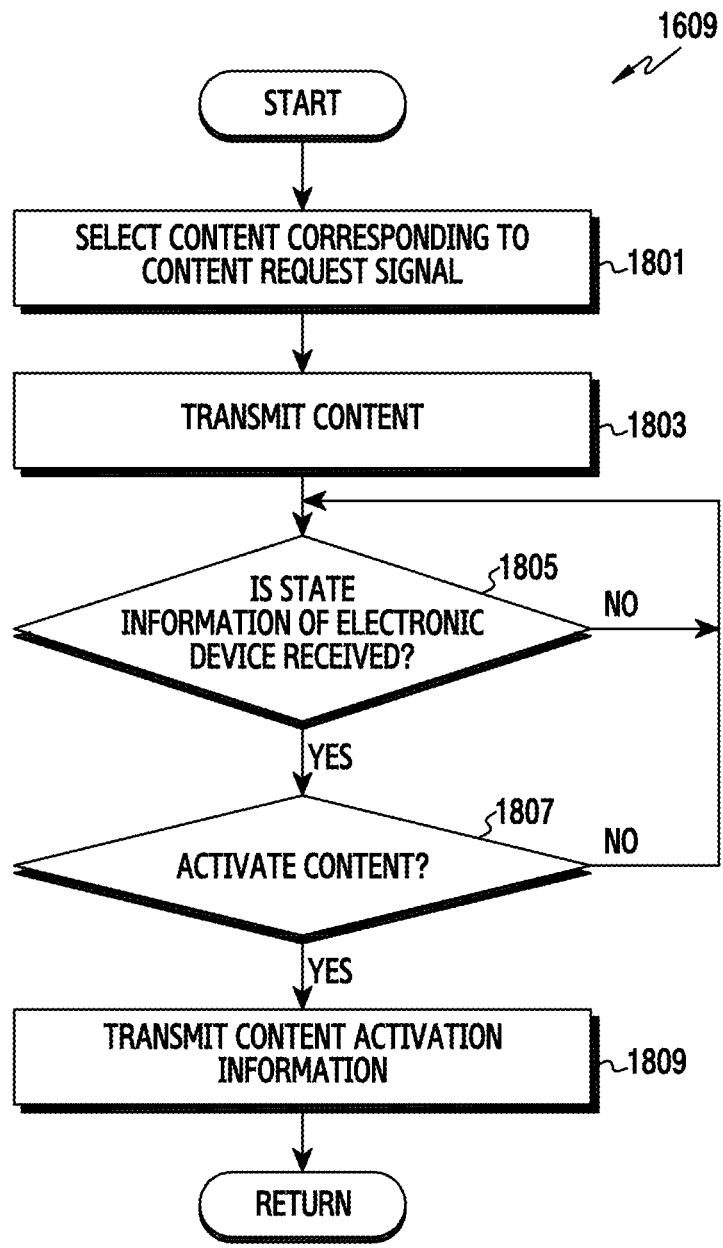
FIG. 18 is a flowchart illustrating a process in which a first device performs control to selectively provide content corresponding to an accessory device based on state information of an electronic device, according to an embodiment of the present disclosure.
Figure 19:
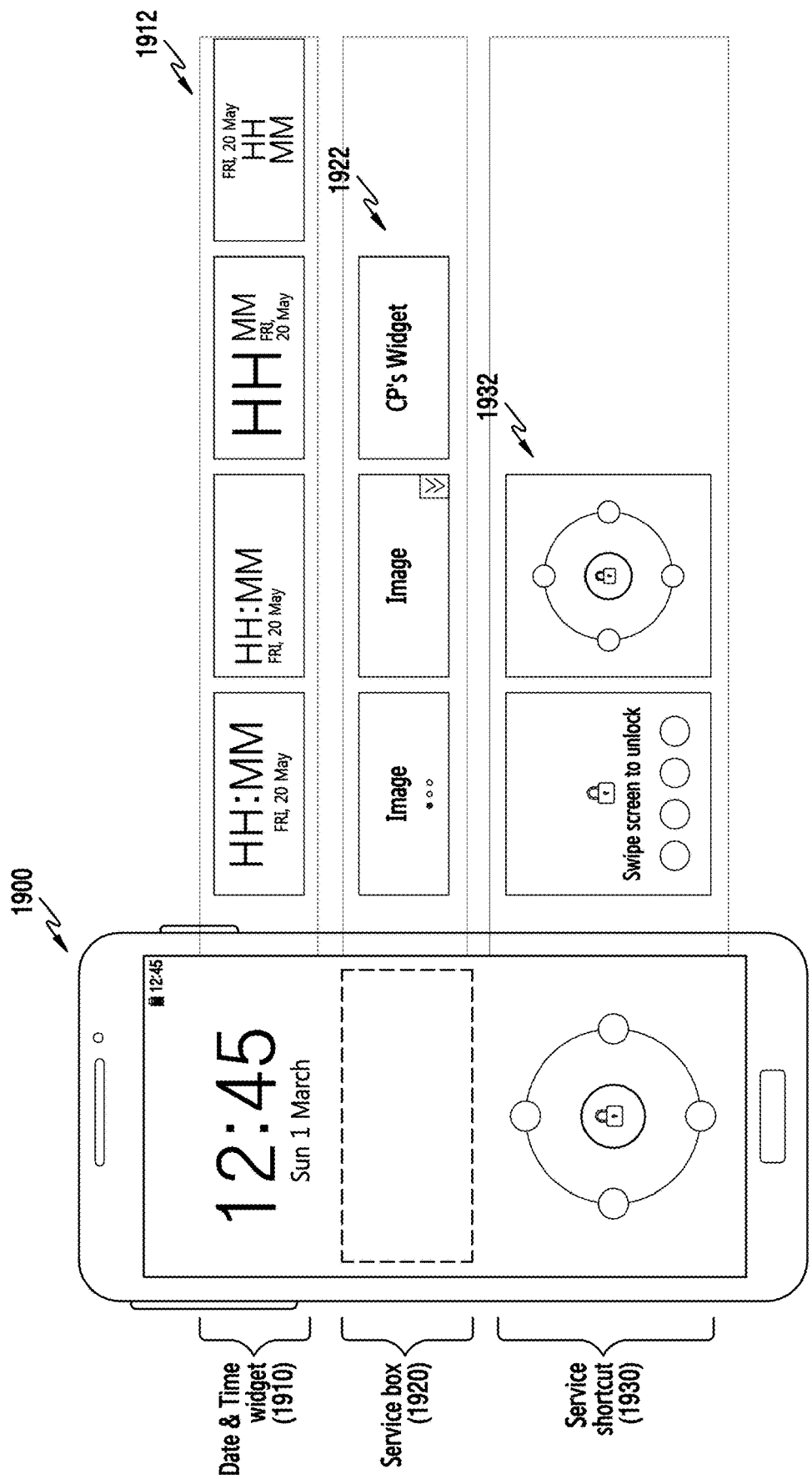
FIG. 19 is a diagram illustrating a configuration for selecting content corresponding to an accessory device, by a first device according to an embodiment of the present disclosure.

FIG. 18 is a flowchart illustrating a process in which a first device performs control to selectively provide content corresponding to an accessory device based on state information of an electronic device, according to an embodiment of the present disclosure. FIG. 19 is a diagram illustrating a configuration for selecting content corresponding to an accessory device, by a first device according to an embodiment of the present disclosure. Hereinafter, the operation of transmitting content to an electronic device in operation 1609 of FIG. 16 will be described. Hereinafter, the first device may include the first device 501 of FIG. 5 or at least a part (e.g., the processor 520) of the first device 501.

Referring to FIG. 18, when a content request signal is received from an electronic device (operation 1607 of FIG. 16), the first device selects content corresponding to the content request signal in operation 1801. The processor 520 may select content corresponding to content identification information included in the content request signal received from the electronic device 600. When a plurality of pieces of content corresponding to the content identification information exist, the processor 520 may select content corresponding to at least one of a device capability of the electronic device 600, an OS version based on a device ID, a display resolution, and an electronic device type of the electronic device 600. Particularly, the processor 520 may select a lock screen corresponding to an accessory device. In this instance, the lock screen may include at least one of a layout area 1910 for displaying weather and time widgets, a service box area 1920 for displaying an image or a widget, and a service shortcut key display area 1930 for displaying icons for selecting services (e.g., content or application). Each area 1910, 1920, or 1930 may include a plurality of pieces of content 1912, 1922, and 1932 corresponding to hardware specifications (e.g., a display resolution) of the electronic device 600. Accordingly, the processor 520 may select content corresponding to the hardware specifications of the electronic device 600 for each area where a lock screen may be configured.

According to an embodiment of the present disclosure, when a plurality of pieces of content corresponding to content identification information exist, the processor 520 may select content corresponding to state information of the electronic device 600. Based on time or place information that the electronic device 600 detects, one or more pieces of content may be selected out of the plurality of pieces of content having the same display resolution corresponding to content identification information.

The first device transmits the content corresponding to the content request signal to the electronic device in operation 1803. Transmitted content may include at least one of an application, a software module (a library, a program code, a script language code, and the like) included in an application and a resource (e.g., an image, an audio, a video, a URL, a document, text, and the like).

The first device determines whether state information of the electronic device is received from the electronic device in operation 1805. When the content corresponding to the accessory device transmitted to the electronic device 600 is configured to be selectively activated based on location information of the electronic device 600, the processor 520 may determine whether the location information of the electronic device 600 is received. The location information of the electronic device 600 may be received periodically or at a point at which the location information is changed.

When the state information of the electronic device is received, the first device determines whether to activate the content in operation 1807. The processor 520 may detect reference information for activating the content from service policy information of the content corresponding to the accessory device 610. When the location information of the electronic device 600 corresponds to the reference information, the processor 520 may activate the content corresponding to the accessory device 610. When the location information of the electronic device 600 does not correspond to the reference information, the processor 520 may maintain the content corresponding to the accessory device 610 in a deactivated state, or to display other content (e.g., a basic content).

When the first device determines to maintain the content in a deactivated state or to display other content (e.g., a basic content), the first device determines again whether the state information of the electronic device is received, in operation 1805. According to an embodiment of the present disclosure, when the electronic device 600 maintains the content corresponding to the accessory device 610 in a deactivated state or displays other content (e.g., a basic content), the processor 520 may output an indication (e.g., an image, a notification, haptic feedback, or audio) indicating that content exists that may be displayed when the accessory device 610 is installed. Additionally, when the corresponding content has been deleted according to service policy information, the processor 520 may not display an indication indicating that content exists that may be displayed when the accessory device 610 is installed.

When the first device determines to activate the content corresponding to the accessory device, the first device transmits content activation information to the electronic device in operation 1809.

According to an embodiment of the present disclosure, when content or service corresponding to the accessory device is corrected by the first device 620 or the second device 630, the first device 620 may update the content of the electronic device 600. The processor 520 may provide the electronic device 600 with correction information of the content or service corresponding to the accessory device. The electronic device 600 may update at least one application or service based on the correction information.

Figure 20:
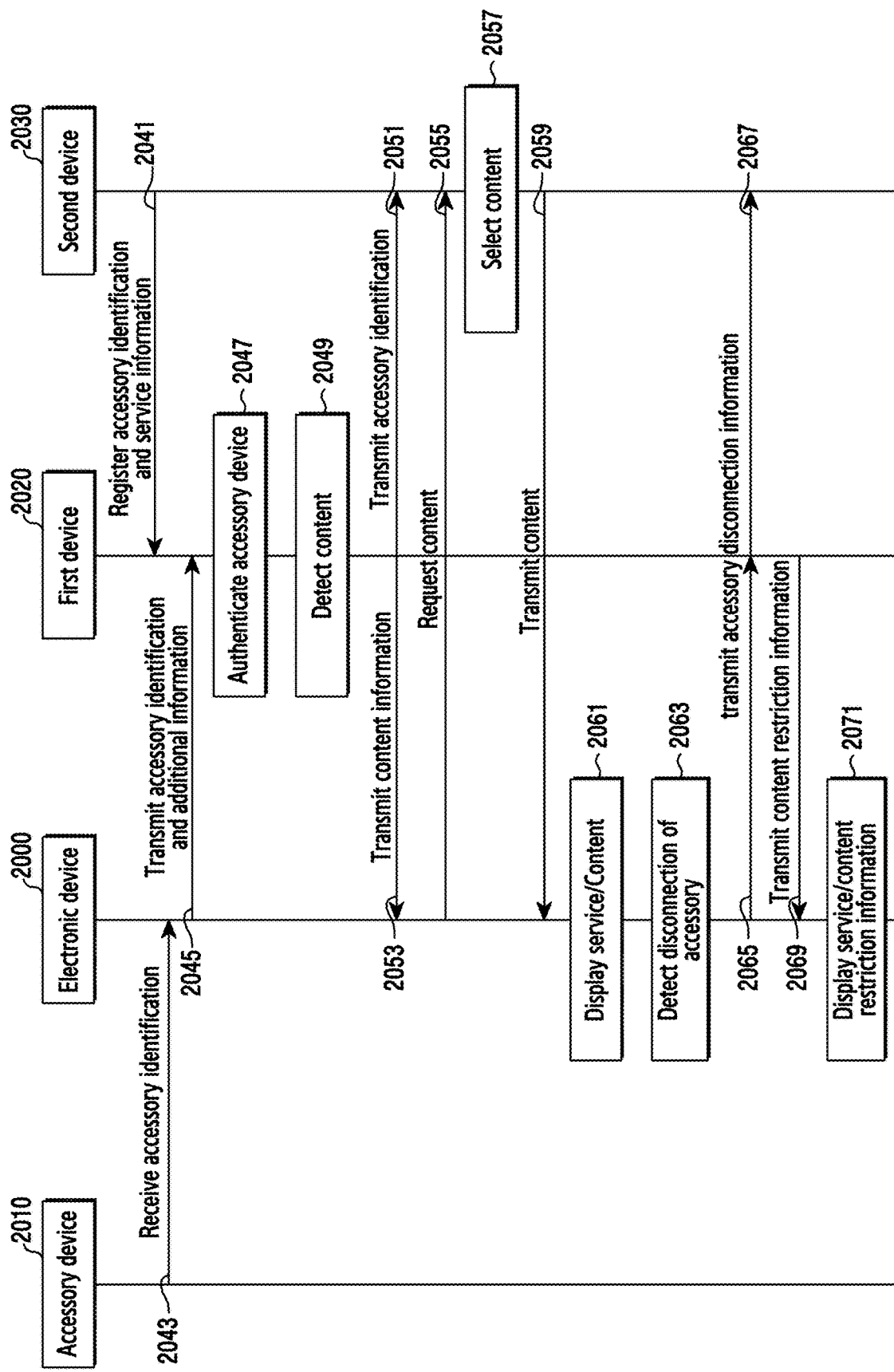
FIG. 20 is a signal flow diagram illustrating a process of providing a service corresponding to an accessory device according to another embodiment of the present disclosure.

FIG. 20 is a signal flow diagram illustrating a process of providing a service corresponding to an accessory device by a system according to an embodiment of the present disclosure.

Referring to FIG. 20, a first device 2020 registers identification information of an accessory device 2010 that is connectable to an electronic device 2000 and service information (e.g., at least one of service identification information and content identification information) corresponding to the corresponding accessible device 2010, based on accessory device information of the accessory device 2010 and the service information provided from a second device 2030. According to an embodiment of the present disclosure, the first device 2020 receives, from the second device 2030, the service information corresponding to received accessory device information of the accessory device 2010, which is registered in the first device, associates the identification information of the accessory device 2010 connectable to the electronic device 2000 and the service information corresponding to the accessory device 2010, and registers the same in operation 2041.

The electronic device 2000 receives the identification information of the accessory device 2010 from the accessory device 2010 that is connected to the electronic device 2000 in operation 2043. The electronic device 2000 transmits the identification information of the accessory device 2010, which is determined to be available, to the first device 2020 in operation 2045. The electronic device 2000 may transmit at least one piece of additional information to the first device 2020.

The first device 2020 authenticates the corresponding accessory device 2010 based on the identification information of the accessory device 2010 provided from the electronic device 2000 in operation 2047. When the accessory device 2010 is successfully authenticated, the first device 2020 detects service identification information or content identification information corresponding to the identification information of the accessory device 2010 in operation 2049. When the accessory device 2010 is successfully authenticated, the first device 2020 may detect service identification information corresponding to the identification information of the accessory device 2010, and may detect identification information of content corresponding to the corresponding service identification information.

The first device 2020 transmits the identification information of the accessory device 2010 to the second device 2030 in operation 2051. The first device 2020 transmits the content information (e.g., content identification information) corresponding to the accessory device 2010 to the electronic device 2000 in operation 2053.

The electronic device 2000 may determine whether to install the content corresponding to the content identification information, based on the content identification information and authentication information provided from the first device 2020. When the electronic device 2000 determines to install the content corresponding to the content identification information, the electronic device 2000 transmits a content request signal to the second device 2030 in operation 2055. The second device 2030 detects content corresponding to the content request signal based on the request from the electronic device 2000 in operation 2057. The second device 2030 may detect content corresponding to the content identification information included in the content request signal or the content identification information provided from the first device 2020. The second device 2030 transmits the content corresponding to the content request signal to the electronic device 2000 in operation 2059.

The electronic device 2000 displays a service screen by installing the content provided from the second device 2030 in operation 2061.

When disconnection of the accessory device 2010 is detected in operation 2063, the electronic device 2000 transmits information about disconnection of the accessory device 2010 to the first device 2020 in operation 2065.

The first device 2020 may detect a content-processing scheme corresponding to disconnection of the accessory device 2010 from a service policy of the content corresponding to the accessory device 2010. The first device 2020 transmits the content-processing scheme corresponding to the disconnection of the accessory device 2010 to the electronic device 2000 and the second device 2030 in operations 2067 and 2069.

The electronic device 2000 deletes or deactivates at least a part of, or the entire content based on the content-processing scheme provided from the first device 2020 in operation 2071. In this instance, the electronic device 2000 may display service restriction information corresponding to the content on a display.

According to an embodiment of the present disclosure, the first device 2020 and the second device 2030 may share the content (or service) information, which is provided to the electronic device 2000, when the content (or service) corresponding to the accessory device 2010 is provided to the electronic device 2000. When the first device 2020 provides the content (or service) corresponding to the accessory device 2010 to the electronic device 2000, the first device 2020 may transmit content provision information to the second device 2030. When the second device 2030 provides the content (or service) corresponding to the accessory device 2010 to the electronic device 2000, the second device 2030 may transmit content provision information to the first device 2020.

Figure 21:
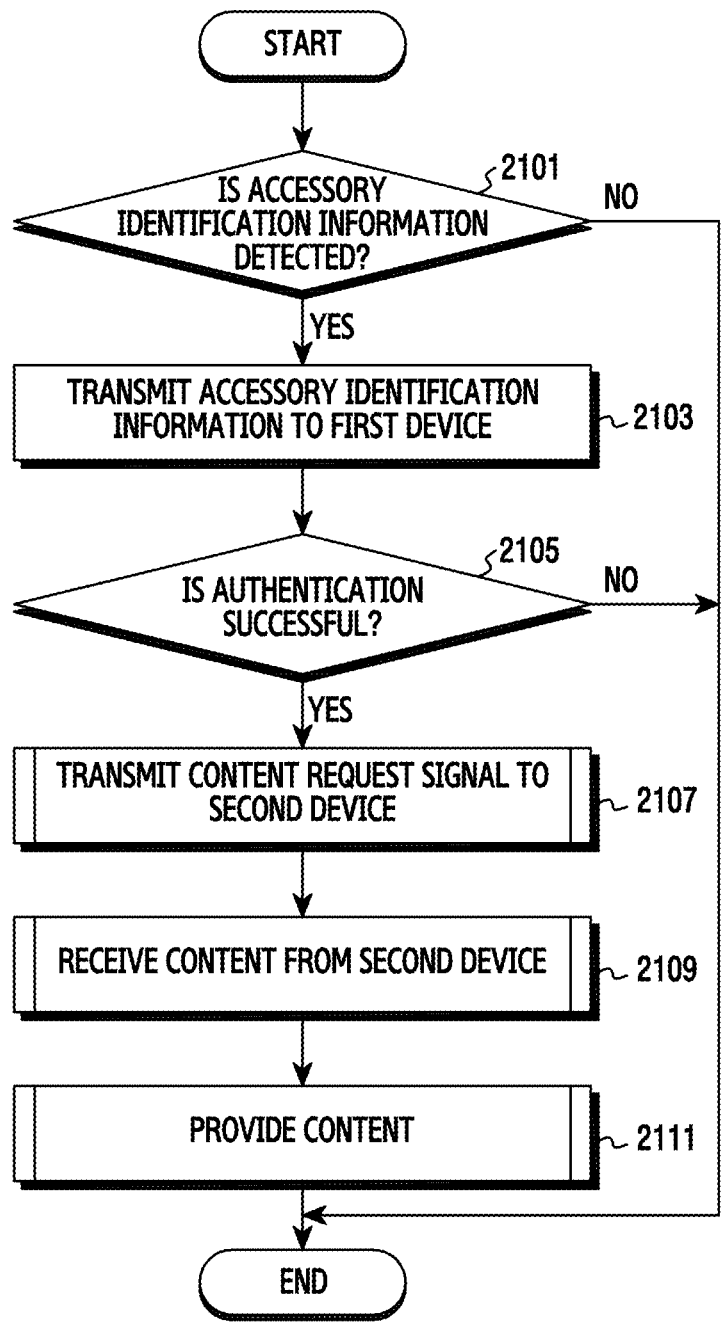
FIG. 21 is a flowchart illustrating a process of outputting content corresponding to an accessory device provided from a second device, by an electronic device according to an embodiment of the present disclosure.

FIG. 21 is a flowchart illustrating a process of outputting content corresponding to an accessory device provided from a second device, by an electronic device according to an embodiment of the present disclosure. In the following description, the electronic device may include the electronic device 201 or at least a part (e.g., processor 220) of the electronic device 201 of FIG. 2.

Referring to FIG. 21, the electronic device may determine whether identification information of an accessory device is detected in operation 2101. The processor 220 may determine whether the identification information of the accessory device connected to the electronic device 201 is detected. The processor 220 may determine whether the corresponding identification information is available when the identification information of the accessory device is detected. When the identification information of the accessory device is available, the processor 220 may determine that the identification information of the accessory device is detected.

When the identification information of the accessory device is detected, the electronic device transmits the identification information of the accessory device to the first device (e.g., the first device 2020 of FIG. 20) in operation 2103. The processor 220 may control the communication interface 270 to transmit, to the first device 2020, additional information together with the identification information of the accessory device.

The electronic device determines whether the accessory device is successfully authenticated in operation 2105. The processor 220 may receive authentication information from the first device 2020 through the communication interface 270. When the authentication information received from the first device 2020 is available, the processor 220 may determine an authentication result included in the authentication information.

The electronic device transmits a content request signal to a second device in operation 2107 when the accessory device is successfully authenticated. When the processor 220 uses a service (e.g., an online game) associated with content corresponding to the accessory device based on a user input, the processor 220 may control the communication interface 270 to transmit the content request signal corresponding to the accessory device to the second device 2030.

The electronic device receives content corresponding to the content request signal from the second device in operation 2109. The content may include installation information for installing the content corresponding to the accessory device or address (URL) information for accessing the content corresponding to the accessory device.

The electronic device outputs the content corresponding to the accessory device in operation 2111. The processor 220 may control the display 260 to display a service screen of a game corresponding to the accessory device.

Figure 22:
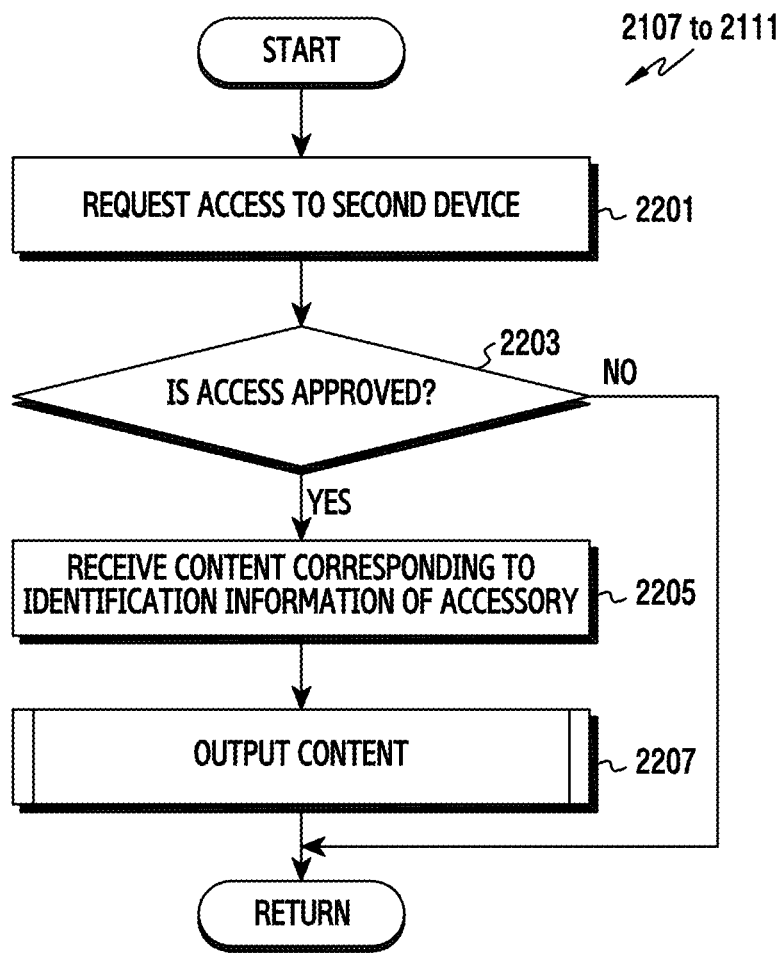
FIG. 22 is a flowchart illustrating a process of receiving, by an electronic device, content corresponding to an accessory device from a second device according to an embodiment of the present disclosure.

FIG. 22 is a flowchart illustrating a process of receiving content corresponding to an accessory device from a second device, by an electronic device according to an embodiment of the present disclosure. Hereinafter, operations for providing content corresponding to an accessory device will be described, corresponding to operations 2107 to 2111 of FIG. 21. In the following description, the electronic device may include the electronic device 201 or at least a part (e.g., processor 220) of the electronic device 201 of FIG. 2.

Referring to FIG. 22, the electronic device requests access to a second device when an accessory device connected to the electronic device is successfully authenticated (operation 2105 of FIG. 21) in operation 2201. The processor 220 may determine whether execution information of a service (e.g., a game or a social-network chat room) for accessing the second device 2030 is detected based on a user input or identification information of the accessory device connected to the electronic device. When the execution information of the corresponding service is detected, the processor 220 may control the communication interface 270 to transmit an access request signal to the second device 2030. The second device may include an online game server or a social network server. The access request signal may include an ID, a password, or biometric authentication-related information, which may be used to log in to the second device.

In operation 2203, the electronic device determines whether the second device approves the access request from the electronic device. The processor 220 may determine whether an access approval signal is received from the second device through the communication interface 270.

When the access approval signal is received from the second device, the electronic device receives content corresponding to the accessory device from the second device in operation 2205. When the first device 2020 successfully authenticates the accessory device 2010, the second device 2030 may receive identification information of the accessory device 2010 and identification information of the electronic device 2000 from the first device 2020. Also, the second device 2030 may receive information associated with whether the accessory device 2010 is connected to the electronic device 2000 from the first device 2020 or the electronic device 2000. The second device 2030 may determine content to be provided to the electronic device 2000 based on whether the accessory device 2010 and the electronic device 2000 are connected. The second device 2030 may apply the content corresponding to the identification information of the accessory device 2010 based on the identification information of the electronic device 2000. Accordingly, when accessing the second device 2030, the processor 220 may receive a service to which the content corresponding to the accessory device 2010 is applied. Particularly, when accessing an online game server, the processor 220 may receive game data to which an item corresponding to the accessory device 2010 is applied. Particularly, when accessing an online social network server, the processor 220 may receive chat room information of a chat room including social network subscribers corresponding to the accessory device 2010 or a related multimedia content.

The electronic device outputs the content corresponding to the accessory device in operation 2207. When accessing an online game server, the processor 220 may control the display 260 to display a service screen of a game to which an item (e.g., an avatar, an equipment item, or a game effect) corresponding to the accessory device 2010 is applied. Particularly, when accessing an online social network server, the processor 220 may display or use chat room information of a chat room including social network subscribers corresponding to the accessory device 2010 or related multimedia content.

According to an embodiment of the present disclosure, the electronic device may apply the content corresponding to the accessory device to an application installed in the electronic device. The processor 220 may receive the content corresponding to the accessory device 2010 from the second device 2030 through the communication interface 270, and may apply the same to a corresponding application. Particularly, the processor 220 may apply item information corresponding to the accessory device 2010 received from the second device 2030 to a game application installed on the electronic device 201.

According to an embodiment of the present disclosure, the electronic device may determine whether the accessory device is installed, automatically or by a selection made by a user while an application is executed. The processor 220 may drive a recognition command of the accessory device using a user interface (UI) provided in an executed application. When a function for determining whether the accessory device is installed is activated while an application is executed, the processor 220 may determine whether the accessory device is installed through an access management module, which is separate from the processor 220.

According to an embodiment of the present disclosure, when the accessory device is installed while an application is executed, the electronic device may authenticate the accessory device while the application is executed, or may authenticate the accessory device at a point in time when the execution of the application is terminated. The electronic device may authenticate the accessory device only when the accessory device is initially installed.

Figure 23A:
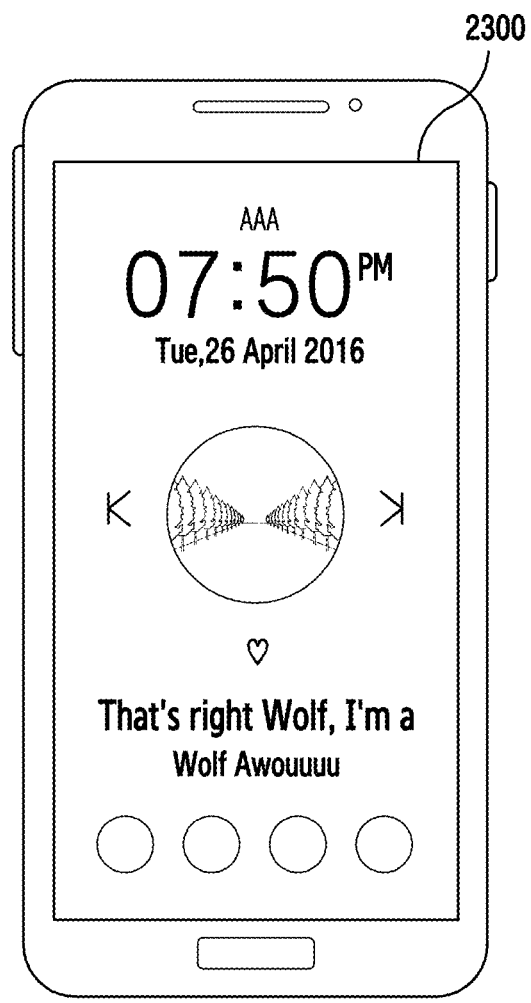
FIGS. 23A to 23C are diagrams illustrating screen configurations that provide a music service corresponding to an accessory device, according to an embodiment of the present disclosure.
Figure 23B:
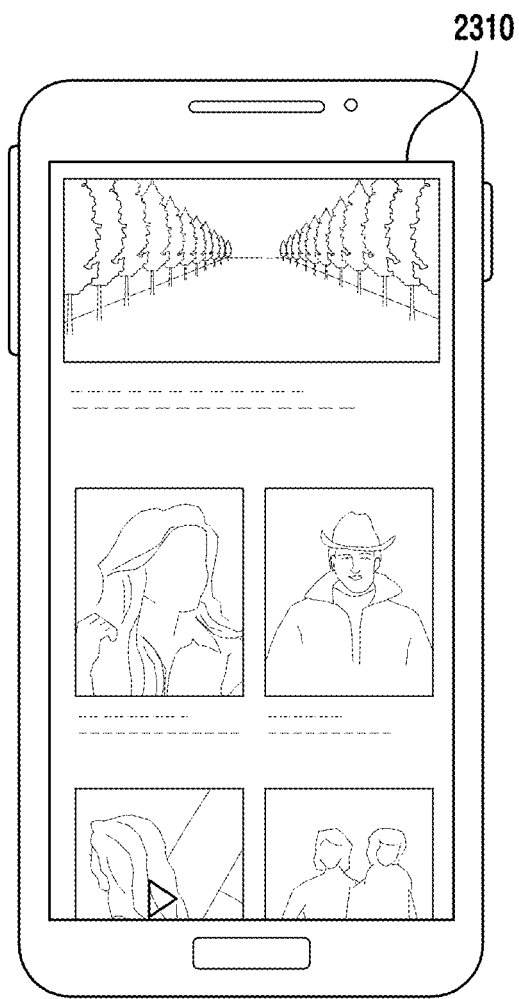
Figure 23C:
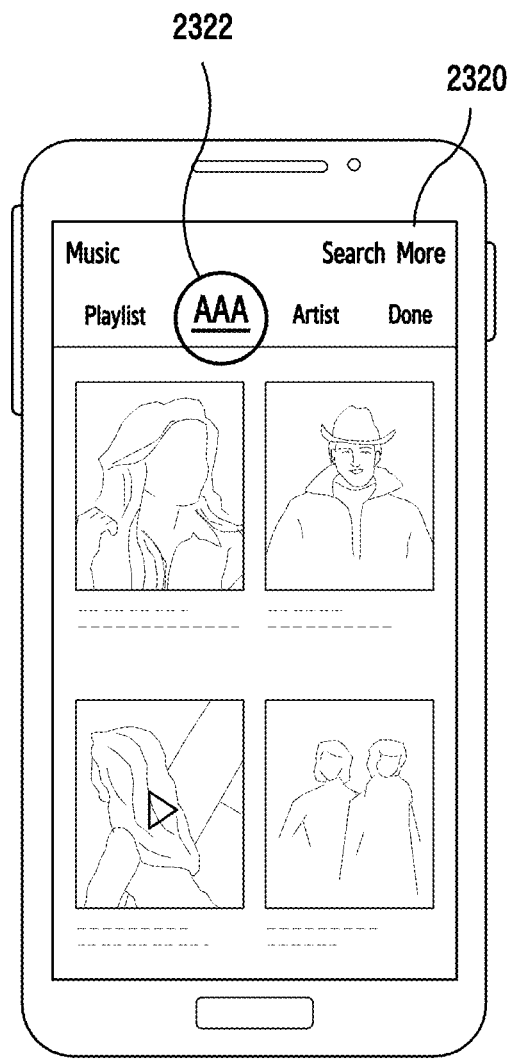

FIGS. 23A to 23C are diagrams illustrating screen configurations that provide a music service corresponding to an accessory device, according to an embodiment of the present disclosure.

According to an embodiment of the present disclosure, when a music-related accessory device (e.g., the case in which a service type is music or a fan club service for a predetermined singer, or the case in which an equipment type is an earphone type) is connected, the electronic device may provide content corresponding to the accessory device through a music-related application. The processor 220 may control the display 260 to display a service screen 2300 that is capable of playing back the content corresponding to the accessory device, as shown in FIG. 23A. The processor 220 may control the display 260 to display a page 2310 (e.g., a webpage) that displays information associated with the content corresponding to the accessory device, as shown in FIG. 23B. The processor 220 may add a dedicated icon 2322 for playing back the content corresponding to the accessory device to a service screen 2320 of a multimedia reproduction application, as shown in FIG. 23C. The processor 220 may control the display 260 to display a music video list 2310 or a music album list 2320 which is capable of playing back the content corresponding to the accessory device, in a predetermined location of a list of a multimedia player. That is, the processor 220 may dispose the content corresponding to the accessory device (e.g., in the broadest area of the top of the screen 2310 of FIG. 23B) by adjusting a priority order to have a higher priority than other content. Therefore, the processor 220 may display the content corresponding to the accessory device with existing content.

FIGS. 24A to 24D are diagrams illustrating screen configurations that provide a location-based service corresponding to an accessory device by an electronic device according to an embodiment of the present disclosure.

Figure 24A:
FIGS. 24A to 24D are diagrams illustrating screen configurations that provide a location-based service corresponding to an accessory device, according to an embodiment of the present disclosure.
Figure 24B:
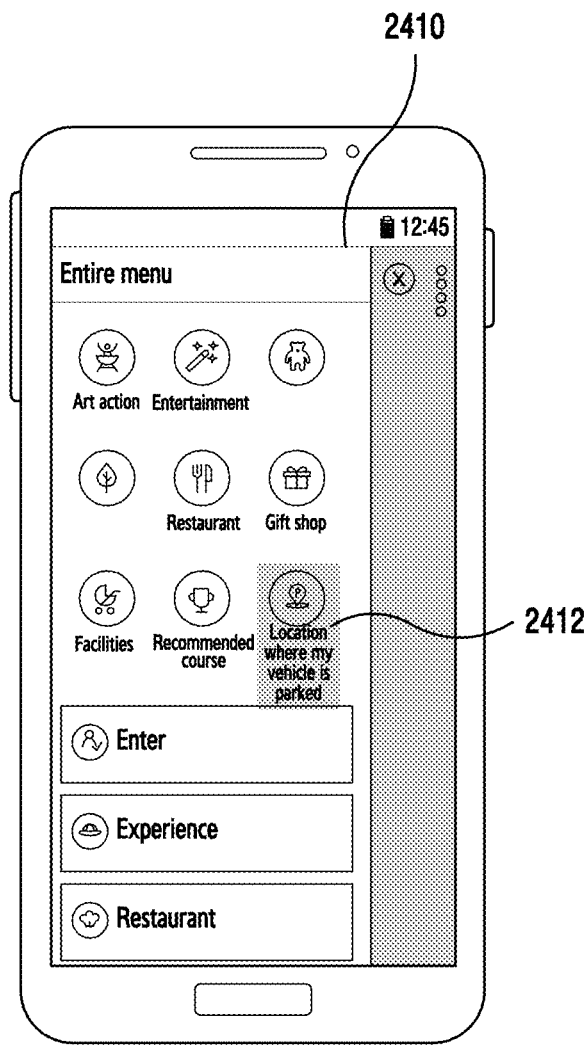
Figure 24C:
Figure 24D:
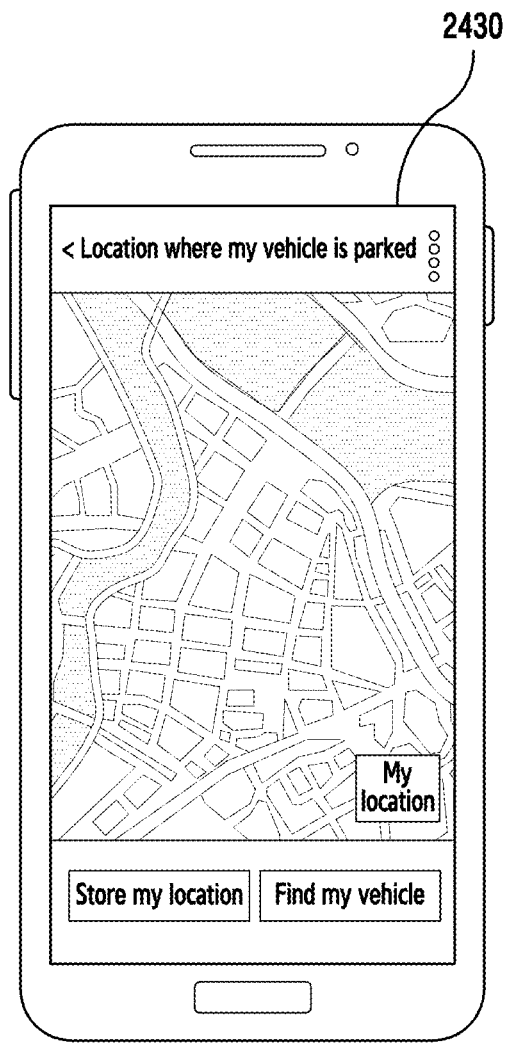

According to an embodiment of the present disclosure, the electronic device may provide a location-based theme service based on content corresponding to an accessory device. The theme is for providing a service related to a content set formed of a plurality of services or pieces of content, and service identification information of a plurality of pieces of content may be used for the same. When the processor 220 installs the content corresponding to the accessory device and recognizes entry into a predetermined place (e.g., an amusement park) (e.g., wireless signal detection by an NFC, an access point (AP), a base station, and the like, or detection of entry to a predetermined area based on a location-based sensor), the processor 220 may control the display 260 to display a background screen 2400 corresponding to the accessory device by activating the content corresponding to the accessory device, as illustrated in FIG. 24A. For example, as illustrated in FIG. 24B, the processor 220 may control the display 260 to display at least one icon 2412 (e.g., a menu icon or a widget icon), associated with an area where the electronic device 201 is located, in a service screen 2410 of a predetermined application. The processor 220 may provide a reservation service 2420 associated with a predetermined device (e.g., an amusement ride), as shown in FIG. 24C. The processor 220 may provide a vehicle location provision service 2430 in a predetermined device, as shown in FIG. 24D.

According to an embodiment of the present disclosure, the electronic device may change the properties of the electronic device based on an accessory type or a service type corresponding to the accessory device, or on a content property corresponding to accessory identification. When the electronic device 201 is connected to an accessory related to children (e.g., detection of accessory device identification of which a service type is a child mode or of which an accessory type is set to a children's watch type), the processor 220 may change an operation mode of the electronic device 201 to a children's mode (e.g., applying a children's theme or deactivating adult applications). In this instance, when a browser is driven, the processor 220 may change an initial webpage to a predetermined children's site, and may provide a service set for children.

Figure 25:
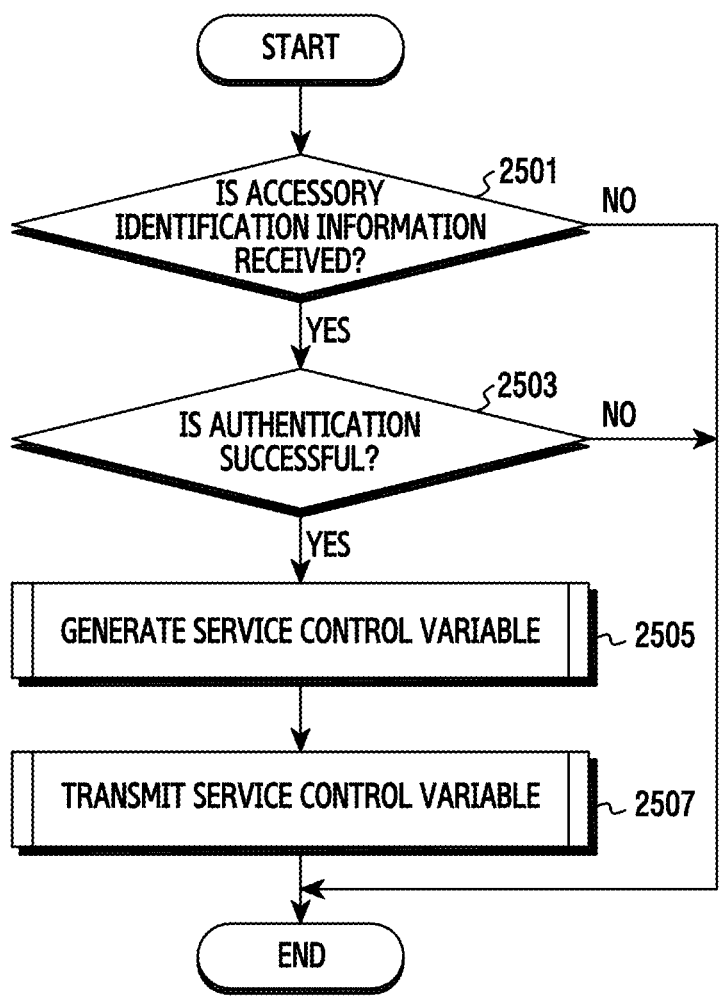
FIG. 25 is a flowchart illustrating a process of providing a service control variable corresponding to an accessory device, by a first device according to an embodiment of the present disclosure.

FIG. 25 is a flowchart illustrating a process of providing a service control variable corresponding to an accessory device, by a first device according to an embodiment of the present disclosure. Hereinafter, the first device may include the first device 501 of FIG. 5 or at least a part of the first device 501.

Referring to FIG. 25, the first device determines whether identification information of an accessory device is received from an electronic device in operation 2501. The processor 520 may determine whether the identification information of the accessory device 2010 connected to the electronic device 2000 is received through the communication interface 570 from the electronic device 2000, which is registered in the first device 501.

When the identification information of the accessory device is received from the electronic device, the first device determines whether authentication of the accessory device is allowed in operation 2503. When the identification information of the accessory device 2010 is received through the communication interface 570, the processor 520 may compare identification information included in a service list of the first device 501 and the identification information of the accessory device 2010. When identification information corresponding to the identification information of the accessory device 2010 exists in the service list of the first device 501, the processor 520 may authenticate the identification information of the accessory device 2010. When the accessory device 2010 is successfully authenticated, the processor 520 may determine that the accessory device 2010 is available. When it is determined that the successfully authenticated accessory device 2010 is available, the processor 520 may control the communication interface 570 to transmit authentication success information to the electronic device 2000. When identification information corresponding to the identification information of the accessory device 2010 does not exist in the service list of the first device 501, or when it is determined that the successfully authenticated accessory device 2010 is not available, the processor 520 may control the communication interface 570 to transmit authentication failure information.

When the accessory device identification information received from the electronic device is successfully authenticated, the first device generates a control variable of a service corresponding to the identification information of the accessory device in operation 2505. The processor 520 may determine a service type corresponding to the accessory device. The processor 520 may generate an accessory group having the same service type (e.g., same social network group information or same game guild information) as the service type corresponding to the accessory device. The processor 520 may generate an accessory-based service group associated with a service type corresponding to the accessory device, based on identification information of the electronic device that transmits the identification information of the accessory device. The processor 520 may generate an accessory-based service group by extracting at least one other piece of electronic device information (e.g., a list of friends registered in a social network of the electronic device, a list of phone numbers stored in the electronic device (e.g., a family group or a company group), or a list of messenger friends registered in an electronic device) which is associated with the electronic device 2000, from an accessory group including accessory identification information having the same service type as the service type corresponding to the accessory device 2010 connected to the electronic device 2000. The processor 520 may extract another piece of electronic device information from a service list or subscriber information stored in the first device 2020 or the second device 2030, or may request the same from the second device 2030, and may receive a result thereof.

The first device transmits a control variable of a service corresponding to the identification information of the accessory device to the electronic device or the second device in operation 2507. When the electronic device 2000 provides the service corresponding to the accessory device through an application installed in the electronic device 2000, the processor 520 may control the communication interface 570 to transmit, to the electronic device 2000, a control variable of the service corresponding to the identification information of the accessory device. When the electronic device 2000 provides the service corresponding to the accessory device through an online server (e.g., the second device 2030), the processor 520 may control the communication interface 570 to transmit, to the second device 2030, a control variable of the service corresponding to the identification information of the accessory device.

Figure 26:
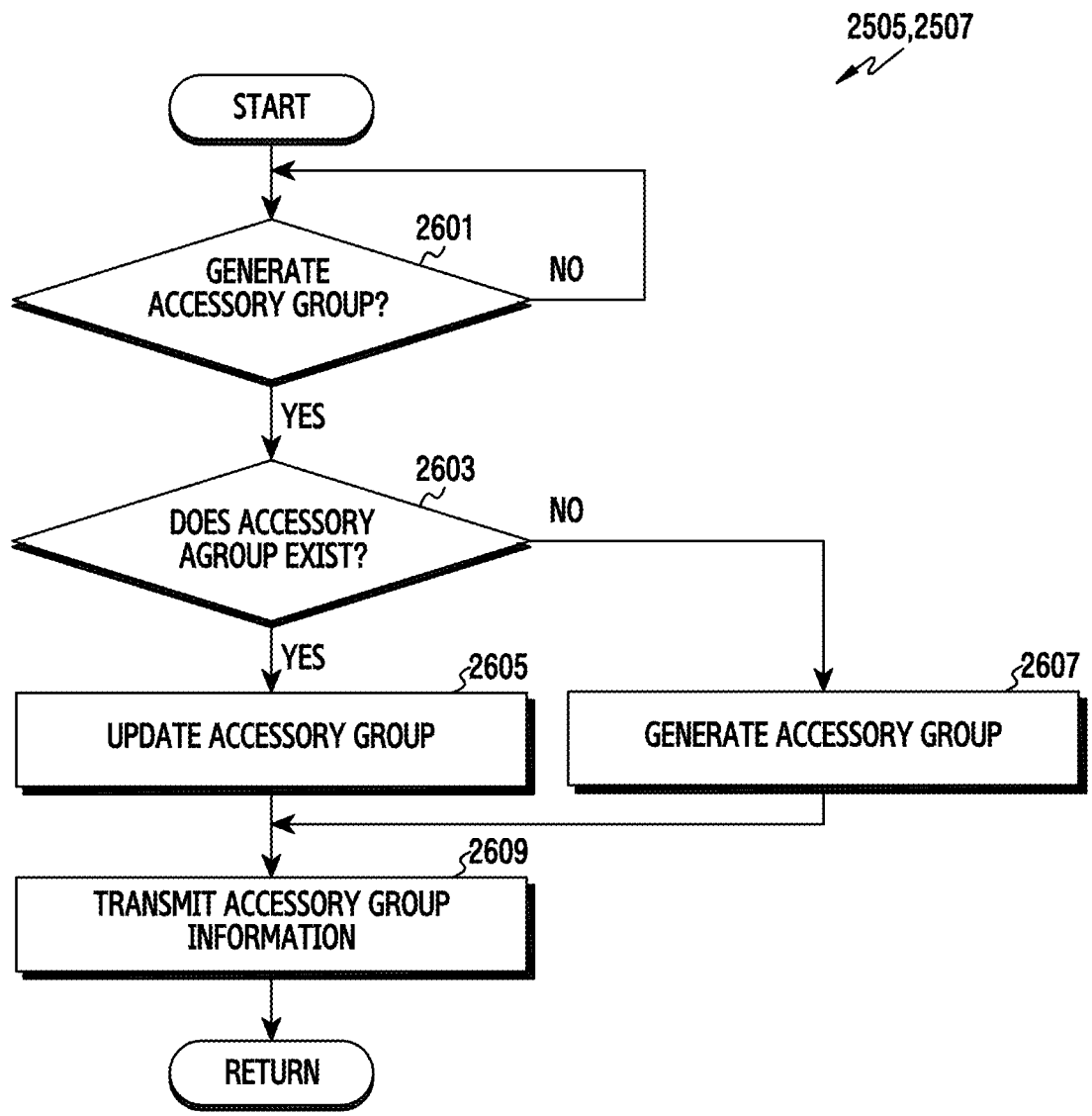
FIG. 26 is a flowchart illustrating a process of providing group information corresponding to an accessory device, by a first device according to an embodiment of the present disclosure.

FIG. 26 is a flowchart illustrating a process of providing group information corresponding to an accessory device, by a first device according to an embodiment of the present disclosure. Hereinafter, operations for providing a service control variable will be described, corresponding to operations 2505 to 2507 of FIG. 25. Hereinafter, the first device may include the first device 501 of FIG. 5 or at least a part (e.g., the processor 520) of the first device 501.

Referring to FIG. 26, when an accessory device is successfully authenticated (operation 2503 of FIG. 25), the first device determines whether to generate an accessory group based on a service type corresponding to the accessory device in operation 2601. The processor 520 may determine whether a service type corresponding to identification information of the accessory device is a service that interoperates with another accessory device of the same service type (e.g., a function associated with subscribing a social network group, a fan club, a game guild, and the like or sharing information among members). When the service that interoperates with another accessory device is provided, the processor 520 may generate an accessory group.

In the case of generating an accessory group, the first device determines whether a previously set accessory group exists in operation 2603. The processor 520 may determine whether an accessory group having the same service type as the service type corresponding to the accessory device exists, based on accessory group information stored in the memory 530. When information associated with participation in a predetermined guild of a predetermined game is recognized based on the service type corresponding to the accessory device, the processor 520 may determine whether a previously generated accessory group corresponding to the service type (e.g., a predetermined guild of a predetermined game) corresponding to the accessory device exists.

When the previously set accessory group exists, the first device updates the accessory group to include the accessory device in operation 2605. The processor 520 may register, in the accessory group, the identification information of the accessory device and the identification information of the electronic device to which the accessory device is connected. When a guild of a game corresponding to the service type of the accessory device exists, the processor 520 may add, to the corresponding guild, the identification information of the electronic device to which the accessory device is connected.

When the previously set accessory group does not exist, the first device generates an accessory group including at least one other accessory device having the same service type as the service type of the accessory device in operation 2607. When a guild of a game corresponding to the service type of the accessory device does not exist, the processor 520 may generate a game guild including the identification information of the electronic device to which the accessory device is connected. The processor 520 may add game guild information to accessory group information stored in the memory 530.

The first device transmits the accessory group information to the electronic device or a second device in operation 2609. The processor 520 may control the communication interface 570 to transmit the accessory group information to the electronic device or the second device based on a scheme in which the electronic device provides the service corresponding to the accessory device.

According to an embodiment of the present disclosure, the electronic device may automatically join in a fan club, a game party, and the like corresponding to the accessory device, based on the accessory group information.

Figure 27:
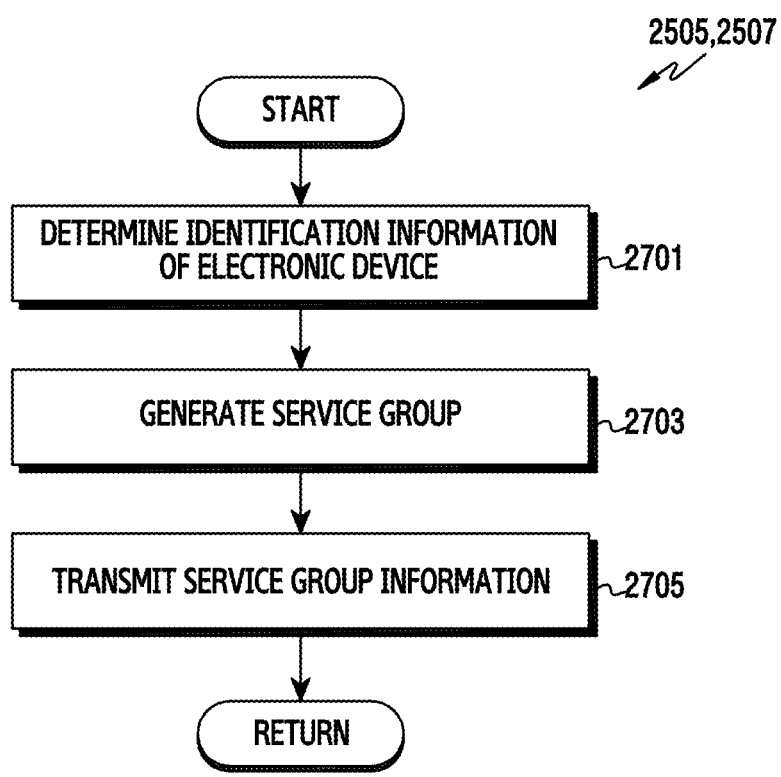
FIG. 27 is a flowchart illustrating a process of providing service group information corresponding to user information, by a first device according to an embodiment of the present disclosure.

FIG. 27 is a flowchart illustrating a process of providing service group information corresponding to user information by a first device according to an embodiment of the present disclosure. Hereinafter, operations for providing a service control variable will be described, corresponding to operations 2505 to 2507 of FIG. 25. Hereinafter, the first device may include the first device 501 of FIG. 5 or at least a part (e.g., the processor 520) of the first device 501.

According to an embodiment of the present disclosure, for generating and subscribing to an accessory group, the processor 520 may form an accessory group including a few pieces of predetermined accessory identification information, and may previously set a service type to be commonly applied thereto. That is, when accessory device identification information included in the accessory group is received, the processor 520 may extract information associated with an electronic device connected to an accessory device, and may add the same to an accessory-based service group. Therefore, the processor 520 may determine service identification information corresponding to the accessory group to enable a plurality of electronic devices included in the accessory-based service group to share the previously set service, and may control content and functions associated with electronic devices to which the accessory devices corresponding to the accessory group are connected, based on content corresponding to the service identification information and service policy information associated with the content.

Referring to FIG. 27, when an accessory device is successfully authenticated (operation 2503 of FIG. 25), the first device determines identification information of an electronic device to which the accessory device is connected in operation 2701. The identification information of the electronic device may include a user ID or a device ID of the electronic device.

The first device may generate a service group based on a service type corresponding to the accessory device and the identification information of the electronic device in operation 2703. The processor 520 may detect an accessory list associated with the identification information of the electronic device from a service corresponding to the accessory device. Particularly, the processor 520 may identify another electronic device that is connected to another accessory device of the same service type as the service type corresponding to the accessory device, from a social networking service group associated with the identification information of the electronic device. The processor 520 may generate a service group including another electronic device that is connected to another accessory device of the same service type as the service type corresponding to the accessory device. The service group may indicate an accessory group generated based on the identification information of the electronic device.

The first device transmits the service group information to the electronic device or the second device in operation 2705. The processor 520 may control the communication interface 570 to transmit the service group information to the electronic device or the second device, based on a scheme in which the electronic device provides the service corresponding to the accessory device.

According to an embodiment of the present disclosure, the electronic device may automatically join in a social networking service group, a messenger chat group, and the like, based on the accessory group information. The electronic device may share service information, such as an image, a calendar, and the like, in the social service group or messenger chat group.

Figure 28:
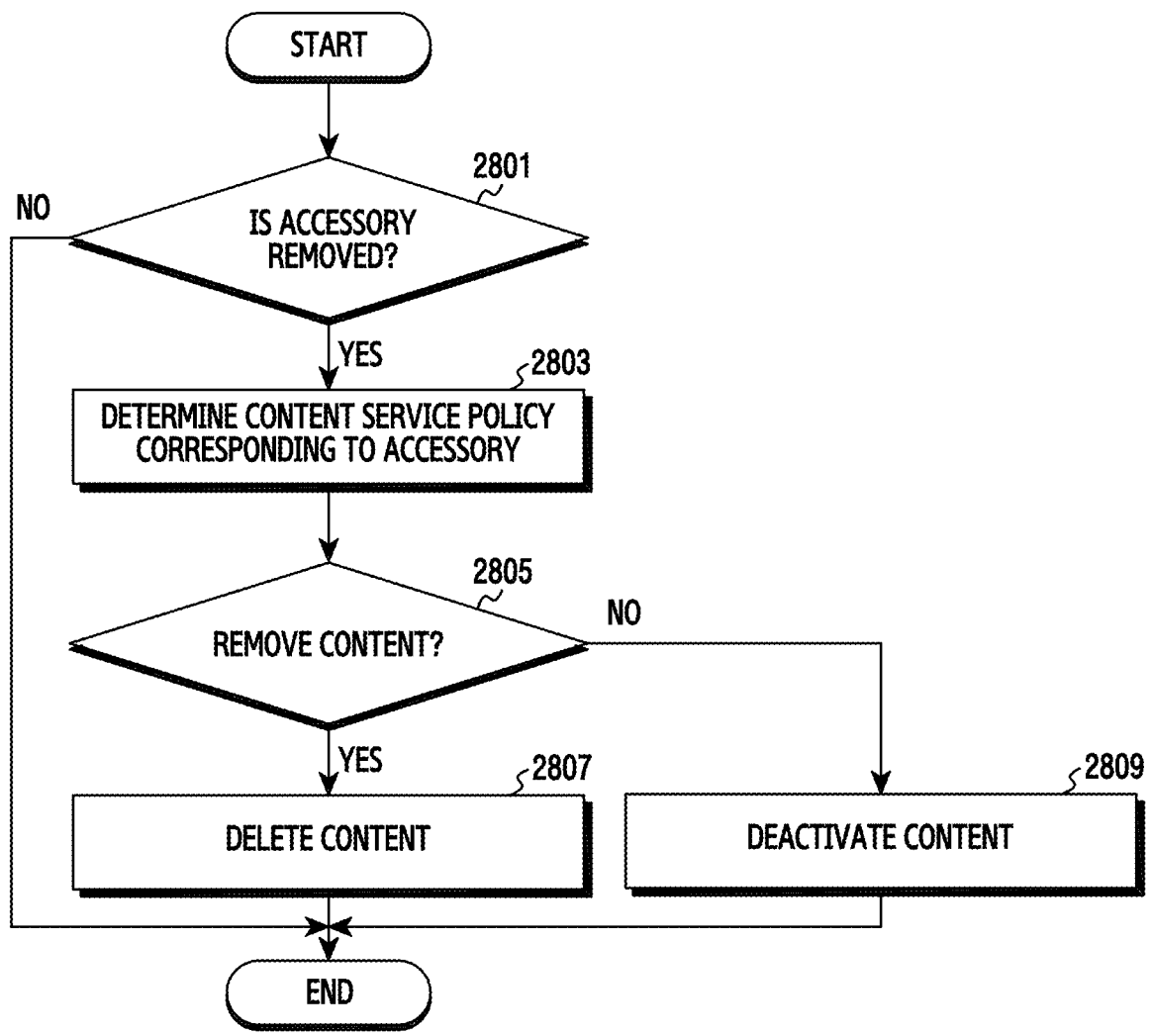
FIG. 28 is a flowchart illustrating a process of removing content corresponding to an accessory device by an electronic device according to an embodiment of the present disclosure.

FIG. 28 is a flowchart illustrating a process of removing content corresponding to an accessory device by an electronic device according to an embodiment of the present disclosure.

Referring to FIG. 28, the electronic device determines whether an accessory device is disconnected from the electronic device in operation 2801. When a successfully authenticated accessory device is connected to the electronic device 201, the processor 220 may periodically determine whether the corresponding accessory device is connected.

The processor 220 may determine whether the contact between the accessory device and the input/output interface 250 is released. The processor 220 may determine whether a communication connection with the accessory device is maintained through the communication interface 270. When a communication connection with the accessory device is maintained, the processor 220 may determine that the connection with the accessory device is maintained.

When the accessory device is disconnected from the electronic device, the electronic device determines a service policy of content corresponding to the accessory device in operation 2803. The electronic device may receive, from a first device, service policy information of the content together when receiving the content information (e.g., content identification information) or the content.

The electronic device determines whether to delete the content corresponding to the accessory device based on the service policy information of the content corresponding to the accessory device in operation 2805.

When the electronic device determines to delete the content corresponding to the accessory device, the electronic device deletes the content corresponding to the accessory device in operation 2807. The processor 220 may remove an application corresponding to the accessory device. The processor 220 may delete a multimedia content, a game item, a phone number list, or accessory group information corresponding to the accessory device. The processor 220 may delete one or more of a multimedia content, a game item, a phone number list, and accessory group information based on content service policy information corresponding to the accessory device. The processor 220 may delete a predetermined content when the accessory device is not reconnected for at least a predetermined period of time, based on the service policy information of the content corresponding to the accessory device. The processor 220 may delete a predetermined content when the accessory device is not reconnected for at least a predetermined period of time, based on the service policy information of the content corresponding to the accessory device.

When the electronic device determines to maintain the content corresponding to the accessory device, the electronic device deactivates at least a part of, or the entire content corresponding to the accessory device or displays content having a different quality in operation 2809. The processor 220 may deactivate the reproduction of a multimedia content if the electronic device determines not to delete the content corresponding to the accessory device. The processor 220 may delete the content corresponding to the accessory device when a reference time elapses from a point in time when the accessory device is disconnected. The processor 220 may provide a multimedia content having a shorter running time, a lower resolution, or a lower-quality sound, compared to when the accessory device is connected.

According to an embodiment of the present disclosure, when the second device receives information indicating that the accessory device is disconnected from the electronic device through the first device or the electronic device, the second device may update a service applied to another electronic device included in an accessory group. The second device may control a game benefit that has been applied to the accessory group based on a change in the number of electronic devices included in the accessory group to correspond to a change in the number of electronic devices included in the accessory group. The second device may identify the electronic device from which the accessory device is disconnected, may remove the electronic device from the accessory group, and may control a game benefit that has been applied to the accessory group based on a change in the number of electronic devices included in the accessory group to correspond to a change in the number of electronic devices included in the accessory group.

Figure 29:
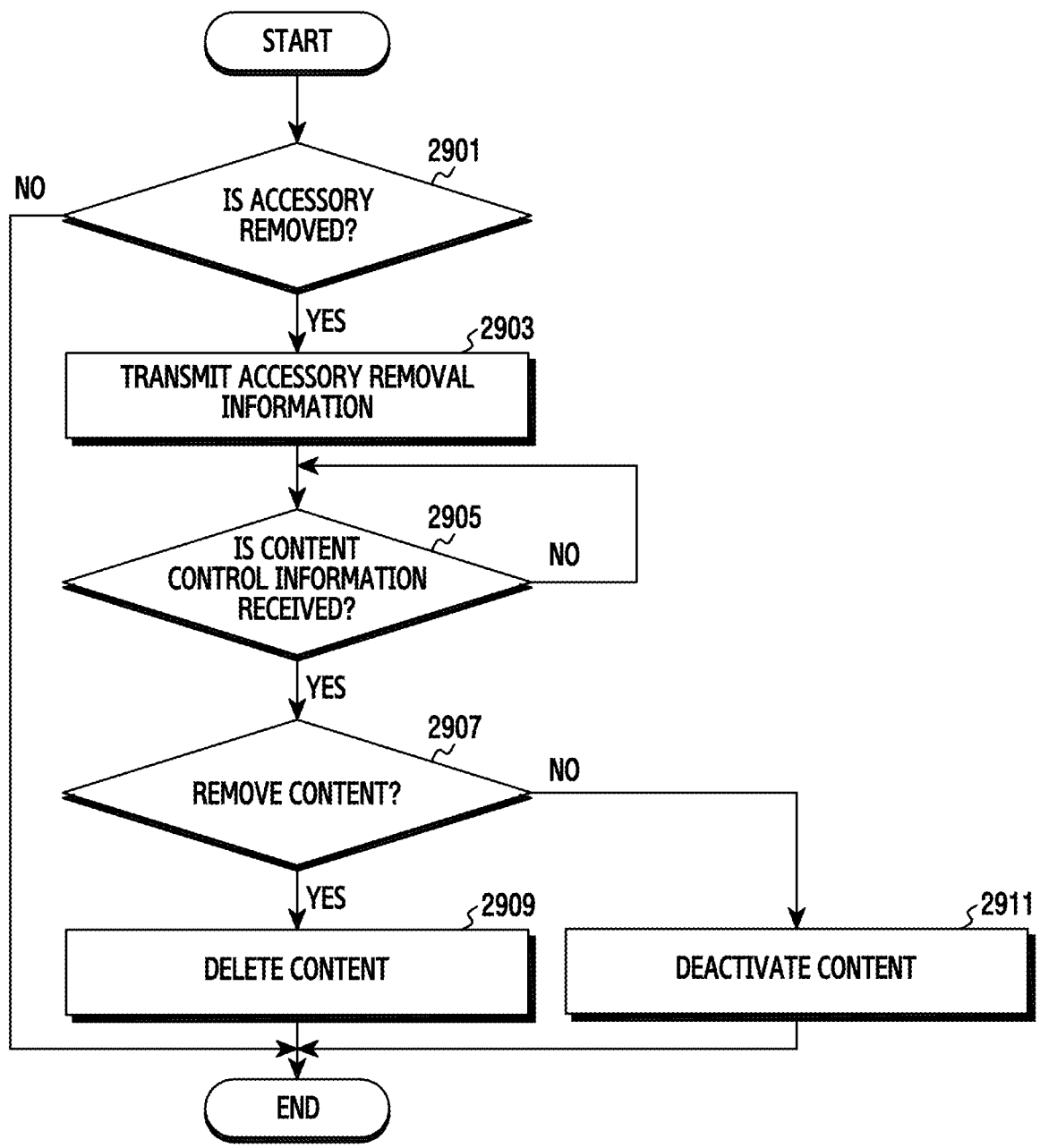
FIG. 29 is a flowchart illustrating a process of removing content corresponding to an accessory device by an electronic device according to another embodiment of the present disclosure.

FIG. 29 is a flowchart illustrating a process of removing content corresponding to an accessory device by an electronic device according to another embodiment of the present disclosure.

Referring to FIG. 29, the electronic device determines whether an accessory device is disconnected from the electronic device in operation 2901. The processor 220 may determine whether the contact between the accessory device and the input/output interface 250 is released. When the contact between the accessory device and the input/output interface 250 is disconnected, the processor 220 may determine that the accessory device is disconnected. The processor 220 may determine whether a communication connection with the accessory device is maintained through the communication interface 270. When a communication connection with the accessory device is disconnected, the processor 220 may determine that the accessory device is disconnected.

When the accessory device is disconnected from the electronic device, the electronic device transmits accessory removal information to a first device in operation 2903. The processor 220 may control the communication interface 270 to transmit an accessory removal signal to the first device.

In operation 2905, the electronic device determines whether content control information is received from the first device in operation 2905. The content control information may include a scheme of processing content corresponding to the accessory device, which is determined based on service policy information of the content corresponding to the accessory device.

The electronic device determines whether to delete the content corresponding to the accessory device based on the content control information provided from the first device in operation 2907.

When the electronic device determines to delete the content corresponding to the accessory device, the electronic device may delete the content corresponding to the accessory device in operation 2909.

When the electronic device determines to maintain the content corresponding to the accessory device, the electronic device may deactivate at least a part of, or the entire content corresponding to the accessory device in operation 2911. When the accessory device is not connected until a predetermined reference time elapses from a point in time when the corresponding accessory device is disconnected, the processor 220 may delete the content corresponding to the accessory device.

According to an embodiment of the present disclosure, the electronic device may determine a processing scheme for the content corresponding to the accessory device based on the service policy information of the content corresponding to the accessory device, which is stored in the electronic device or the accessory device, instead of performing operations 2905 and 2907. The electronic device may determine whether to remove the content based on the processing scheme for the content.

Figure 30:
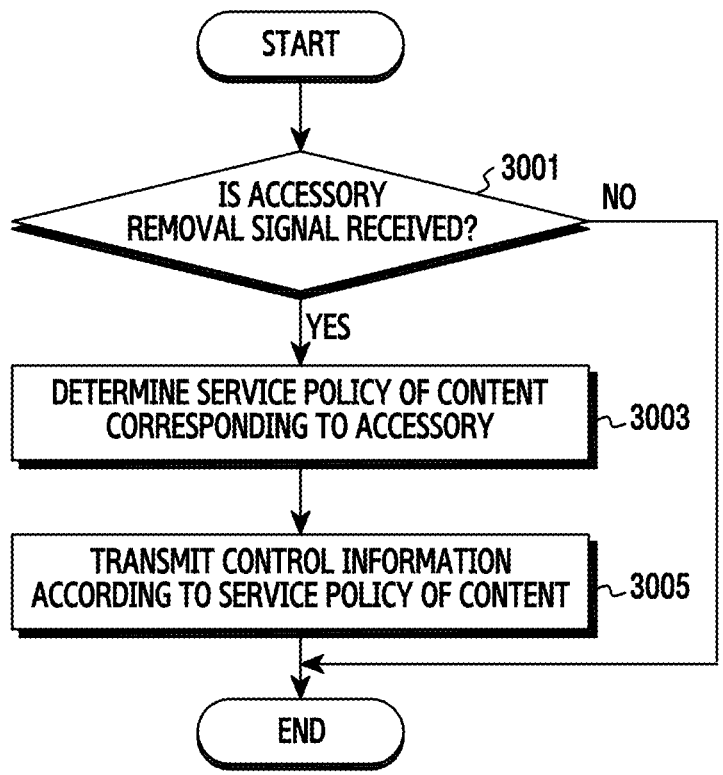
FIG. 30 is a flowchart illustrating a process of controlling content of an electronic device based on the removal of an accessory device, by a first device according to an embodiment of the present disclosure.

FIG. 30 is a flowchart illustrating a process of controlling content of an electronic device, in response to the removal of an accessory device, by a first device according to an embodiment of the present disclosure.

Referring to FIG. 30, the first device determines whether an accessory removal signal is received from the electronic device in operation 3001. The processor 520 may determine whether an accessory removal signal is received from an electronic device connected to an accessory device successfully authenticated by the first device 501.

When the accessory removal signal is received, the first device determines service policy information of content corresponding to the accessory device disconnected from the electronic device in operation 3003.

The first device transmits, to the electronic device, control information according to the service policy information of the content corresponding to the accessory device in operation 3005. The processor 520 may determine a processing scheme of the content corresponding to the accessory device based on the service policy information of the content corresponding to the accessory device. The processor 520 may control the communication interface 570 to transmit control information including the processing scheme of the content corresponding to the accessory device to the electronic device. The processing scheme of the content corresponding to the accessory device may be determined in advance based on service identification information corresponding to the accessory device. Particularly, the service policy information may be set to be different for each piece of content. For example, a lock screen may be restored to a state before the accessory device is connected, based on disconnection of the accessory device. A short cut service menu (e.g., a service widget) may be set to be maintained as a deactivated state in the electronic device during a predetermined period of time. A theme service may be set to be removed or maintained based on a user setting. An application may be set to be maintained as a deactivated state in the electronic device. Accessory setting information may be removed from the electronic device.

Figure 31:
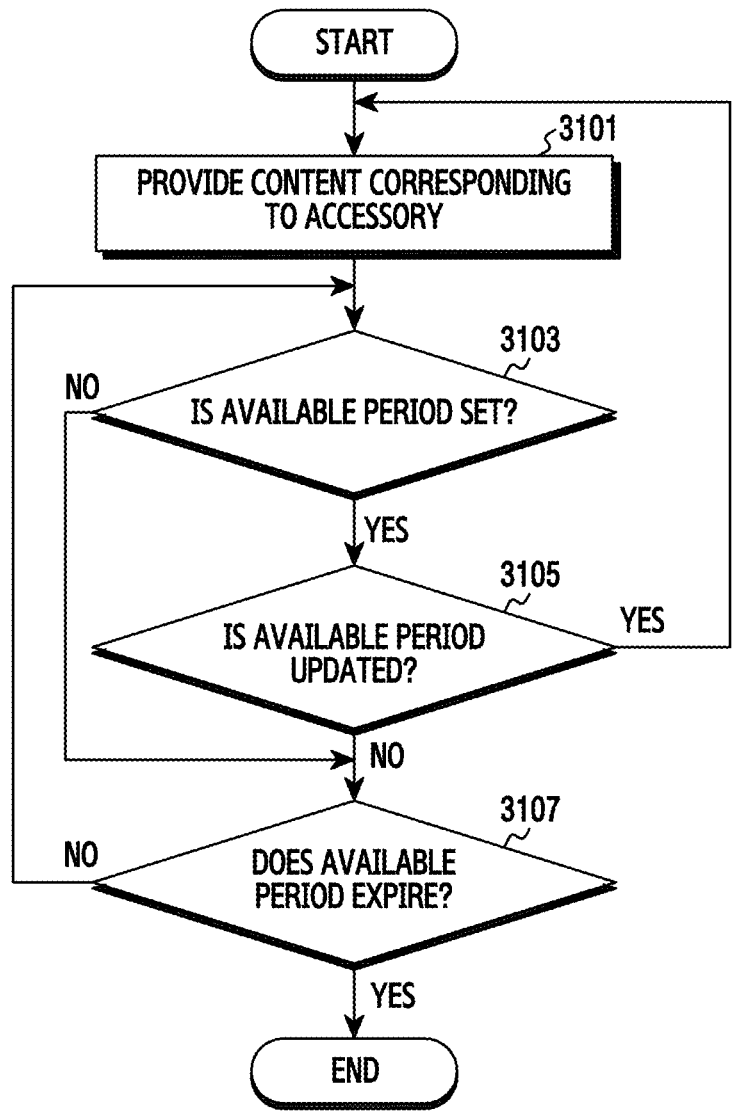
FIG. 31 is a flowchart illustrating a process of updating an available period of content corresponding to an accessory device by an electronic device according to an embodiment of the present disclosure.

FIG. 31 is a flowchart illustrating a process of updating an available period of content corresponding to an accessory device by an electronic device according to an embodiment of the present disclosure.

Referring to FIG. 31, the electronic device provides content corresponding to an accessory device connected to the electronic device in operation 3101. The processor 220 may provide the content corresponding to the accessory device, corresponding to operations 801 to 809 of FIG. 8 or operations 2101 to 2111 of FIG. 21.

The electronic device determines whether an available period setting event occurs in association with the content corresponding to the accessory device in operation 3103. When an available period expiration point of the content corresponding to the accessory device is near, the processor 220 may control the display 260 to display available period expiration information. The processor 220 may determine whether selecting of an available period setting menu is detected through the input/output interface 250. When selecting of the available period setting menu is detected, the processor 220 may determine that an available period setting event has occurred.

When the available period setting event has occurred in association with the content corresponding to the accessory device, the electronic device determines whether the available period of the content corresponding to the accessory device is updated in operation 3105. The processor 220 may determine whether an electronic payment for updating the available period of the content corresponding to the accessory device occurs based on input information of a user.

When the available period of the content corresponding to the accessory device is updated, the electronic device provides the content corresponding to the accessory device in operation 3101.

When the available period setting event in association with the content corresponding to the accessory device does not occur or when the available period of the content corresponding to the accessory device is not updated, the electronic device determines whether the available period of the content corresponding to the accessory device expires in operation 3107.

When the available period of the content corresponding to the accessory device does not expire, the electronic device determines whether an available period setting event associated with the content corresponding to the accessory device occurs again in operation 3103.

Figure 32:
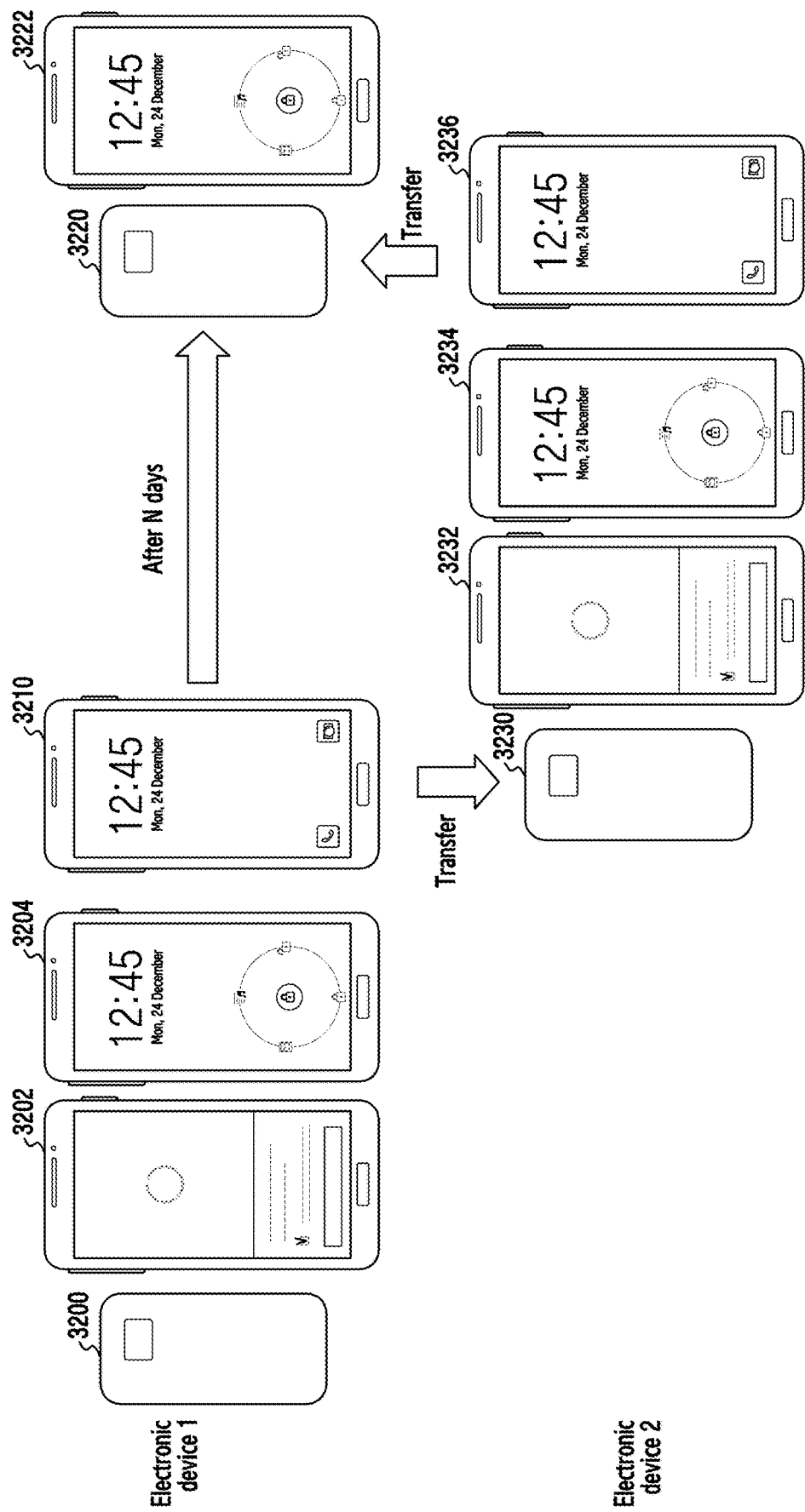
FIG. 32 is a diagram illustrating a relationship associated with the right to use an accessory device between electronic devices according to an embodiment of the present disclosure.

FIG. 32 is a diagram illustrating a relationship associated with the right to use an accessory device between electronic devices according to an embodiment of the present disclosure.

According to an embodiment of the present disclosure, when a connection of an accessory device 3200 (e.g., a cover) is detected, an electronic device 1 may authenticate the accessory device 3200 through a first device and determine availability. When the electronic device 1 successfully authenticates the accessory device 3200 and determines that the accessory device 3200 is available through the first device, the electronic device 1 may provide content corresponding to the accessory device 3200. The electronic device 1 may change a lock screen of the electronic device 1 to a lock screen 3204 corresponding to the accessory device 3200. In this instance, the electronic device 1 may display a service screen 3202 to determine whether to install content corresponding to content identification information provided from the first device. The electronic device 1 may install the lock screen 3204 corresponding to the accessory device 3200 based on an install approval input corresponding to the service screen 3202.

According to an embodiment of the present disclosure, when disconnection of the accessory device 3200 is detected, the electronic device 1 restores the lock screen of the electronic device 1 to the lock screen before the accessory device 3200 is connected, based on service policy information of the accessory device 3200, in operation 3210. The electronic device 1 may maintain the lock screen corresponding to the accessory device 3200 based on the service policy information corresponding to the accessory device 3200. Accordingly, when the accessory device 3200 is reinstalled, the electronic device 1 changes the lock screen of the electronic device 1 to the lock screen corresponding to the accessory device 3200, which is stored in a memory of the electronic device 1, in operation 3222. For example, only when the first device requests updating the lock screen corresponding to the accessory device 3200 may the electronic device 1 download and install the lock screen corresponding to the accessory device 3200.

According to an embodiment of the present disclosure, when a connection of the accessory device 3200 (e.g., a cover) is detected, an electronic device 2 may authenticate the accessory device 3200 and determine availability through the first device.

According to an embodiment of the present disclosure, when identification information of the accessory device 3200 is successfully authenticated, the first device may determine whether the accessory device 3200 is available. The first device may determine whether the identification information of the accessory device 3200 associated with the electronic device 2 overlaps identification information of an accessory device installed in another electronic device (e.g., the electronic device 1). When another accessory device whose identification information overlaps the identification information of the accessory device 3200 does not exist, the first device may determine that the corresponding accessory device 3200 is available. When another accessory device whose identification information overlaps the identification information of the accessory device 3200 exists, the first device may determine the availability of the corresponding accessory device 3200 based on service policy information corresponding to the accessory device 3200. When the accessory device 3200 is usable by another user based on a service policy corresponding to the accessory device 3200, the first device may determine that the accessory device 3200 is available. When the accessory device 3200 is unusable by another user based on the service policy corresponding to the accessory device 3200, the first device may determine whether the accessory device 3200 is stolen or transferred based on identification information of an electronic device. When transfer information of the accessory device 3200 exists, the first device may determine that the accessory device 3200 is available. When the accessory device 3200 is not transferable, the first device may determine that the accessory device 3200 has been stolen or replicated, and may restrict use of the content corresponding to the accessory device 3200. When the accessory device 3200 is transferable, the first device may provide an interface for transferring the accessory device 3200 to the electronic device 1. When the accessory device 3200 is successfully transferred, the first device may determine that the accessory device 3200 is available with respect to the electronic device 2. When transferring of the accessory device 3200 fails, the first device may determine that the accessory device 3200 is stolen or replicated, and may restrict use of content corresponding to the accessory device 3200.

According to an embodiment of the present disclosure, when the electronic device 2 successfully authenticates the accessory device 3200 and determines that the accessory device is available through the first device, the electronic device 2 may provide content corresponding to the accessory device 3200. The electronic device 2 may change a lock screen of the electronic device 2 to a lock screen 3234 corresponding to the accessory device 3200. In this instance, the electronic device 2 may determine whether to install the lock screen 3204 corresponding to the accessory device 3200 through a service screen 3232 for determining whether to install the content.

According to an embodiment of the present disclosure, the available period or the available number of times for use of the content corresponding to the accessory device 3200, which may be used by an electronic device, may be changed according to service policy information of the content. The available period or the available number of times for use of the accessory device 3200 may be reduced by accumulating the time period or the number of times that the accessory device 3200 is connected and content is used, irrespective of identification information of an electronic device. That is, based on the sum of the time periods or the number of times that the electronic device 1 and the electronic device 2 are connected to the accessory device for use of content, a remaining period of time or the remaining number of times that the accessory device is usable may be determined. As another example, the available period or the available number of times for content associated with the accessory device 3200 may be managed based on a time period or the number of times that the accessory device 3200 is connected and content is used for each piece of identification information of an electronic device. The available time period or the available number of times for some of a plurality of pieces of content associated with the accessory device 3200 may be reduced in common for all pieces of identification information of electronic devices based on the accumulation, or may be separately reduced for each piece of identification information of an electronic device.

An electronic device, according to an embodiment of the present disclosure, manages content or a function associated with a service (e.g., changing a UI theme, a customized advertisement, a game item, a camera function, playing back a multimedia content, updating content, or transmitting/receiving a message) corresponding to an accessory device, based on a service policy of the content, thereby providing content or a function included in the service corresponding to the accessory device and providing a user with various useful experiences.

An external device (e.g., a server), according to an embodiment of the present disclosure, controls an electronic device to provide a service corresponding to an accessory device connected to the electronic device, and thus, the service corresponding to the accessory device may be easily connected and updated through the external device.

The term "module" as used herein may include a unit consisting of hardware, software, or firmware, and may, for example, be used interchangeably with the term "logic", "logical block", "component", "circuit", and the like. The "module" may be an integrated component, or a minimum unit for performing one or more functions or a part thereof. The "module" may be mechanically or electronically implemented and may include, for example, an Application-Specific Integrated Circuit (ASIC) chip, a field-programmable gate arrays (FPGA), or a programmable-logic device, which has been known or are to be developed in the future, for performing certain operations.

At least some of devices (e.g., modules or functions thereof) or methods (e.g., operations), according to an embodiment of the present disclosure, may be implemented by an instruction which is stored a computer-readable storage medium (e.g., the memory 230 or 530) in the form of a program module. The instruction, when executed by a processor (e.g., the processor 220 or 520), may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code made by a complier or a code that may be executed by an interpreter. The programming module according to an embodiment of the present disclosure may include one or more of the aforementioned elements or may further include other additional elements, or some of the aforementioned elements may be omitted.

Operations performed by a module, a programming module, or other elements, according to an embodiment of the present disclosure, may be executed sequentially, in parallel, repeatedly, or in a heuristic manner. At least some operations may be executed according to another sequence, may be omitted, or may further include other operations.

Embodiments of the present disclosure disclosed herein are provided merely to describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure as defined by the appended claims and their equivalents.

What is claimed is:

1. An electronic device, comprising:
a display;
a communication circuit;
a processor electrically connected to the communication circuit; and
a memory electrically connected to the processor which stores at least one piece of policy information associated with an accessory device, wherein the policy information includes information for controlling content,
wherein the memory stores instructions, which when executed, cause the processor to:
establish a connection with the accessory device using the communication circuit,
receive accessory device identification information associated with the accessory device from the accessory device via the connection established using the communication circuit,
transmit, using the communication circuit, a request for content to an external electronic device different from the accessory device based on at least a part of the received accessory device identification information and property information associated with the electronic device, wherein the property information includes information associated with at least one of a processing speed of the processor, a communication speed of the communication circuit, an available capacity of the memory, compatibility of software stored in the memory, a sensor included in the electronic device, a type of the display, a size of the display, a resolution of the display, and a form of the display,
receive the content associated with the accessory device corresponding to the property information from the external electronic device via the communication circuit,
output at least a part of the received content via the display based on at least a part of the at least one piece of policy information stored in the memory,
detect disconnection of the accessory device,
transmit accessory disconnection information to the external electronic device,
receive content restriction information from the external electronic device, and
delete or deactivate at least a part of the output content based on the received content restriction information.

2. The electronic device of claim 1, wherein the instructions, when executed, cause the processor to receive the at least one piece of policy information from the accessory device or the external electronic device via the communication circuit, and
wherein the at least one piece of policy information includes first policy information associated with the content or second policy information associated with the content and another piece of content received from the external electronic device.

3. The electronic device of claim 1, wherein the instructions, when executed, cause the processor to transmit electronic device identification information associated with the electronic device or account information of a user of the electronic device to the external electronic device, using the communication circuit and receive content corresponding to the electronic device identification information or the account information from the external electronic device via the communication circuit.

4. The electronic device of claim 1, wherein the instructions, when executed, cause the processor to release the connection with the accessory device using the communication circuit upon detecting a detachment of the accessory device from the electronic device.

5. The electronic device of claim 1, wherein the accessory device comprises a cover accessory.

6. The electronic device of claim 1, wherein the content is received, if a number of times for use of the content, which is used by the electronic device, is within a predetermined limit.

7. The electronic device of claim 1, wherein the content comprises at least one of:
at least one icon,
a lock screen,
a background screen,
an always on display (AOD) screen, and
a background image of a message application.

8. A method for operating an electronic device, the method comprising:
establishing a connection with an accessory device;
receiving accessory device identification information associated with the accessory device from the accessory device via the connection established using a communication circuit included in the electronic device;
transmitting, using the communication circuit, a request for content to an external electronic device different from the accessory device based on at least apart of the received accessory device identification information and property information associated with the electronic device, wherein the property information includes information associated with at least one of a processing speed of a processor included in the electronic device, a communication speed of the communication circuit, an available capacity of a memory included in the electronic device, compatibility of software stored in the memory, a sensor included in the electronic device, a type of a display included in the electronic device, a size of the display, a resolution of the display, and a form of the display;
receiving the content associated with the accessory device corresponding to the property information from the external electronic device,
outputting at least a part of the received content via the display based on at least a part of at least one piece of policy information, wherein the policy information includes information for controlling the content;
detecting disconnection of the accessory device;
transmitting accessory disconnection information to the external electronic device;
receiving content restriction information from the external electronic device; and
deleting or deactivating at least a part of the output content based on the received content restriction information.

9. The method of claim 8, wherein the accessory device comprises a cover accessory.

10. The method of claim 8, wherein the content is received, if a number of times for use of the content, which is used by the electronic device, is within a predetermined limit.

11. The method of claim 8, wherein the content comprises at least one of:
at least one icon,
a lock screen,
a background screen,
an always on display (AOD) screen, and
a background image of a message application.

12. The method of claim 8, further comprising receiving the at least one piece of policy information from the accessory device or the external electronic device, and
- wherein the at least one piece of policy information includes first policy information associated with the content or second policy information associated with the content and another piece of content received from the external electronic device.

13. The method of claim 8, further comprising:
- transmitting electronic device identification information associated with the electronic device or account information of a user of the electronic device to the external electronic device; and
- receiving content corresponding to the electronic device identification information or the account information from the external electronic device.

\* \* \* \* \*